US008385933B2

(12) United States Patent
Kishigami et al.

(10) Patent No.: US 8,385,933 B2
(45) Date of Patent: Feb. 26, 2013

(54) BASE STATION DEVICE AND RADIO COMMUNICATION DEVICE

(75) Inventors: Takaaki Kishigami, Tokyo (JP); Shutai Okamura, Osaka (JP)

(73) Assignee: Panasonic Corporation, Osaka (JP)

( * ) Notice: Subject to any disclaimer, the term of this patent is extended or adjusted under 35 U.S.C. 154(b) by 649 days.

(21) Appl. No.: 12/522,694

(22) PCT Filed: Jan. 7, 2008

(86) PCT No.: PCT/JP2008/050044
§ 371 (c)(1),
(2), (4) Date: Jul. 9, 2009

(87) PCT Pub. No.: WO2008/084777
PCT Pub. Date: Jul. 17, 2008

(65) Prior Publication Data
US 2010/0075693 A1    Mar. 25, 2010

(30) Foreign Application Priority Data

Jan. 10, 2007  (JP) ................................ 2007-002856
Jan. 4, 2008   (JP) ................................ 2008-000209

(51) Int. Cl.
*H04W 72/08* (2009.01)
(52) U.S. Cl. .................. 455/452.2; 455/101; 455/422.1; 455/404.1; 455/522; 370/210; 370/252; 370/328; 370/345; 370/470; 375/260; 375/267; 375/261; 375/299
(58) Field of Classification Search ............... 455/452.2, 455/404.1, 41.2, 522; 370/252, 328, 470, 370/210, 468, 203, 208; 375/267, 260, 130
See application file for complete search history.

(56) References Cited

U.S. PATENT DOCUMENTS

| 7,646,820 | B2 * | 1/2010 | Shen et al. | 375/260 |
| 7,738,356 | B2 * | 6/2010 | Kim | 370/208 |
| 7,746,948 | B2 * | 6/2010 | Izumi | 375/267 |

(Continued)

FOREIGN PATENT DOCUMENTS

| JP | 2005-354708 | 12/2005 |
| JP | 2006-129475 | 5/2006 |

(Continued)

OTHER PUBLICATIONS

International Search Report dated Apr. 8, 2008.

(Continued)

*Primary Examiner* — Kiet Doan
*Assistant Examiner* — Michael T Vu
(74) *Attorney, Agent, or Firm* — Dickinson Wright PLLC

(57) ABSTRACT

Provided is a base station device capable of suppressing power consumption of a radio communication device and transmitting a pilot signal for measuring an uplink channel quality in a high frequency use efficiency. The base station device (2) includes: a resource block size decision unit (54) which decides the number of subcarriers to be allocated for the radio communication device (1); and a cyclic shift delay amount decision unit (55) which sets a cyclic shift delay amount used when performing cyclic shift delay diversity transmission according to the number of subcarriers decided by the resource block size decision unit (54). By using the cyclic shift delay amount set by the cyclic shift delay amount decision unit (55), the radio communication device (1) cyclic shift delay diversity transmission of the channel quality measuring signal.

4 Claims, 31 Drawing Sheets

U.S. PATENT DOCUMENTS

| | | | |
|---|---|---|---|
| 2005/0105589 A1* | 5/2005 | Sung et al. | 375/130 |
| 2005/0281240 A1 | 12/2005 | Oh | |
| 2006/0077886 A1 | 4/2006 | Oh | |
| 2006/0198293 A1 | 9/2006 | Nishio | |
| 2006/0246916 A1 | 11/2006 | Cheng | |
| 2008/0080637 A1* | 4/2008 | Khan et al. | 375/267 |
| 2009/0219858 A1* | 9/2009 | Liang et al. | 370/328 |

FOREIGN PATENT DOCUMENTS

| | | |
|---|---|---|
| JP | 4490921 | 4/2010 |
| JP | 2010-200347 | 9/2010 |
| WO | 97/01256 | 1/1997 |

OTHER PUBLICATIONS

Samsung, "Further Details on Adaptive Cyclic Delay Diversity Scheme," 3GPP TSG RAN WG1 Meeting #42bis R1-051046, Oct. 2005, pp. 1-8.

NTT DoCoMo, "Multi-Degree Cyclic Delay Diversity with Frequency-domain Channel Dependent Scheduling," 3GPP TSG-RAN WG1 Meeting #44bis R1-060991, Mar. 2006, pp. 1-5.

Toshiba Corporation, "Consideration on transmit diversity in E-UTRA uplink," 3GPP TSG-RAN WG1 #47 R1-063081, Nov. 2006, pp. 1-5.

Sharp, "Performance Comparison between the Conventional CDD and a Sub-carrier Grouping CDD scheme for the common control channel in the E-UTRA Downlink," 3GPP TSG-RAN WG1#47bis R1-070218, Jan. 2007, pp. 1-11.

Y. Ofuji, "Frequency Domain Channel-Dependent Scheduling with Group-wised Allocation of Transmission Bandwidth of Pilot Channel for CQI Measurement in Single-Carrier FDMA-Based Evolved UTRA Uplink," Technical Report of IEICE, RCS2006-154, Oct. 2006, pp. 125-130, p. 4, Line 20.

Notice of the Reasons for Rejection dated Jun. 26, 2012, in the corresponding Japanese Patent Application.

3GPP TSG-RAN Working Group 1 Meeting #45, "Uplink Adaptive Transmission with TP," Nortel, R1-061235, May 8-12, 2006, 6 pages total.

3GPP TSG RAN WG1 Meeting #45, "L1/L2 Control Channel Structure for E-UTRA Uplink," NTT DoCoMo, Fujitsu, Mitsubishi Electric, NEC, Sharp, Toshiba Corporation, R1-061183, May 8-12, 2006, 10 pages total.

3GPP TSG RAN WG1 Meeting #43, "Adaptive Cyclic Delay Diversity," Samsung, R1-051354, Nov. 7-11, 2005, 12 pages total.

* cited by examiner

BASE STATION DEVICE AND RADIO COMMUNICATION DEVICE

TECHNICAL FIELD

The present invention relates to a base station apparatus and radio communication apparatus that perform high-speed packet communication using frequency resource scheduling and adaptive modulation in a communication system that uses a multiple access method.

BACKGROUND ART

In a conventional radio communication system performing high-speed packet transmission, a downlink that transmits a signal from a base station to a radio communication apparatus, and an uplink that transmits a signal from a radio communication apparatus to a base station, are divided, and are estimated by measuring the quality of the respective transmission paths (hereinafter referred to as "channel quality"). Based on this estimated channel quality, the base station performs scheduling that allocates frequency and time resources to an accessed radio communication apparatus, and also sets transmission power and transmission speed (an M-ary value and a coding rate) and transmits data.

In this kind of radio communication system, there are three methods of dividing an uplink and downlink: a TDD (Time Division Duplex) method, FDD (Frequency Division Duplex) method, and CDD (Code Division Duplex) method.

Of these, an FDD method divides an uplink and downlink by frequency, and uses different frequencies in an uplink and downlink.

In recent years, in the radio communication field, data communication in which the amount of information on a downlink greatly exceeds that on an uplink has been predicted to become the mainstream, and the development of asymmetric-communication radio communication systems in which the frequency band of a downlink is wider than that of an uplink has been pursued.

The introduction of a wideband system with a bandwidth even greater than that used in a 3GPP mobile communication system has been studied as a fourth-generation mobile communication system (IMT-advanced). With communication channels being made wideband, frequency selectivity can no longer be ignored.

Thus, in a system using a wider-band communication channel than a 3GPP mobile communication system, the introduction of frequency scheduling whereby a frequency at which transmission path conditions are comparatively good is detected for each radio communication apparatus and a frequency is allocated, and adaptive modulation using a modulation method and coding rate that satisfy a predetermined packet error rate according to transmission path conditions at an allocated frequency, has been studied.

Specifically, the use of multicarrier transmission such as OFDM (Orthogonal Frequency Division Multiplexing), OFDMA (Orthogonal Frequency Division Multiple Access), or MC-CDMA (Multi-Carrier Code Division Multiple Access), has been considered as an IMT-advanced transmission method.

In these multicarrier transmission methods, high-speed transmission is implemented by using many subcarriers. Also, SC-FDMA (Single Carrier-Frequency Division Multiple Access) has been studied as a transmitting method for an uplink from a radio communication apparatus to a base station.

This SC-FDMA is a transmitting method whereby a signal resulting from converting a single-carrier-modulated signal to the frequency domain is placed on a specific carrier and used as a subcarrier signal in OFDM, as disclosed in Non-patent Document 1, for example.

Subcarrier placement in SC-FDMA may be localized placement whereby placement is performed densely in a specific frequency block, or distributed placement whereby placement is performed at specific subcarrier intervals. Use of these types of placement enables the PAPR (Peak to Average Power Ratio) to be reduced.

This characteristic of enabling the PAPR to be reduced makes SC-FDMA a particularly suitable uplink transmission method for a battery-operated radio communication apparatus for which power consumption is a concern.

Studies have been carried out into performing adaptive modulation and frequency scheduling on a subcarrier-by-subcarrier basis, or in units of subcarrier blocks each composed of a plurality of subcarriers, using these transmission methods.

In a system that performs this kind of adaptive modulation and frequency scheduling, it is necessary for a radio communication apparatus to report instantaneous individual subcarrier or subcarrier block unit channel quality information (CQI: Channel Quality Indicator) to a base station in a downlink.

On the other hand, in an uplink, it is necessary for a radio communication apparatus to perform channel quality measurement pilot signal transmission to enable the base station to measure instantaneous individual subcarrier or subcarrier block unit channel quality information (CQI) (hereinafter referred to as "uplink channel quality measurement").

Uplink channel quality measurement can be performed using channel duality in the case of a TDD (Time Division Duplex) system, and using a downlink CQI report as uplink channel quality when channel fluctuation is sufficiently small.

However, in the case of a cellular system, adaptive modulation and frequency scheduling are necessary that take account of the fact that the amount of interference is different in an uplink and a downlink.

While a data demodulation pilot may be transmitted in the same band as data, for an uplink channel quality measurement pilot signal it is necessary to perform transmission using subcarriers of all bands (conventional method 1) or to perform transmission across at least sufficiently more subcarriers than the frequency resources to be allocated using some bands within the bands (partial bands) (conventional method 2). In the case of conventional method 2, a subcarrier for which transmission path conditions are better can be detected by performing multiple transmissions of different partial bands. Also, it is necessary for a channel quality measurement pilot signal such as described above to be transmitted irrespective of the presence or absence of data.

Non-patent Document 1: Ofuji, Kawamura, Higuchi, Sawahashi, "Frequency Domain Channel-Dependent Scheduling with Group-wised Allocation of Transmission Bandwidth of Pilot Channel for CQI Measurement in Single-Carrier FDMA-Based Evolved UTRA Uplink", Technical Report of IEICE, RCS2006-154, October, 2006

DISCLOSURE OF INVENTION

Problems to be Solved by the Invention

However, in a radio communication system, the greatest concern in uplink channel quality measurement pilot signal transmission is radio communication apparatus power consumption. Also, it is desirable to suppress radio communication apparatus power consumption without degrading the accuracy of uplink channel quality measurement at this time.

However, with conventional method 1, terminal power consumption is excessively necessary across all bands, and transmission power per band is low, so that there is a problem, in particular, of the accuracy of channel quality measurement being low for a terminal at a cell edge.

With conventional method 2, although more advantageous than conventional method 1 in terms of power consumption since transmission is performed using only some frequency bands, the probability of detecting a subcarrier providing a good channel decreases when a partial band is transmitted only once. As a result, there is a problem of frequency utilization efficiency decreasing.

Moreover, with conventional method 2, when a partial band is transmitted a plurality of times the probability of detecting a subcarrier providing a good channel, increases, but the time required for channel quality measurement is lengthened, resulting in a problem of degradation of the ability to track channel quality fluctuations.

Radio communication apparatus power consumption could be reduced by using different methods involving puncturing of channel quality measurement signal transmissions in the time domain (reducing the frequency of transmissions), or puncturing in the frequency domain (that is, increasing the subcarrier interval at which a channel quality measurement pilot signal is inserted). However, with these methods there is a problem of loss of time fluctuation or frequency selectivity tracking capability proportional to the amount of puncturing.

It is an object of the present invention to provide a base station apparatus and radio communication apparatus that enable radio communication apparatus power consumption to be suppressed without degrading the accuracy of uplink channel quality measurement, while achieving high frequency utilization efficiency, even when an uplink channel quality measurement pilot signal is transmitted.

Means for Solving the Problems

A base station apparatus of the present invention employs a configuration having: a resource size deciding section that decides a number of subcarriers to be allocated to a radio communication apparatus that performs cyclic shift delay diversity transmission of a channel quality measurement signal; a cyclic shift delay amount deciding section that sets a cyclic shift delay amount when cyclic shift delay diversity transmission is performed according to the number of subcarriers decided by the resource size deciding section; and a transmitting section that transmits the cyclic shift delay amount to the radio communication apparatus.

A base station apparatus of the present invention employs a configuration having: a resource size deciding section that decides a number of subcarriers to be allocated to a radio communication apparatus that performs cyclic shift delay diversity transmission of a channel quality measurement signal; a cyclic shift delay amount deciding section that sets a cyclic shift delay amount used when the radio communication apparatus performs cyclic shift delay diversity transmission of a channel quality measurement signal according to output of the resource size deciding section; and a channel quality measurement band selecting section that selects a channel quality measurement band when the channel quality measurement signal is transmitted according to the cyclic shift delay amount set by the cyclic shift delay amount deciding section.

A base station apparatus of the present invention employs a configuration having: a cyclic shift delay amount generation section that generates cyclic shift delay amount information used by a radio communication apparatus that performs cyclic-shift-delayed transmission of a channel quality measurement signal; and a transmitting section that transmits the cyclic shift delay amount information to the radio communication apparatus. A radio communication apparatus of the present invention employs a configuration having: a cyclic shift delay amount information extraction section that extracts cyclic shift delay amount information transmitted from a base station apparatus; and a transmitting section that performs cyclic-shift-delayed transmission of a channel quality measurement signal to the base station apparatus using the cyclic shift delay amount information extracted by the cyclic shift delay amount information extraction section.

Advantageous Effect of the Invention

The present invention makes possible frequency scheduling by means of a high-channel-quality frequency for a radio communication apparatus, and enables high-frequency-utilization-efficiency communication to be performed.

BEST MODE FOR CARRYING OUT THE INVENTION

Embodiments of the present invention will now be described in detail with reference to the accompanying drawings.

(Embodiment 1)

Figure 1:
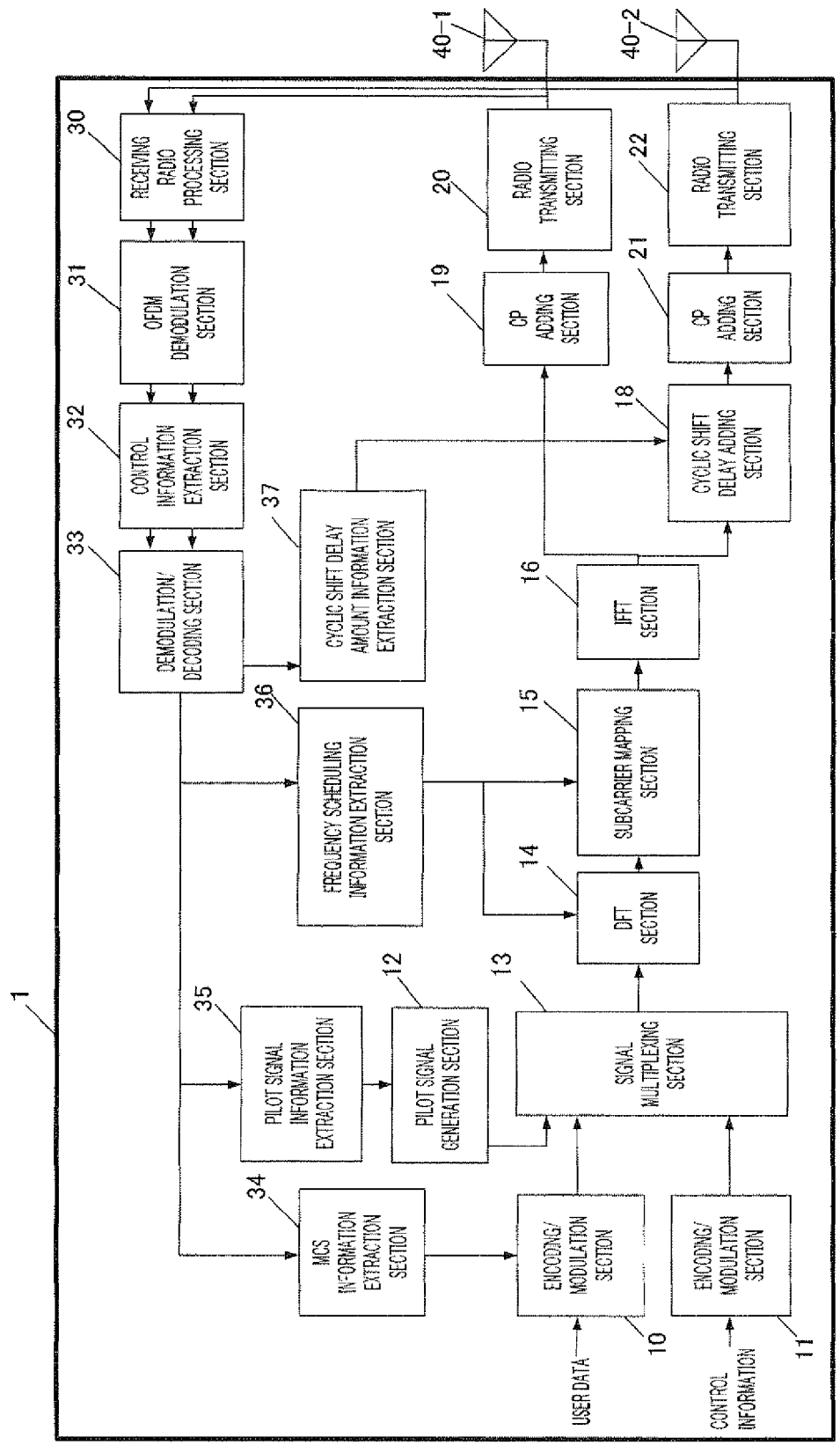
FIG. 1 is a block diagram showing the configuration of a radio communication apparatus according to Embodiment 1 of the present invention.
Figure 2:
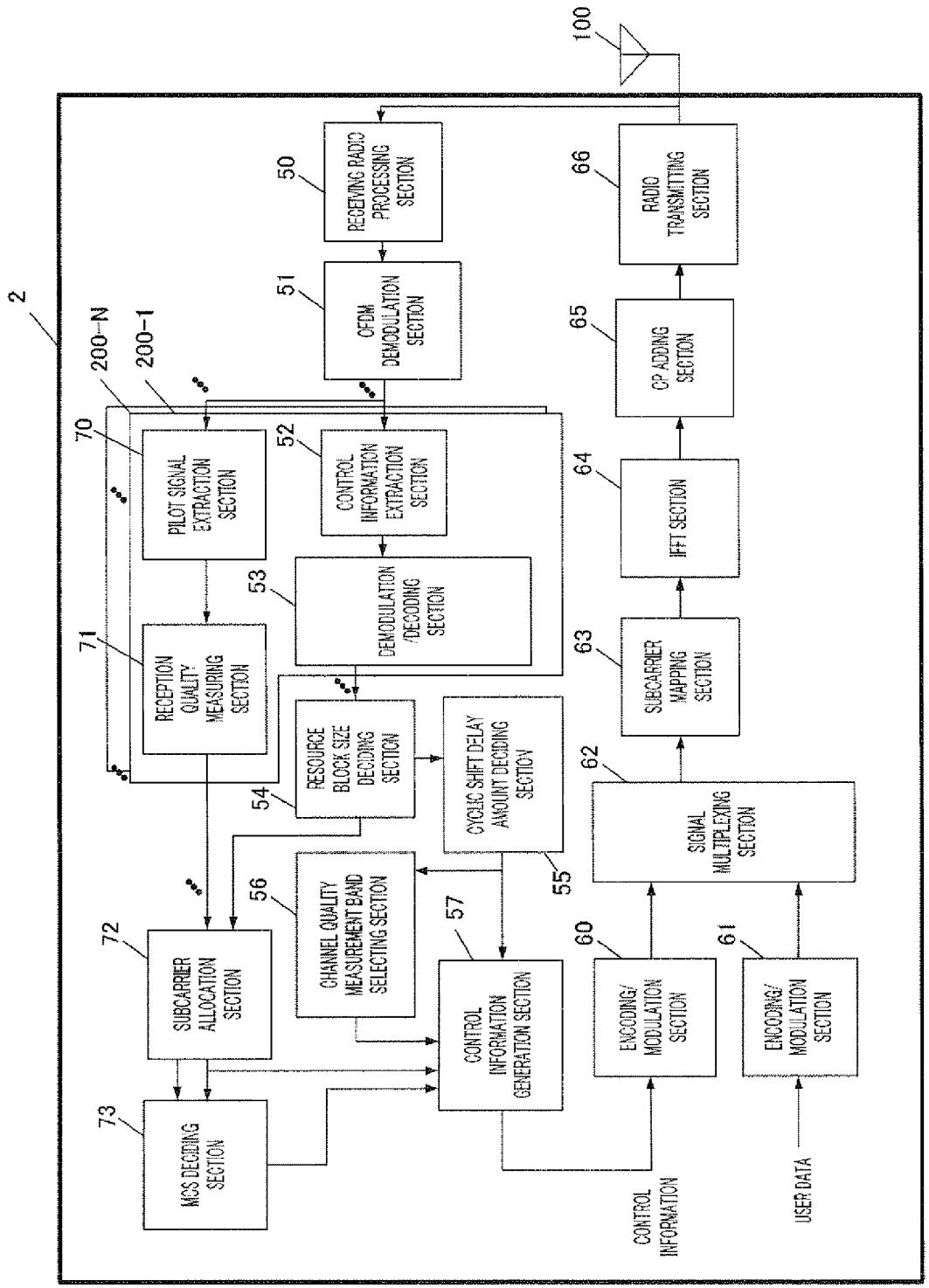
FIG. 2 is a block diagram showing the configuration of a base station apparatus according to Embodiment 1 of the present invention.

FIG. 1 is a block diagram showing the configuration of radio communication apparatus 1 according to Embodiment 1 of the present invention, and FIG. 2 is a block diagram showing the configuration of base station apparatus 2 configuring a radio communication system together with radio communication apparatus 1 in FIG. 1.

Before describing radio communication apparatus 1 shown in FIG. 1 and base station apparatus 2 shown in FIG. 2, a description will first be given of communication procedures between a base station apparatus and radio communication apparatus for user data transmission using a radio communication apparatus uplink in a radio communication system having radio communication apparatus 1 and base station apparatus 2. Specifically, an uplink channel quality measurement procedure and a user data communication procedure using an uplink according to the present invention will be described.

<Communication Procedure (1)>

First, radio communication apparatus 1 issues a scheduling request for uplink user data transmission. At this time, QoS information relating to user data for which transmission is to be performed, and information relating to the data amount and so forth, is transmitted to base station apparatus 2.

<Communication Procedure (2)>

Based on the scheduling request from radio communication apparatus 1 in communication procedure (1), base station apparatus 2 decides a frequency bandwith—that is, a number of subcarriers—to be allocated as a frequency resource (a resource block size). Then a partial band having a frequency width of a wider range than the resource size to be allocated to the relevant radio communication apparatus 1 is selected, and taken as partial band for which channel quality (CQI) measurement is performed (hereinafter referred to as "channel quality measurement partial band") $\Delta$CQI. Next, base station apparatus 2 reports channel quality measurement pilot signal parameters to radio communication apparatus 1. A channel quality measurement partial band is wider than an actually allocated band.

Here, channel quality measurement pilot signal parameters include 2-a) a partial band position relating to the selected channel quality measurement partial band, 2-b) cyclic shift delay amount information when cyclic shift delay diversity transmission is performed, and 2-c) pilot signal information relating to a pilot signal transmitting method (pilot signal sequence and transmission timing) used for channel quality measurement.

<Communication Procedure (3)>

Radio communication apparatus 1 receives the above frequency scheduling information, cyclic shift delay amount information, and channel quality measurement pilot signal information transmitted from base station apparatus 2 in communication procedure (2). Then, using the specified cyclic shift delay amount, radio communication apparatus 1 performs cyclic shift delay diversity transmission (CSD transmission) of a channel quality measurement pilot signal according to the specified pilot signal sequence, using the channel quality measurement partial band.

<Communication Procedure (4)>

Base station apparatus 2 receives the cyclic shift delay diversity transmission (CSD transmission) transmitted from radio communication apparatus 1 in communication procedure (3), and measures channel quality in the channel quality measurement partial band previously specified for each radio communication apparatus 1. Then base station apparatus 2 decides a subcarrier to be allocated to each radio communication apparatus 1 based on the channel quality measurement result, and transmits this to radio communication apparatus 1 as frequency scheduling information. Base station apparatus 2 also transmits to radio communication apparatus 1 information relating to the coding rate and M-ary value at the time of user data transmission (MCS information) in a subcarrier allocated to radio communication apparatus 1. An allocated subcarrier included in frequency scheduling information transmitted from base station apparatus 2 to radio communication apparatus 1 in this communication procedure (4) is also referred to as frequency resource block size (resource size: hereinafter referred to as "RB size") ΔRB. Frequency resource size ΔRB indicates the position and width of a frequency band when radio communication apparatus 1 actually transmits user data in an uplink to base station apparatus 2.

<Communication Procedure (5)>

Radio communication apparatus 1 extracts a subcarrier allocated by base station apparatus 2 as frequency scheduling information from the signal transmitted from base station apparatus 2 in communication procedure (4), and transmits user data using this allocated subcarrier. At this time, user data is CSD-transmitted using the same cyclic shift delay amount as at the time of channel quality measurement pilot signal transmission.

In Embodiment 1, a case is described in which SC-FDMA (single-carrier frequency division multiple access) is used as the radio communication apparatus 1 transmitting method in an uplink, but this is not a limitation, and the only requirement is that a transmitting method be used that can be applied to FDMA, such as OFDM or OFDMA, for example.

For example, if OFDMA is used as the radio communication apparatus 1 transmitting method in Embodiment 1, radio communication apparatus 1 shown in FIG. 1 has a configuration in which a serial/parallel conversion section (S/P conversion section) that converts input serial data to parallel data is provided instead of DFT section 14. Here, the S/P conversion section converts the data format from serial to parallel (hereinafter referred to as S/P conversion) for each predetermined-number symbol number $N_{DFT}$ block unit (hereinafter referred to as symbol data block) for signal multiplexing section 13 output, and inputs the resulting data to subcarrier mapping section 15.

Base station apparatus 2 shown in FIG. 2 is shown as having a configuration using OFDM (Orthogonal Frequency Division Multiplexing) as a transmitting method, but is not limited to this.

Radio communication apparatus 1 and base station apparatus 2 will now be described in detail using FIG. 1 and FIG. 2.

Encoding/modulation section 10 executes predetermined error correction encoding on user data comprised of a bit data sequence to be transmitted from radio communication apparatus 1 to base station apparatus 2, generates a symbol data sequence signal using a modulation method with a predetermined M-ary value (for example, QPSK, 16QAM, or 64QAM modulation), and outputs this signal to signal multiplexing section 13. Here, MCS information (Modulation and Coding Schemes) relating to the coding rate and M-ary value when error correction encoding is performed is set based on the output of MCS information extraction section 34 that extracts MCS information from a control signal transmitted from base station apparatus 2. Adaptive modulation conforming to channel conditions is made possible by this setting.

Encoding/modulation section 11 executes predetermined error correction encoding on a control signal comprised of a bit data sequence to be transmitted from radio communication apparatus 1 to base station apparatus 2, and generates a symbol data sequence signal using a modulation method with a predetermined Mary value (for example, BPSK modulation or QPSK modulation).

Here, the coding rate and Mary value used when error correction encoding is performed are fixed beforehand. Control information is generally transmitted using BPSK modulation or QPSK modulation and a low coding rate since it requires high-quality transmission. Here, when a scheduling request is issued for user data transmission using an uplink, control information includes above-described scheduling request information.

Pilot signal generation section 12 generates a pilot signal that is a signal sequence known beforehand to base station apparatus 2, and outputs this to signal multiplexing section 13. Here, a signal sequence used in a pilot signal is set based on the output of pilot signal information extraction section 35 that extracts pilot signal information from a control signal transmitted from base station apparatus 2. A pilot signal includes a channel estimation pilot signal for demodulating and decoding control information.

Specifically, when pilot signal generation section 12 generates a pilot signal that is a signal sequence known beforehand to base station apparatus 2 in communication procedure (3), the signal sequence used in the pilot signal is set based on the output of pilot signal information extraction section 35 that extracts pilot signal information relating to channel quality measurement from a control signal transmitted from base station apparatus 2.

Localized placement or distributed placement is used for this kind of channel quality measurement pilot signal subcarrier placement. FDM, CDM, or TDM is used for channel quality measurement pilot signal multiplexing in another radio communication apparatus at this time. Also, FDM, CDM, or TDM is used for user data multiplexing with a demodulation pilot signal.

Signal multiplexing section 13 multiplexes input only from the pilot signal generation section or input from encoding/modulation section 11 and pilot signal generation section 12.

Signal multiplexing section 13 multiplexes input from encoding/modulation section 10, encoding/modulation section 11, and pilot signal generation section 12. TDM, FDM, or CDM, or a multiplexing method using a combination of these, is used as the signal multiplexing section 13 multiplexing method.

DFT section 14 converts the data format from serial to parallel (hereinafter referred to as S/P conversion) for each predetermined-number symbol number $N_{DFT}$ block unit (hereinafter referred to as symbol data block) for signal multiplexing section 13 output using information from frequency scheduling information extraction section 36, performs a Discrete Fourier Transform, and inputs the resulting data to subcarrier mapping section 15.

By this means, a time-domain symbol data block is converted to a frequency data block comprised of a frequency-domain complex number. Predetermined-number symbol number $N_{DFT}$ is decided based on frequency scheduling information corresponding to the relevant radio communication apparatus 1, input from frequency scheduling information extraction section 36.

Frequency scheduling information corresponding to radio communication apparatus 1 on which predetermined-number symbol number $N_{DFT}$ is based is, for example, information [number of subcarriers, subcarrier numbers, and so forth] relating to subcarriers allocated for uplink scheduling request information transmission, the position of a partial band relating to a channel quality measurement partial band selected by the base station apparatus and information [number of subcarriers, subcarrier numbers, and so forth] relating to subcarriers relating to that bandwidth, or information [number of subcarriers, subcarrier numbers, and so forth] relating to subcarriers allocated to uplink user data transmission, or the like.

Subcarrier mapping section 15 maps a frequency data block that is DFT section 14 output onto a specific subcarrier ("subcarrier mapping"). Here, in subcarrier mapping, mapping is performed using frequency scheduling information for the relevant radio communication apparatus 1, input from frequency scheduling information extraction section 36.

As stated above, frequency scheduling information is information [number of subcarriers, subcarrier numbers, and so forth] relating to subcarriers allocated for uplink scheduling request information transmission, the position of a partial band relating to a channel quality measurement partial band selected by the base station apparatus and information [number of subcarriers, subcarrier numbers, and so forth] relating to subcarriers relating to that bandwidth, information [number of subcarriers, subcarrier numbers, and so forth] relating to subcarriers allocated to uplink user data transmission, or the like.

Figure 3:
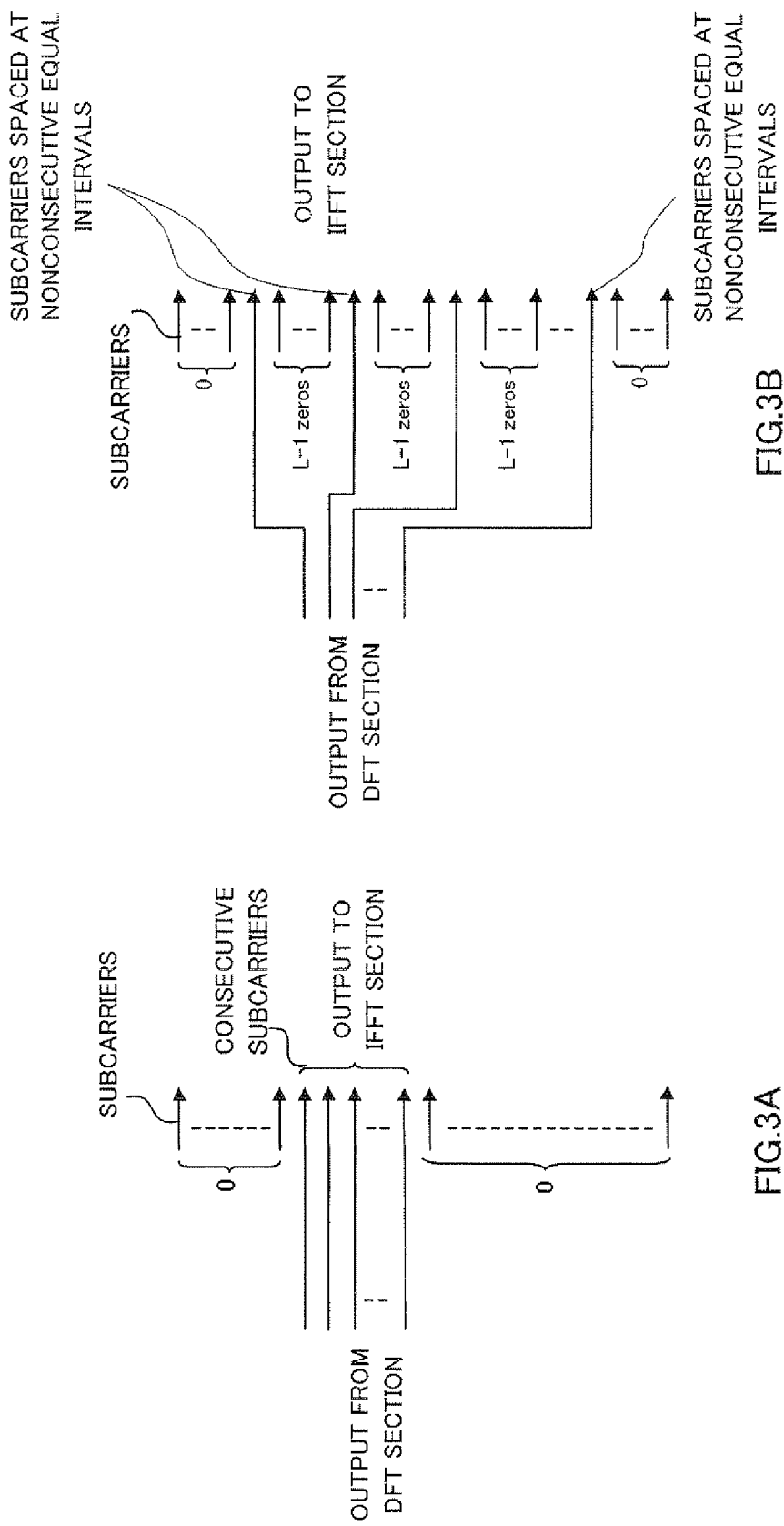
FIG. 3 is a drawing explaining an SC-FDMA subcarrier mapping method in Embodiment 1 of the present invention.

FIG. 3 is a drawing provided to explain the mapping processing method used when mapping onto subcarriers is performed by subcarrier mapping section 15.

FIG. 3(a) shows a type called Localized FDMA, whereby a frequency data block comprised of $N_{DFT}$ subcarriers is allocated to consecutive subcarriers. On the other hand, FIG. 3(b) shows a type called Distributed FDMA, whereby a frequency data block comprised of $N_{DFT}$ subcarriers is allocated to nonconsecutive subcarriers (subcarriers of teeth shape of a comb) spaced at equal intervals (L being the subcarrier interval, where L>1). Unallocated subcarriers are taken to be null subcarriers.

IFFT (Inverse Fast Fourier Transform) section 16 performs an inverse fast Fourier transform on subcarrier mapping section 15 output, and outputs the result to CP (Cyclic Prefix) adding section 19 and cyclic shift delay adding section 18.

CP adding section 19 inserts a guard interval using a CP (Cyclic Prefix) in transmit data input from IFFT section 16, and outputs the resulting data to radio transmitting section 20.

Radio transmitting section 20 performs up-conversion of transmit data input from CP adding section 19 from baseband frequency to radio frequency and so forth, and transmits the data from antenna 40-1.

Cyclic shift delay adding section 18 outputs a signal in which a predetermined cyclic shift delay amount has been added to the signal input from IFFT section 16. Here, the cyclic shift delay amount is decided by the base station apparatus, is included in control information transmitted from base station apparatus 2 when a channel quality measurement signal is transmitted in a specified partial band, and is input from cyclic shift delay amount information extraction section 37. At the stage at which radio communication apparatus 1 issues a scheduling request, the cyclic shift delay amount has not been decided by the base station apparatus, and therefore cyclic shift delay adding section 18 sets the cyclic shift delay amount to a predetermined value known beforehand.

The cyclic shift delay amount input from cyclic shift delay amount information extraction section 37 is stored, and at the stage at which user data is transmitted, cyclic shift delay adding section 18 uses a cyclic shift delay amount identical to the stored cyclic shift delay amount.

When transmission is performed, unlike in the case of radio communication apparatus 1 having the configuration shown in FIG. 1, transmission may be performed from only one antenna 40-1 and not be performed from antenna 40-2. If transmission is performed from only one antenna 40-1, the following processing by CP adding section 21 and radio transmitting section 22 is unnecessary.

CP adding section 21 inserts a guard interval using a CP (Cyclic Prefix) in transmit data input from cyclic shift delay adding section 18, and outputs the resulting data to radio transmitting section 22.

Radio transmitting section 22 performs up-conversion of transmit data input from CP adding section 21 from baseband frequency to radio frequency and so forth, and transmits the data from antenna 40-2.

Receiving radio processing section 30 executes amplification processing, band-limiting processing, and frequency conversion processing on high-frequency signals received by antennas 40, and outputs a complex baseband signal comprised of an in-phase signal and quadrature signal.

OFDM demodulation section 31 executes OFDM demodulation on the input baseband signals. That is to say, after time and frequency synchronization processing, OFDM demodulation section 31 performs GI (Guard Interval) removal, FFT (Fast Fourier Transform) processing, and serial/parallel conversion processing.

Control information extraction section 32 extracts control information transmitted from base station apparatus 2 from the received signal input from OFDM demodulation section 31, and outputs this to demodulation/decoding section 33.

Specifically, control information extracted by control information extraction section 32 includes pilot signal information, channel quality measurement partial band information, and cyclic shift delay amount information, or includes MCS information and pilot signal information.

Demodulation/decoding section 33 performs demodulation processing and decoding processing on the control information input from control information extraction section 32, and outputs control information.

MCS information extraction section 34 extracts MCS information from the control information processed by demodulation/decoding section 33, and outputs this to encoding/modulation section 10.

Pilot signal information extraction section 35 extracts pilot signal information from the control information processed by demodulation/decoding section 33, and outputs this to pilot signal generation section 12.

Frequency scheduling information extraction section 36 extracts frequency scheduling information including information relating to the channel quality measurement band transmitted from base station apparatus 2. Specifically, frequency scheduling information extraction section 36 extracts frequency scheduling information from the control information processed by demodulation/decoding section 33, and outputs this to DFT section 14 and subcarrier mapping section 15.

Cyclic shift delay amount information extraction section 37 extracts cyclic shift delay amount information transmitted from base station apparatus 2. Specifically, cyclic shift delay amount information extraction section 37 extracts cyclic shift delay amount information from the control information processed by demodulation/decoding section 33, and outputs this to cyclic shift delay adding section 18.

In other words, of the control information from demodulation/decoding section 33, pilot signal information, frequency scheduling information, and cyclic shift delay amount information are output respectively to pilot signal information extraction section 35, frequency scheduling information extraction section 36, and cyclic shift delay amount information extraction section 37. Also, of the control information, MCS information, pilot signal information, and frequency scheduling information are output respectively to MCS information extraction section 34, pilot signal information extraction section 35, and frequency scheduling information extraction section 36.

When baseband signals from a plurality of antennas are input to demodulation/decoding section 33, maximal-ratio combining reception processing is performed on the respective signals. This is done to improve reception quality. Radio communication apparatus 1 shown in FIG. 1 illustrates a configuration for reception by two antennas, but this is not a limitation, and single-antenna reception or 3-antenna reception may also be used.

Base station apparatus 2 will now be described.

In base station apparatus 2 shown in FIG. 2, receiving radio processing section 50 executes amplification processing, band-limiting processing, and frequency conversion processing on a high-frequency signal received by antenna 100, and outputs a complex baseband signal comprised of an in-phase signal and quadrature signal.

OFDM demodulation section 51 executes OFDM demodulation on the input baseband signals. That is to say, after time and frequency synchronization processing, OFDM demodulation section 51 performs GI (Guard Interval) removal, FFT (Fast Fourier Transform) processing, and serial/parallel conversion processing, and outputs the resulting signals to control information extraction section 52 and pilot signal extraction section 70.

Control information extraction section 52 extracts control information including scheduling request information for user data transmission transmitted from radio communication apparatus 1 from the received signal input from OFDM demodulation section 51, and outputs this to demodulation/decoding section 53.

Demodulation/decoding section 53 performs demodulation processing and decoding processing on the control information input from control information extraction section 52. Of the control information, demodulation/decoding section 53 outputs scheduling request information to resource block size deciding section 54. At this time, scheduling request information includes scheduling request information of plurality of radio communication apparatuses 1-1 through N under base station apparatus 2.

Resource block size deciding section 54 decides a number of subcarriers to be allocated to a communication-counterpart radio communication apparatus. Specifically, resource block size deciding section 54 decides a frequency resource size for uplink user data transmission based on scheduling request information, and outputs this to cyclic shift delay amount deciding section 55. Resource block size deciding section 54 decides a partial band width used for user data transmission by radio communication apparatus 1 by performing frequency scheduling using sharing with other users' radio communication apparatuses 1, the amount of transmit data transmitted from applicable radio communication apparatus 1, the transmit data QoS, the response speed with respect to transmit data, and so forth.

Here, the frequency resource block size (resource size: "RB size") corresponds to the number of subcarriers when user data mapping is performed by subcarrier mapping section 15 in radio communication apparatus 1.

Cyclic shift delay amount deciding section 55 sets a cyclic shift delay amount to be used when radio communication apparatus 1 performs cyclic shift delay diversity transmission of a channel quality measurement signal or user data according to the number of subcarriers decided by resource block size deciding section 54.

Specifically, cyclic shift delay amount deciding section 55 decides a cyclic shift delay amount based on the frequency resource size, and outputs this to channel quality measurement band selecting section 56 and control information generation section 57. In other words, cyclic shift delay amount deciding section 55 decides and outputs a cyclic shift delay time (cyclic shift delay amount) so that a block size unit provided with the partial band width decided by resource block size deciding section 54 is decided at a minimum of one cycle.

Channel quality measurement band selecting section 56 selects a channel quality measurement band to be used when radio communication apparatus 1 transmits a channel quality measurement signal in accordance with the cyclic shift delay amount set by cyclic shift delay amount deciding section 55. Channel quality measurement band selecting section 56 varies the bandwidth of the selected channel quality measurement band according to the inverse of the cyclic shift delay amount at the time of cyclic shift delay diversity transmission.

Specifically, channel quality measurement band selecting section 56 performs scheduling based on an input frequency resource size, decides a channel quality measurement partial band in which a channel quality measurement pilot signal is transmitted in an uplink, and outputs this to control information generation section 57. Channel quality measurement band selecting section 56 decides whether a width for CQI measurement is at least made to match a frequency width decided together with a delay amount decision, or is made wider. Together with this, channel quality measurement band selecting section 56 also decides the absolute position of a CQI measurement band.

Here, cyclic shift delay amount deciding section 55 decides cyclic shift delay time (cyclic shift delay amount) r by means of the following kind of method.

Figure 4:
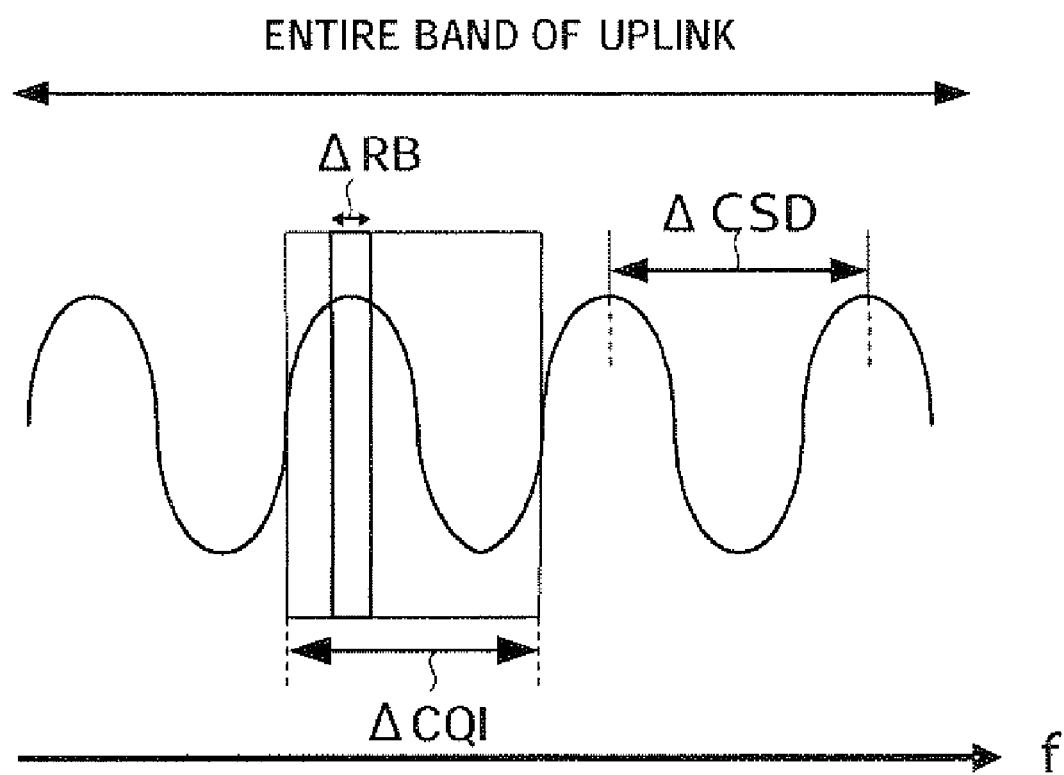
FIG. 4 is a drawing explaining a cyclic shift delay amount and channel quality measurement band selection method in Embodiment 1 of the present invention.

First, cyclic shift delay amount $\tau$ is decided based on the RB size to be allocated ($\Delta$RB). FIG. 4 is a drawing showing the relationship between the RB size to be allocated ($\Delta$RB), the cyclic shift delay amount ($\tau$), and channel quality measurement partial band $\Delta$CQI. FIG. 4 shows the channel frequency response at the time of CSD transmission, with a cyclic wave being generated in an originally flat channel by performing cyclic shift delay diversity transmission with a cyclic shift delay amount added. The positions of the peaks cyclically present in the channel frequency shown in FIG. 4 vary according to the cyclic shift delay amount (phase relationship). In FIG. 4, the width of $\Delta$RB is decided by resource block size deciding section 54, and the delay amount is decided by cyclic shift delay amount deciding section 55 so as to give the cycle shown by $\Delta$CSD. $\Delta$CQI is decided by channel quality measurement band selecting section 56 based on the CSD cycle decision.

Here, $\Delta$CSD means one cycle of a notch appearing in channel frequency response at the time of cyclic shift delay transmission (hereinafter referred to as "CSD transmission") using the cyclic shift delay amount ($\tau$). Here, $\Delta$CSD is made considerably larger than $\Delta$RB.

For example, $\Delta$CSD is decide so as to satisfy the relationship $\Delta$CSD=$\alpha\Delta$RB where $\alpha$=2 to 10, and finally the cyclic shift delay amount ($\tau$) is decided as shown by $\tau$=1/($\alpha\Delta$RB).

For coefficient $\alpha$, 1) a fixed value may be set, or 2) varying control may be applied, as shown below.

Figure 11:
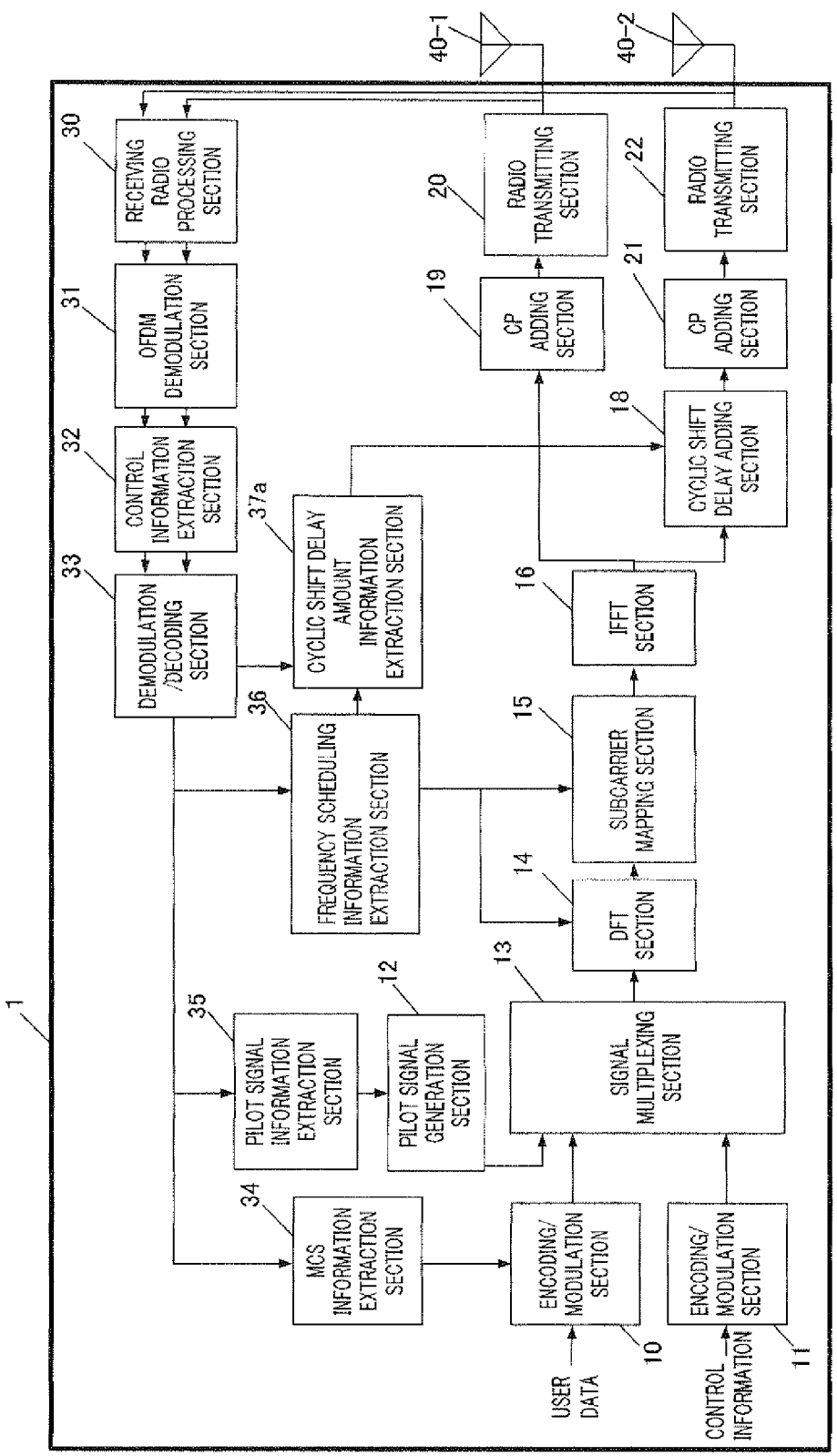
FIG. 11 is a block diagram showing another example of a radio communication apparatus according to Embodiment 1 of the present invention.

1) When coefficient $\alpha$ is always a fixed value, $\Delta$RB and the cyclic shift delay amount ($\tau$) can be calculated from the above relationship based on $\Delta$CSD. Consequently, it is no longer necessary for information relating to the cyclic shift delay amount ($\tau$) to be transmitted from the base station apparatus, and data transmission efficiency can be increased by reducing the amount of information in a control signal. In this case, the configuration in FIG. 1 can be made the kind of configuration shown in FIG. 11 in order for the cyclic shift delay amount (τ) to be calculated based on ΔCSD in a radio communication apparatus. FIG. 11 is a drawing showing another example of a radio communication apparatus according to Embodiment 1. That is to say, based on the output of frequency scheduling information extraction section 36, cyclic shift delay amount information extraction section 37a calculates ΔRB based on ΔCSD, calculates the cyclic shift delay amount (τ), and outputs the result to cyclic shift delay adding section 18.

2) When coefficient α is made variable, coefficient α is controlled depending on the number of other radio communication apparatuses performing multiple access, for example. That is to say, if the number of other radio communication apparatuses performing multiple access is small, control is applied to give a larger coefficient α. By this means, when the number of other radio communication apparatuses performing multiple access is comparatively small, a higher-quality subcarrier can be allocated to user data transmission by making ΔCSD larger, and an improvement in frequency utilization efficiency can be achieved.

With regard to the cyclic shift delay amount (τ), the delay-adding circuit configuration in the cyclic shift delay adding section can be simplified by providing delay in IFFT section 64 output signal sampling interval units. In this case, a cyclic shift delay amount is provided as shown in Equation (1) below.

[1]

$$\tau = (N_{fft}/\alpha N_{rb})T_s \quad \text{(Equation 1)}$$

where Nfft is the FFT size in the IFFT section, Nrb is the number of subcarriers included in ΔRB, and Ts is the sampling interval [s].

If (Nfft/αNrb) is not an integer value, rounding processing such as rounding-up or rounding-down processing can be performed so that cyclic shift delay amount τ becomes an integral multiple of sampling interval Ts.

In channel quality measurement band selecting section 56, channel quality measurement partial band ΔCQI is made greater than or equal to ΔCSD (ΔCQI≧ΔCSD) using information input from cyclic shift delay amount deciding section 55. By making ΔCQI greater than or equal to ΔCSD in this way, a base station apparatus can perform uplink channel quality measurement across a frequency range of at least one cycle of a notch appearing in channel frequency response at the time of CSD transmission.

By this means, base station apparatus 2 can be sure to include a good band in which channel quality fluctuation attains a maximum value within a channel quality measurement partial band.

By means of the above, base station apparatus 2 can decide a cyclic shift delay amount (τ) and the bandwidth of channel quality measurement partial band ΔCQI. Finally, ΔCQI allocation is set arbitrarily by base station apparatus 2. Alternatively, base station apparatus 2 allocates a specific partial frequency, reflecting the result of frequency scheduling with other radio communication apparatuses 1, as ΔCQI.

This processing is particularly useful when frequency division is performed at the level of the bandwidth of channel quality measurement partial band ΔCQI and there is channel frequency response for which average power per different division band does not fluctuate greatly because of the property of periodicity appearing in a notch in channel frequency response at the time of CSD transmission. By this means, the degree of freedom of RB allocation can be increased.

Using cyclic shift delay amount deciding section 55 and channel quality measurement band selecting section 56 output, control information generation section 57 generates a control signal including 1) cyclic shift delay amount information and 2) channel quality measurement partial band information, and also including pilot signal information relating to a pilot signal transmitting method used for a channel quality measurement pilot signal, and outputs this to encoding/modulation section 60 as control information.

Also, using subcarrier allocation section 72 and MCS deciding section 73 output, control information generation section 57 generates a control signal including 1) frequency scheduling information and 2) MCS information, and outputs this to encoding/modulation section 60 as control information.

Encoding/modulation section 60 executes predetermined error correction encoding on control information comprised of a bit data sequence transmitted from radio communication apparatus 1 to base station apparatus 2, and generates a symbol data sequence signal using a modulation method with a predetermined Mary value (for example, BPSK modulation or QPSK modulation).

Here, the coding rate and M-ary value used when error correction encoding is performed are fixed beforehand. Control information is generally transmitted using BPSK modulation or QPSK modulation and a low coding rate since it requires high-quality transmission Encoding/modulation section 61 executes predetermined error correction encoding on user data comprised of a bit data sequence transmitted from radio communication apparatus 1 to base station apparatus 2, generates a symbol data sequence signal using a modulation method with a predetermined M-ary value (for example, QPSK, 16QAM, or 64QAM modulation), and outputs this signal to signal multiplexing section 62.

Signal multiplexing section 62 multiplexes input from encoding/modulation section 60 and encoding/modulation section 61. Multiplexing is performed using a TDM, FDM, or CDM multiplexing method or a combination of these, and the result is output to subcarrier mapping section 63 as a frequency data block.

Subcarrier mapping section 63 maps a frequency data block that is signal multiplexing section 62 output onto a specific subcarrier (hereinafter referred to as "subcarrier mapping"), and performs output to IFFT section 64.

Specifically, subcarrier mapping section 63 performs mapping using frequency scheduling information for the relevant radio communication apparatus 1 (information relating to subcarriers allocated at the time of downlink transmission [number of subcarriers, subcarrier numbers, and so forth]).

IFFT (Inverse Fast Fourier Transform) section 64 performs an inverse fast Fourier transform on subcarrier mapping section 63 output, and outputs the result to CP adding section 65.

CP adding section 65 inserts a guard interval using a CP (Cyclic Prefix) in transmit data input from IFFT section 64, and outputs the resulting data to radio transmitting section 66.

Radio transmitting section 66 performs up-conversion of transmit data input from CP adding section 65 from baseband frequency to radio frequency and so forth, and transmits the data from antenna 100.

On the other hand, pilot signal extraction section 70 extracts a channel quality measurement signal transmitted from radio communication apparatus 1. Specifically, pilot signal extraction section 70 extracts a channel quality measurement pilot signal transmitted from radio communication apparatus 1 from a received signal input from OFDM demodulation section 51, and outputs this to reception quality measuring section 71.

Reception quality measuring section 71 measures per-subcarrier reception quality based on pilot signal extraction section 70 output. Specifically, reception quality measuring section 71 measures per-subcarrier reception quality within a channel quality measurement partial band using an input channel quality measurement pilot signal, and outputs the results to subcarrier allocation section 72. Using a pilot signal, an arbitrary measured value such as a CIR (Carrier to Interference Ratio), SIR (Signal to Interference Ratio), or SNR (Signal to Noise Ratio) is used as this channel quality.

If base station apparatus 2 has a plurality of receiving antennas, receiving radio processing section 50, OFDM demodulation section 51, and pilot signal extraction section 70 are provided for each antenna, and reception quality measurement is performed using per-antenna channel quality measurement pilot signal reception results. That is to say, a CIR, SNR, or SIR measured value is used based on combined signal power that combines the power of signal components received by each antenna. Also, base station apparatus 2 here has plurality N received signal processing sections 200 including control information extraction section 52, demodulation/decoding section 53, pilot signal extraction section 70, and reception quality measuring section 71. If a signal demodulated by OFDM demodulation section 51 in base station apparatus 2d includes signals transmitted by plurality of radio communication apparatuses 1d-1 through N, received signal processing sections separately perform the above-described processing for each radio communication apparatus in the N received signal processing sections 200. Specifically, received signal processing section 200-k performs the above-described processing for k'th radio communication apparatus 1d-k.

Subcarrier allocation section 72 allocates a subcarrier to radio communication apparatus 1 using reception quality measured by reception quality measuring section 71. Specifically, subcarrier allocation section 72 performs scheduling based on a scheduling algorithm using an RB size from resource block size deciding section 54 based on per-subcarrier channel quality information of each user's radio communication apparatus input from reception quality measuring section 71, and outputs the result to MCS deciding section 73 and control information generation section 57.

That is to say, subcarrier allocation section 72 ascertains the RB size allocated to each user's radio communication apparatus—that is, the usable number of subcarriers—decided by resource block size deciding section 54, and performs selection and allocation within the RB size range so that a subcarrier used in an uplink in which user data is transmitted from each radio communication apparatus 1 has good reception quality.

As subcarrier allocation by subcarrier allocation section 72 at this time, either the localized type or distributed type shown in FIG. 3 is used when SC-FDMA is used. When OFDM, not SC-FDMA, is used, subcarrier allocation section 72 can perform any kind of subcarrier allocation. Then information on subcarriers allocated to radio communication apparatuses 1-1 through N by subcarrier allocation section 72 is output to MCS deciding section 73 and control information generation section 57 as frequency scheduling information.

MCS deciding section 73 adaptively selects an MCS comprised of an M-ary value, coding rate, and so forth, for each subcarrier or for each subcarrier block in which a plurality of subcarriers have been made a set based on frequency scheduling information and related channel quality information in subcarrier allocation section 72, and outputs this to control information generation section 57.

That is to say, MCS deciding section 73 can determine the reception quality of each subcarrier allocated to radio communication apparatuses 1-1 through N from per-subcarrier channel quality information sent from radio communication apparatuses 1-1 through N of each user. By this means, MCS deciding section 73 selects an MCS in accordance with the reception quality of each subcarrier of radio communication apparatuses 1-1 through N. Then MCS deciding section 73 outputs an M-ary value and coding rate information selected for each subcarrier to control information generation section 57 as MCS information.

Next, using FIG. 1 and FIG. 2, detailed descriptions will be given in turn of the operation of radio communication apparatus 1 having the above configuration and base station apparatus 2 serving as a host apparatus for radio communication apparatus 1 in communication procedure (1) through communication procedure (4).

<Operation of Radio Communication Apparatus 1 in Communication Procedure (1)>

In radio communication apparatus 1, encoding/modulation section 11 executes predetermined error correction encoding on control information comprised of a bit data sequence transmitted from radio communication apparatus 1 to base station apparatus 2, and also generates a symbol data sequence signal using a M-ary value and modulation method.

Here, the coding rate and M-ary value used when error correction encoding is performed are fixed beforehand. Control information is generally transmitted using BPSK modulation or QPSK modulation and a low coding rate since it requires high-quality transmission. Control information includes scheduling request information for user data transmission using an uplink.

Pilot signal generation section 12 generates a pilot signal that is a signal sequence known beforehand to base station apparatus 2, and outputs this to signal multiplexing section 13. Here, a signal sequence used in a pilot signal is set based on the output of pilot signal information extraction section 35 that extracts pilot signal information from a control signal transmitted from base station apparatus 2, and an extracted pilot signal includes a channel estimation pilot signal for demodulating and decoding control information.

Input from encoding/modulation section 11 and pilot signal generation section 12 is multiplexed by signal multiplexing section 13 using a TDM, FDM, or CDM multiplexing method or a combination of these, and is output to DFT section 14.

DFT section 14 performs S/P conversion and a discrete Fourier transform on signal multiplexing section 13 output for each predetermined-number symbol number $N_{DFT}$ block unit (hereinafter referred to as symbol data block), and outputs the result to subcarrier mapping section 15. By means of this processing, a time-domain symbol data block is converted to a frequency data block comprised of a frequency-domain complex number.

Predetermined-number symbol number $N_{DFT}$ is decided based on frequency scheduling information (information [number of subcarriers, subcarrier numbers, and so forth] relating to subcarriers allocated for uplink scheduling request information transmission) corresponding to the relevant radio communication apparatus 1, input from frequency scheduling information extraction section 36.

Subcarrier mapping section 15 performs subcarrier mapping of a frequency data block that is DFT section 14 output based on frequency scheduling information (information [number of subcarriers, subcarrier numbers, and so forth] relating to subcarriers allocated for uplink scheduling request information transmission) corresponding to the relevant radio communication apparatus 1, input from frequency scheduling information extraction section 36.

IFFT (Inverse Fast Fourier Transform) section 16 performs an inverse fast Fourier transform on subcarrier mapping section 15 output, and outputs the result to CP adding section 19 and cyclic shift delay adding section 18.

CP adding section 19 inserts a guard interval using a CP in transmit data input from IFFT section 16 and outputs the resulting data to radio transmitting section 20, and radio transmitting section 20 performs up-conversion of transmit data input from CP adding section 19 from baseband frequency to radio frequency and so forth, and transmits the data from antenna 40-1.

Cyclic shift delay adding section 18 adds a predetermined cyclic shift delay amount to the signal input from IFFT section 16, and outputs the resulting signal to CP adding section 21. Since the cyclic shift delay amount has not been decided by the base station apparatus at this stage, cyclic shift delay adding section 18 sets the cyclic shift delay amount to a predetermined value known beforehand. This cyclic shift delay amount may be transmitted from only one antenna 40-1 and not be transmitted from antenna 40-2. If transmission is performed from only one antenna 40-1, the following processing by CP adding section 21 and radio transmitting section 22 is unnecessary.

CP adding section 21 inserts a guard interval using a CP in transmit data input from cyclic shift delay adding section 18 and outputs the resulting data to radio transmitting section 20, and the transmit data is up-converted from baseband frequency to radio frequency and so forth by radio transmitting section 22, and transmitted from antenna 40-2.

In this way, radio communication apparatus 1 issues a scheduling request for uplink user data transmission to base station apparatus 2.

<Operation of Base Station Apparatus 2 in Communication Procedure (2)>

In base station apparatus 2 shown in FIG. 2 that receives data transmitted from radio communication apparatus 1 by means of communication procedure (1), receiving radio processing section 50 executes amplification processing, band-limiting processing, and frequency conversion processing on a high-frequency signal received by antenna 100, and outputs a complex baseband signal comprised of an in-phase signal and quadrature signal.

Then OFDM demodulation section 51 executes time and frequency synchronization processing, followed by OFDM demodulation such as GI removal, FFT processing, and serial/parallel conversion processing, on the input baseband signals.

Control information extraction section 52 then extracts control information including scheduling request information for user data transmission transmitted from radio communication apparatus 1 from the received signal input from OFDM demodulation section 51, and outputs this to demodulation/decoding section 53.

Demodulation/decoding section 53 performs demodulation processing and decoding processing on the control information input from control information extraction section 52, and outputs the control information. Of this, scheduling request information is output to resource block size deciding section 54. At this time, scheduling request information includes scheduling request information of plurality of radio communication apparatuses 1-1 through N under the base station apparatus.

Resource block size deciding section 54 decides an RB size for uplink user data transmission (corresponding to the number of subcarriers when user data mapping is performed by subcarrier mapping section 15 in radio communication apparatus 1) based on the scheduling request information.

Cyclic shift delay amount deciding section 55 decides a cyclic shift delay time based on the RB size, and outputs this to channel quality measurement band selecting section 56 and control information generation section 57.

Channel quality measurement band selecting section 56 decides a channel quality measurement band for transmitting a channel quality measurement signal in an uplink based on the RB size.

Cyclic shift delay time τ, channel quality measurement partial band ΔCQI, and channel quality measurement partial band ΔCQI allocation are decided using the methods described above with reference to FIG. 4.

Using cyclic shift delay amount deciding section 55 and channel quality measurement band selecting section 56 output, control information generation section 57 generates a control signal including 1) cyclic shift delay amount information and 2) channel quality measurement partial band information, and also including pilot signal information relating to a pilot signal transmitting method used for a channel quality measurement pilot signal, and outputs this to encoding/modulation section 60.

Encoding/modulation section 60 executes predetermined error correction encoding on control information comprised of a bit data sequence transmitted from radio communication apparatus 1 to base station apparatus 2, and generates a symbol data sequence signal using a modulation method with a predetermined M-ary value and outputs this to signal multiplexing section 62. Control information is generally transmitted using BPSK modulation or QPSK modulation and a low coding rate since it requires high-quality transmission.

Encoding/modulation section 61 executes predetermined error correction encoding on user data comprised of a bit data sequence transmitted from radio communication apparatus 1 to base station apparatus 2, and generates a symbol data sequence signal using a modulation method with a predetermined M-ary value (for example, QPSK, 16QAM, or 64QAM modulation).

Signal multiplexing section 62 multiplexes input from encoding/modulation section 60 and encoding/modulation section 61 using a TDM, FDM, or CDM multiplexing method or a combination of these, and outputs the resulting data.

Subcarrier mapping section 63 performs subcarrier mapping of a frequency data block that is signal multiplexing section 62 output onto a specific subcarrier based on frequency scheduling information (information [number of subcarriers, subcarrier numbers, and so forth] relating to subcarriers allocated for downlink transmission) corresponding to radio communication apparatus 1.

IFFT section 64 performs an inverse fast Fourier transform on subcarrier mapping section 63 output and outputs the result to CP adding section 65, and CP adding section 65 inserts a guard interval using a CP in transmit data input from IFFT section 64, and outputs the resulting data to radio transmitting section 66.

Radio transmitting section 66 performs up-conversion of transmit data input from CP adding section 65 from baseband frequency to radio frequency and so forth, and transmits the data from antenna 100.

In this way, base station apparatus 2, after receiving a scheduling request for uplink user data transmission from radio communication apparatus 1, transmits frequency scheduling information including a band for measuring a CQI, cyclic shift delay amount information, and channel quality measurement pilot signal information. A band for measuring a CQI is wider than an actually allocated band. Cyclic shift delay amount information is used when cyclic shift delay diversity transmission (CSD) is performed by radio communication apparatus 1.

<Operation of Radio Communication Apparatus 1 in Communication Procedure (3)>

In radio communication apparatus 1, transmit data from base station apparatus 2 is received via antennas 40, and processing is performed by receiving radio processing section 30.

To be more specific, in radio communication apparatus 1, receiving radio processing section 30 executes amplification processing, band-limiting processing, and frequency conversion processing on high-frequency signals received by antennas 40, and outputs a complex baseband signal comprised of an in-phase signal and quadrature signal.

OFDM demodulation section 31 executes time and frequency synchronization processing, followed by OFDM demodulation such as GI removal, FFT processing, and serial/parallel conversion processing, on the input baseband signals.

Control information extraction section 32 extracts control information including pilot signal information, channel quality measurement partial band information, and cyclic shift delay amount information from the received signal input from OFDM demodulation section 31, and outputs this to demodulation/decoding section 33.

Demodulation/decoding section 33 performs demodulation processing and decoding processing on the control information input from control information extraction section 32, and outputs pilot signal information, frequency scheduling information, and cyclic shift delay amount information as control information to pilot signal information extraction section 35, frequency scheduling information extraction section 36, and cyclic shift delay amount information extraction section 37, respectively.

Pilot signal generation section 12 generates a pilot signal that is a signal sequence known beforehand to base station apparatus 2, and outputs this to signal multiplexing section 13. Here, a signal sequence used in a pilot signal is set based on the output of pilot signal information extraction section 35 that extracts pilot signal information relating to channel quality measurement use from a control signal transmitted from base station apparatus 2.

Localized placement or distributed placement is used for channel quality measurement pilot signal subcarrier placement as shown in FIG. 3. FDM, CDM, or TDM is used for multiplexing of a channel quality measurement pilot signal of another radio communication apparatus at this time. Also, FDM, CDM, or TDM is used for user data multiplexing with a demodulation pilot signal.

Signal multiplexing section 13 multiplexes input from pilot signal generation section 12 using a TDM, FDM, or CDM multiplexing method, or a combination of these, and outputs the result to DFT section 14.

DFT section 14 performs S/P conversion and a discrete Fourier transform on signal multiplexing section 13 output for each predetermined-number symbol number $N_{DFT}$ block unit (symbol data block), and outputs the result to subcarrier mapping section 15. By means of this processing, a time-domain symbol data block is converted to a frequency data block comprised of a frequency-domain complex number. Predetermined-number symbol number $N_{DFT}$ is decided based on frequency scheduling information (information [number of subcarriers, subcarrier numbers, and so forth] relating to subcarriers relating to the position and bandwidth of a partial band relating to a channel quality measurement partial band selected by the base station apparatus) corresponding to the relevant radio communication apparatus 1, input from frequency scheduling information extraction section 36.

Subcarrier mapping section 15 maps a frequency data block that is DFT section 14 output onto a specific subcarrier (that is, performs subcarrier mapping). In subcarrier mapping here, mapping is performed based on frequency scheduling information (information [number of subcarriers, subcarrier numbers, and so forth] relating to subcarriers relating to the position and bandwidth of a partial band relating to a channel quality measurement partial band selected by the base station apparatus) corresponding to the relevant radio communication apparatus 1, input from frequency scheduling information extraction section 36. Mapping is performed by means of the two kinds of mapping methods used when mapping onto subcarriers shown in FIG. 3.

IFFT section 16 performs an inverse fast Fourier transform on subcarrier mapping section 15 output, and outputs the result to CP adding section 19 and cyclic shift delay adding section 18.

CP adding section 19 inserts a guard interval using a CP in transmit data input from IFFT section 16 and outputs the resulting data to radio transmitting section 20, and radio transmitting section 20 performs up-conversion of the input transmit data from baseband frequency to radio frequency and so forth, and transmits the data from antenna 40-1.

Cyclic shift delay adding section 18 outputs a signal in which a predetermined cyclic shift delay amount has been added to the signal input from IFFT section 16. Here, the cyclic shift delay amount is decided by the base station apparatus, is included in control information transmitted from the base station apparatus, and is input from cyclic shift delay amount information extraction section 37.

CP adding section 21 inserts a guard interval using a CP in transmit data input from cyclic shift delay adding section 18 and outputs the resulting data to radio transmitting section 20, and the transmit data is up-converted from baseband frequency to radio frequency and so forth by radio transmitting section 22, and transmitted via antenna 40-2.

In this way, radio communication apparatus 1 transmits a channel quality measurement signal in a specified partial band using frequency scheduling information, cyclic shift delay amount information, and channel quality measurement signal information from base station apparatus 2, using the respective configuration elements.

<Operation of Base Station Apparatus 2 in Communication Procedure (4)>

In base station apparatus 2, receiving radio processing section 50 executes amplification processing, band-limiting processing, and frequency conversion processing on a high-frequency signal received by antenna 100, and outputs a complex baseband signal comprised of an in-phase signal and quadrature signal.

OFDM demodulation section 51 executes time and frequency synchronization processing, followed by OFDM demodulation processing such as GI removal, FFT processing, and serial/parallel conversion processing, on the input baseband signals.

Pilot signal extraction section 70 extracts a channel quality measurement pilot signal transmitted from radio communication apparatus 1 from a received signal input from OFDM demodulation section 51, and outputs this to reception quality measuring section 71.

Reception quality measuring section 71 measures per-subcarrier reception quality within a channel quality measurement partial band using the input channel quality measurement pilot signal, and outputs the results to subcarrier allocation section 72. An arbitrary measured value such as a CIR, SIR or SNR can be used as the channel quality. If the base station apparatus has a plurality of receiving antennas, receiving radio processing section 50, OFDM demodulation section 51, and pilot signal extraction section 70 are provided for each antenna, and reception quality measurement is performed using per-antenna channel quality measurement pilot signal reception results. That is to say, a CIR, SNR, or SIR measured value is used based on combined signal power that combines the power of signal components received by each antenna.

Subcarrier allocation section 72 performs scheduling based on a scheduling algorithm from per-subcarrier channel quality information of each user's radio communication apparatus input from reception quality measuring section 71.

That is to say, subcarrier allocation section 72 ascertains the RB size allocated to each user's radio communication apparatus—that is, the usable number of subcarriers—decided by resource block size deciding section 54, and performs selection and allocation within the RB size range so that a subcarrier used in an uplink in which user data is transmitted from each radio communication apparatus 1 has good reception quality.

As subcarrier allocation at this time, either the localized type or distributed type shown in FIG. 3 is used when SC-FDMA is used. When OFDM, not SC-FDMA, is used, any kind of subcarrier allocation is possible. Then information on subcarriers allocated to radio communication apparatuses 1-1 through N by the subcarrier allocation section is output as frequency scheduling information.

MCS deciding section 73 adaptively selects an MCS comprised of an M-ary value, coding rate, and so forth, for each subcarrier or for each subcarrier block in which a plurality of subcarriers have been made a set based on frequency scheduling information and related channel quality information in subcarrier allocation section 72.

Based on subcarrier allocation section 72 and MCS deciding section 73 output, control information generation section 57 generates 1) frequency scheduling information and 2) control information including MCS information.

Encoding/modulation section 60, encoding/modulation section 61, signal multiplexing section 62, subcarrier mapping section 63, IFFT section 64, CP adding section 65, and radio transmitting section 66 perform the same kind of operations as described above, and transmit to radio communication apparatuses 1-1 through N from antenna 100.

In this way, base station apparatus 2 measures channel quality using a channel quality measurement signal from radio communication apparatus 1, and using this result, transmits frequency scheduling information including frequency resource block size (also referred to as "RB size") ΔRB indicating a position and bandwidth that decide an actual partial band used when a user actually transmits data, and MCS information.

<Operation of Radio Communication Apparatus 1 in Communication Procedure (5)>

In radio communication apparatus 1, receiving radio processing section 30 executes amplification processing, band-limiting processing, and frequency conversion processing on high-frequency signals received by antennas 40, and outputs a complex baseband signal comprised of an in-phase signal and quadrature signal.

OFDM demodulation section 31 executes time and frequency synchronization processing, followed by OFDM demodulation such as GI removal, FFT processing, and serial/parallel conversion processing, on the input baseband signals.

Control information extraction section 32 extracts control information including MCS information and pilot signal information transmitted from base station apparatus 2 from the received signal input from OFDM demodulation section 31, and outputs this to demodulation/decoding section 33.

Demodulation/decoding section 33 performs demodulation processing and decoding processing on the control information input from control information extraction section 32, and outputs control information. Of this, MCS information, pilot signal information, and frequency scheduling information are extracted using MCS information extraction section 34, pilot signal information extraction section 35, and frequency scheduling information extraction section 36, respectively. When baseband signals from a plurality of antennas are input to demodulation/decoding section 33, maximal-ratio combining reception processing is performed on the respective signals. This is done to improve reception quality. Single-antenna reception or 3-antenna reception may also be used instead of 2-antenna reception.

Encoding/modulation section 10 executes predetermined error correction encoding on user data comprised of a bit data sequence to be transmitted from radio communication apparatus 1 to base station apparatus 2, and generates a symbol data sequence signal using a modulation method with a pre-determined M-ary value (for example, QPSK, 16QAM, or 64QAM modulation). Here, MCS information relating to the coding rate and M-ary value when error correction encoding is performed is set based on the output of MCS information extraction section 34 that extracts MCS information from a control signal transmitted from base station apparatus 2. Adaptive modulation conforming to channel conditions is made possible by this setting.

Encoding/modulation section 11 executes predetermined error correction encoding on a control signal comprised of a bit data sequence to be transmitted from radio communication apparatus 1 to base station apparatus 2, and generates a symbol data sequence signal using a modulation method with a predetermined M-ary value (for example, BPSK modulation or QPSK modulation). Here, the coding rate and M-ary value used when error correction encoding is performed are fixed beforehand. Control information is generally transmitted using BPSK modulation or QPSK modulation and a low coding rate since it requires high-quality transmission.

Pilot signal generation section 12 generates a pilot signal that is a signal sequence known beforehand to base station apparatus 2, and outputs this to signal multiplexing section 13. Here, a signal sequence used in a pilot signal is set based on the output of pilot signal information extraction section 35 that extracts pilot signal information from a control signal transmitted from base station apparatus 2. A pilot signal here includes a channel estimation pilot signal for demodulating and decoding user data.

Signal multiplexing section 13 multiplexes input from encoding/modulation section 10, encoding/modulation section 11, and pilot signal generation section 12. Multiplexing is performed using a TDM, FDM, or CDM multiplexing method, or a combination of these.

DFT section 14 performs S/P conversion and a discrete Fourier transform of the data format for each predetermined-number symbol number $N_{DFT}$ block unit (symbol data block) for signal multiplexing section 13 output, and inputs the resulting data to subcarrier mapping section 15. By this means, a time-domain symbol data block is converted to a frequency data block comprised of a frequency-domain complex number.

Predetermined-number symbol number $N_{DFT}$ is decided based on frequency scheduling information (information

[number of subcarriers, subcarrier numbers, and so forth] relating to subcarriers allocated for uplink user data transmission) corresponding to the relevant radio communication apparatus 1, input from frequency scheduling information extraction section 36.

Subcarrier mapping section 15 maps a frequency data block that is DFT section 14 output onto a specific subcarrier (that is, performs subcarrier mapping). In subcarrier mapping here, mapping is performed based on frequency scheduling information (information [number of subcarriers, subcarrier numbers, and so forth] relating to subcarriers allocated for uplink user data transmission) corresponding to the relevant radio communication apparatus 1, input from frequency scheduling information extraction section 36. When mapping onto subcarriers, either of the two kinds of mapping methods shown in FIG. 3 is used.

IFFT section 16 performs an inverse fast Fourier transform on subcarrier mapping section 15 output, and outputs the result to CP adding section 19 and cyclic shift delay adding section 18.

CP adding section 19 inserts a guard interval using a CP in transmit data input from IFFT section 16 and outputs the resulting data to radio transmitting section 20.

Radio transmitting section 20 performs up-conversion of the transmit data input from CP adding section 19 from baseband frequency to radio frequency and so forth, and transmits the data from antenna 40-1.

Cyclic shift delay adding section 18 outputs a signal in which a predetermined cyclic shift delay amount has been added to the signal input from IFFT section 16. Here, the cyclic shift delay amount is decided by the base station apparatus, the cyclic shift delay amount included in control information transmitted from the base station apparatus in communication procedure (3) and input from cyclic shift delay amount information extraction section 37 is held, and the same cyclic shift delay amount is used when user data transmission is performed.

CP adding section 21 inserts a guard interval using a CP in transmit data input from cyclic shift delay adding section 18, and outputs the resulting data to radio transmitting section 22.

Radio transmitting section 22 performs up-conversion of transmit data input from CP adding section 21 from baseband frequency to radio frequency and so forth, and transmits the data from antenna 40-2.

In this way, based on frequency scheduling information including frequency resource size $\Delta RB$ and MCS information reception frequency base station apparatus 2, radio communication apparatus 1 transmits user data using a subcarrier allocated according to frequency resource block size $\Delta RB$.

As described above, in Embodiment 1, radio communication apparatus 1, on the premise that it is possible for radio communication apparatus 1 to perform multi-antenna transmission, causes CSD (Cyclic Shift Delay Diversity) transmission to be performed at the time of channel quality measurement pilot transmission and user data transmission on an uplink from a radio communication apparatus. By performing CSD transmission in this way, periodicity appears in channel frequency response.

To be more specific, there is a property whereby when cyclic shift delay amount $\tau$ is large, the channel frequency response repetition cycle in CSD transmission ($\Delta CSD=1/\tau$) decreases, and when cyclic shift delay amount $\tau$ is small, the channel frequency response repetition cycle in CSD transmission increases.

In this embodiment, the cyclic shift delay amount $\tau$ setting at this time is varied depending on the RB size, and a channel quality measurement partial band is decided in line with this.

That is to say, by making channel quality measurement partial band $\Delta CQI$ greater than or equal to $\Delta CSD$, a base station apparatus performs uplink channel quality measurement across a frequency band greater than or equal to one cycle of a notch appearing in channel frequency response in CSD transmission, and a good band for which channel quality fluctuation has an extremely large value can be included without fail in a channel quality measurement partial band.

By this means, base station apparatus 2 can perform frequency scheduling for radio communication apparatus 1 using a comparatively good partial band of a channel, and furthermore, by performing adaptive modulation conforming to the channel conditions, throughput can be improved and frequency utilization efficiency can be increased in a radio communication system.

Also, since a channel quality measurement signal is transmitted only once using part of a band, a reduction in radio communication apparatus power consumption can be achieved.

Moreover, since partial band transmission power can be increased, an improvement in channel quality measurement accuracy can be achieved, and since channel quality measurement is possible by transmitting a channel quality measurement signal only once, the ability to track channel quality fluctuations is also high.

Furthermore, by utilizing the property whereby periodicity appears in channel frequency response in CSD transmission, setting can be performed so that a part for which channel quality is good is included without fail in a channel quality measurement partial band, and a position of a channel quality measurement partial band can be allocated arbitrarily, enabling the degree of freedom of frequency resource allocation to be increased.

According to the above base station apparatus configuration, a subcarrier used when transmitting a channel quality measurement signal by means of cyclic shift delay diversity transmission, and a cyclic shift delay amount corresponding to the relevant subcarrier, are transmitted to a radio communication apparatus. Consequently, cyclic shift delay diversity transmission of a channel quality measurement signal to a radio communication apparatus can be performed using part of a band. Also, since a channel quality measurement signal is transmitted to a radio communication apparatus by means of a partial band, radio communication apparatus transmission power can be increased, and an improvement in CQI measurement accuracy can be achieved.

Also, according to the above base station apparatus configuration, cyclic shift delay diversity transmission of a channel quality measurement signal to a radio communication apparatus can be performed only once using part of a band, and a reduction in radio communication apparatus power consumption can be achieved. Furthermore, since partial band transmission power can be increased for a radio communication apparatus, an improvement in CQI measurement accuracy can be achieved.

Also, since it is possible to perform CQI measurement by transmitting a channel quality measurement signal only once, the responsivity with respect to channel quality fluctuations is also high. Furthermore, since the property whereby periodicity appears in channel frequency response in CSD (Cyclic Shift Delay Diversity) transmission is utilized, setting can be performed so that a part for which channel quality is good is included without fail in a channel quality measurement partial band. Moreover, since a position of a channel quality measurement partial band can be allocated arbitrarily due to the property whereby periodicity appears in channel frequency response, the degree of freedom of frequency resource allocation can be increased.

If radio communication apparatus 1 is capable of transmission using three or more antennas, radio communication apparatus 1 having the above-described configuration can obtain the same kind of effect by transmitting while providing a cyclic shift delay amount such that a cyclic shift delay amount in an added cyclic shift delay adding section provided by a third or higher-numbered antenna does not exceed cyclic shift delay amount τ provided by cyclic shift delay adding section 18. Alternatively, Embodiment 1 may be applied after two antennas with high received electric field intensities have been selected beforehand by measuring the respective antenna received electric field intensities in a base station apparatus.

In Embodiment 1, a configuration has been shown in which information relating to a cyclic shift delay amount (τ) is transmitted from base station apparatus 2, and that information is extracted in radio communication apparatus 1, but information relating to above-described coefficient α may be transmitted instead of a cyclic shift delay amount (τ). The same kind of effect can be obtained by this means since ΔRB and a cyclic, shift delay amount (τ) can be calculated from coefficient α.

In Embodiment 1, FDD has been described as a duplex method, but application in an uplink using a TDD method is also possible in a similar way. In the case of a TDD system, it is also possible to use a CQI report in a downlink as uplink channel quality when channel fluctuation is sufficiently small by utilizing channel duality, but a problem in the case of a cellular system is that accurate reception quality estimation is difficult since interference differs in an uplink and a downlink. However, in Embodiment 1 this problem can be solved since frequency scheduling and MCS selection are performed on the basis of an uplink channel quality measurement signal. Thus, application to a cellular system is particularly beneficial.

In Embodiment 1, cyclic shift delay is performed in the time domain, but it is also possible for this to be implemented by performing frequency-domain phase rotation. That is to say, in Embodiment 1, a configuration has been described in which cyclic delay is provided by cyclic shift delay adding section 18 when CSD transmission is performed by radio communication apparatus 1, but this is not a limitation, and another possible method is to perform CSD transmission by providing phase rotation conforming to a cyclic shift delay amount in the frequency domain. This will be described as Embodiment 2.

(Embodiment 2)

Figure 5:
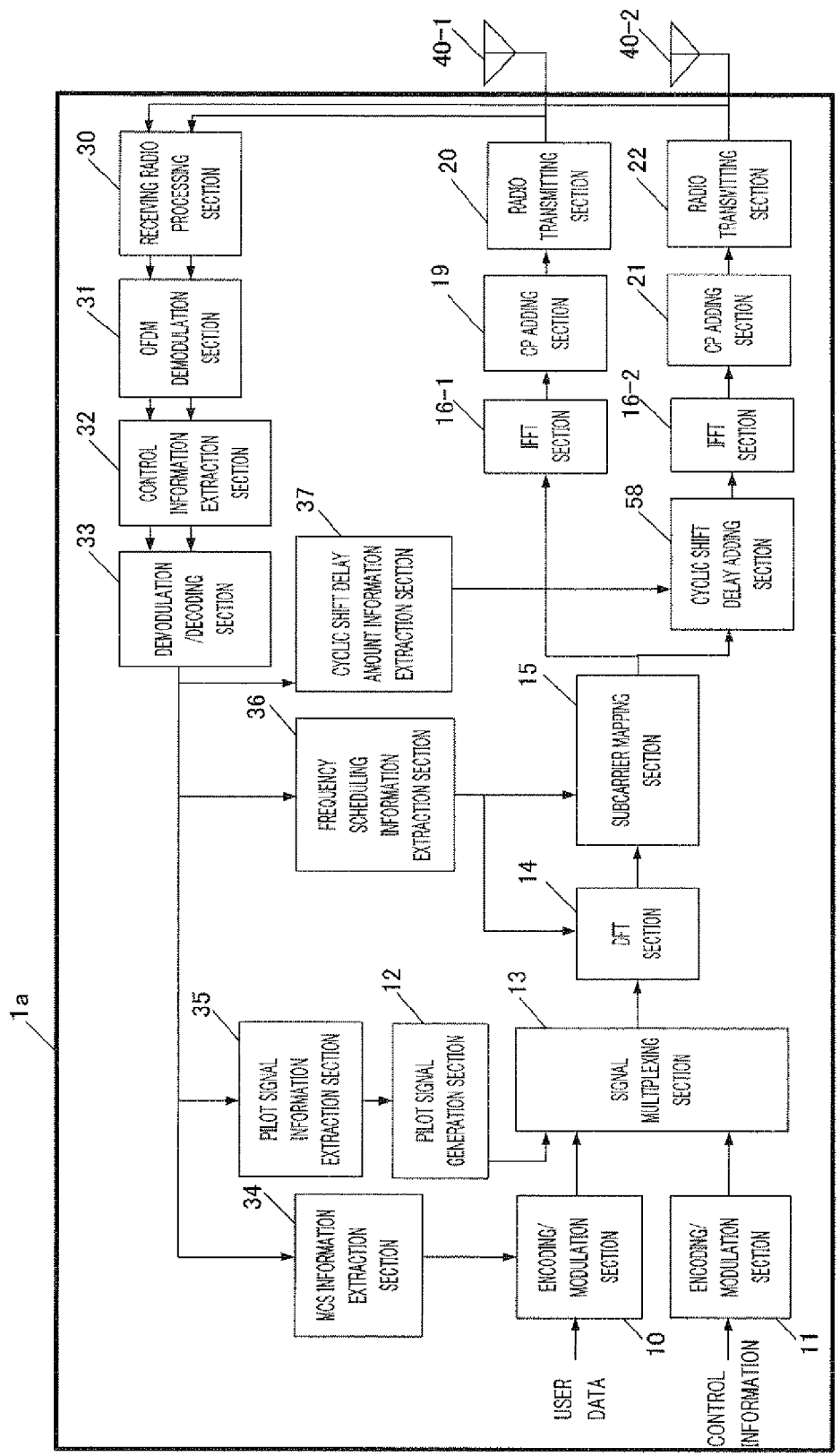
FIG. 5 is a block diagram showing the configuration of a radio communication apparatus according to Embodiment 2 of the present invention.

FIG. 5 is a drawing showing the configuration of radio communication apparatus 1a according to Embodiment 2. This radio communication apparatus 1a has a similar basic configuration to that of radio communication apparatus 1 according to Embodiment 1 shown in FIG. 1, and therefore identical configuration elements are assigned the same reference codes, descriptions thereof are omitted here, and only points of difference are described.

Radio communication apparatus 1a differs from radio communication apparatus 1 shown in FIG. 1 in using cyclic shift delay adding section 58 that provides phase rotation conforming to a cyclic shift delay amount in the frequency domain instead of cyclic shift delay adding section 18 that provides a cyclic delay in the time domain.

That is to say, cyclic shift delay adding section 58 provides phase rotation φ(k) that differs for each subcarrier, as shown in Equation (2) below, to subcarrier mapping section 15 output, and outputs the result to IFFT section 16-2.

[2]

$$\phi(k)=\exp(-j2\pi k\Delta_F\tau)$$ (Equation 2)

where τ indicates a cyclic shift delay amount, $\Delta_F$ indicates the subcarrier frequency interval [Hz], and k indicates an index number assigned to each subcarrier.

Regarding the index numbers, for example, an index corresponding to a DC subcarrier is taken as k=0, indices are incremented sequentially in the plus direction for frequencies on the positive side thereof, and indices are decremented sequentially in the minus direction for frequencies on the negative side thereof. In this case, indices are integer values in the range $-Nfft/2 \leq k \leq Nfft/2$. Nfft represents an PET size in IFFT section 16. The cyclic shift delay amount is decided by the base station apparatus, is included in control information transmitted from the base station apparatus, and is input from cyclic shift delay amount information extraction section 37.

According to Embodiment 2, the same kind of effects can be obtained as in radio communication apparatus 1 of Embodiment 1.

(Embodiment 3)

Figure 6:
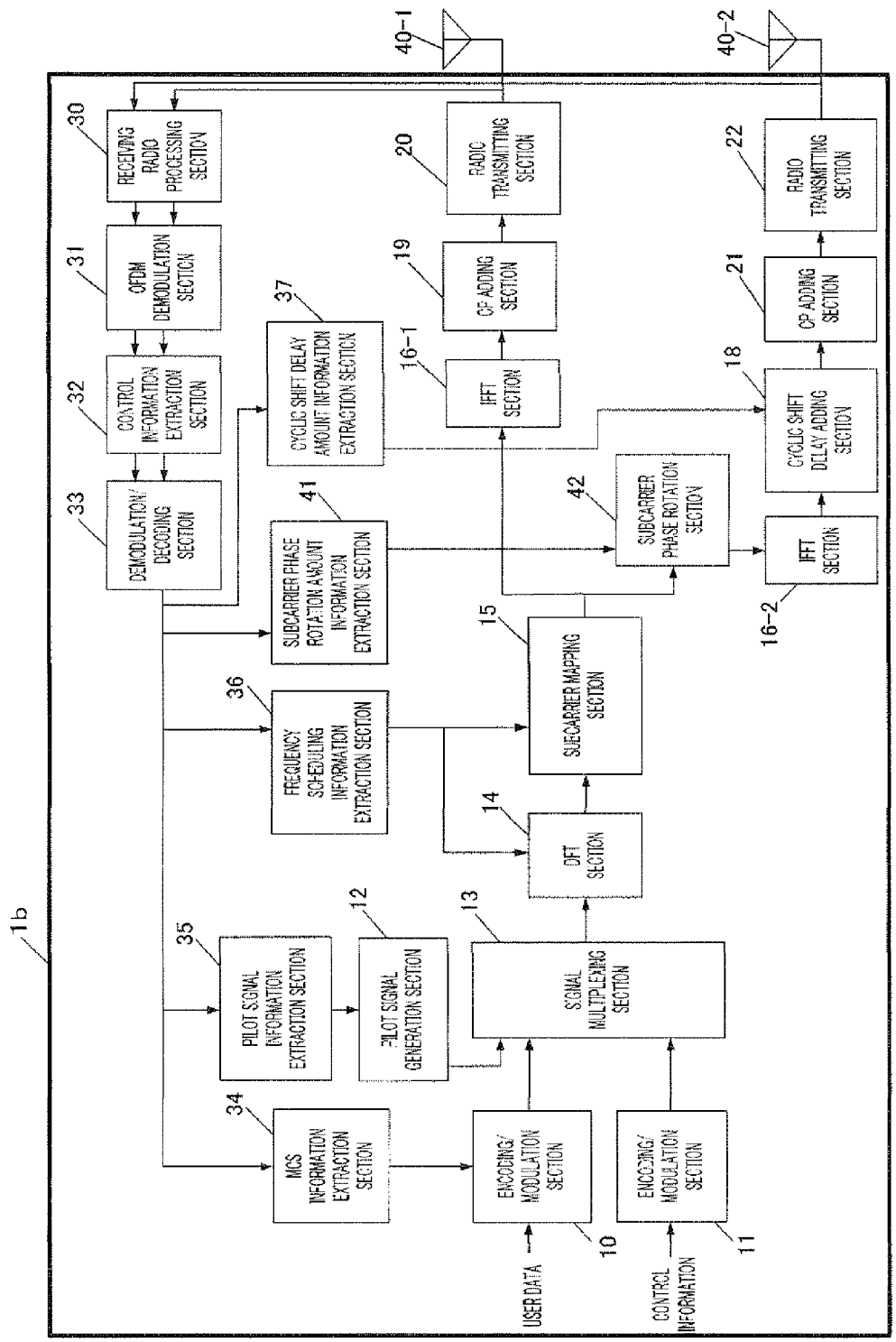
FIG. 6 is a block diagram showing the configuration of a radio communication apparatus according to Embodiment 3 of the present invention.
Figure 7:
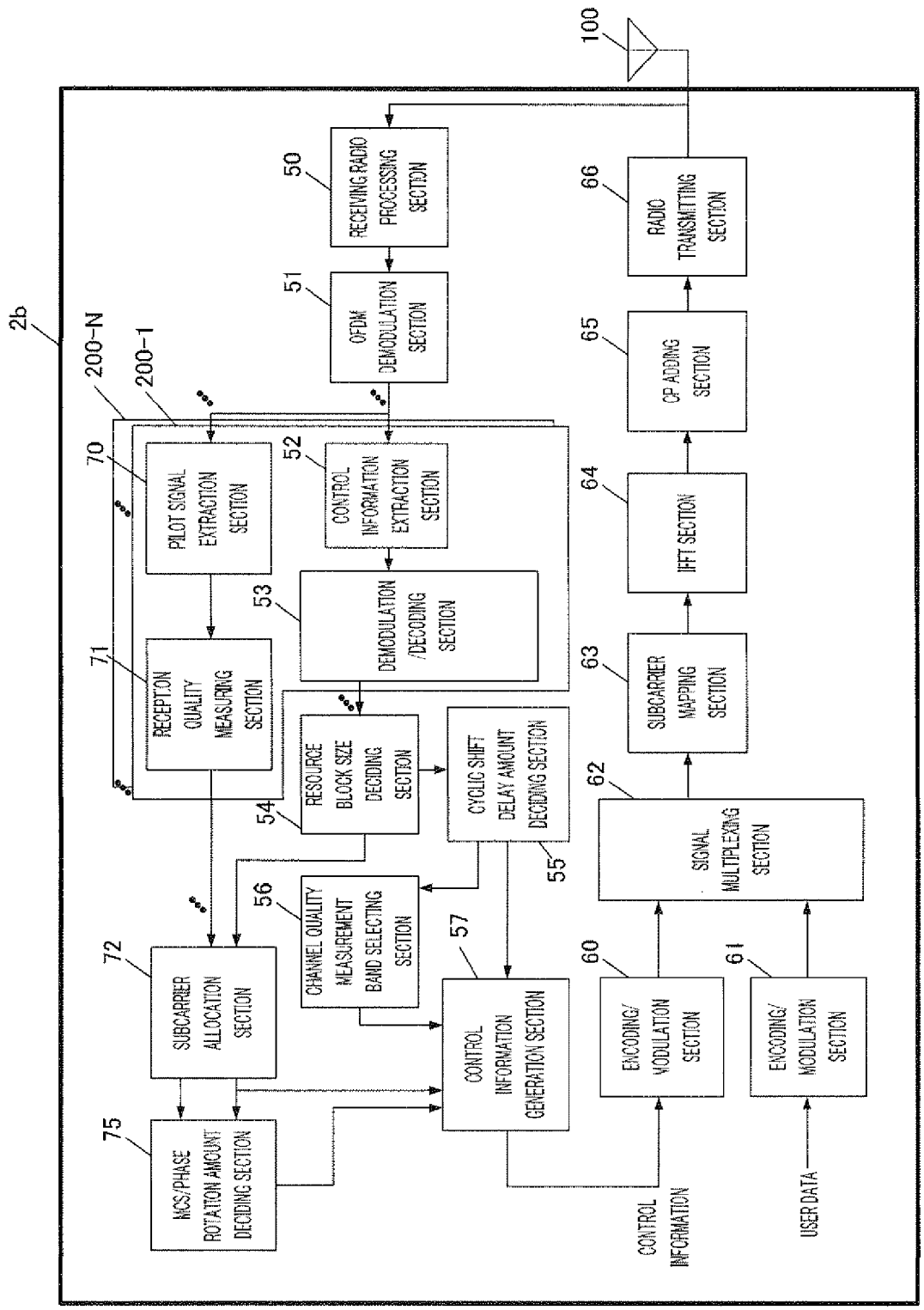
FIG. 7 is a block diagram showing the configuration of a base station apparatus according to Embodiment 3 of the present invention.

FIG. 6 is a block diagram showing the configuration of radio communication apparatus 1b according to Embodiment 3, and FIG. 7 is a block diagram showing the configuration of base station apparatus 2b configuring a radio communication system together with radio communication apparatus 1b in FIG. 6.

This radio communication apparatus 1b has a similar basic configuration to that of radio communication apparatus 1 according to Embodiment 1 shown in FIG. 1, and therefore identical configuration elements are assigned the same reference codes, descriptions thereof are omitted here, and only points of difference are described.

Radio communication apparatus 1b differs from radio communication apparatus 1 according to Embodiment 1 shown in FIG. 1 in additionally including subcarrier phase rotation amount information extraction section 41 and subcarrier phase rotation section 42.

In radio communication apparatus 1b shown in FIG. 6, subcarrier phase rotation amount information extraction section 41 extracts phase rotation amount information from control information from base station apparatus 2b that has undergone demodulation processing and decoding processing by demodulation/decoding section 33, and outputs this to subcarrier phase rotation section 42.

Subcarrier phase rotation section 42 has a subcarrier-mapped frequency data block from subcarrier mapping section 15 as input, together with the phase rotation amount input from subcarrier phase rotation amount information extraction section 41.

Using these input items of information, subcarrier phase rotation section 42 provides phase rotation on a subcarrier-by-subcarrier basis to subcarrier mapping section 15 output using a phase rotation pattern known beforehand, and outputs the resulting signal to IFFT section 16-2.

IFFT section 16-2 performs an inverse fast Fourier transform on subcarrier phase rotation section 42 output, and outputs the resulting signal to cyclic shift delay adding section 18.

Radio communication apparatus 1b of Embodiment 3 has been assumed to have a configuration that uses SC-FDMA (single-carrier frequency division multiple access) as an uplink transmission method, but this is not a limitation, and, for example, OFDM or a transmission method in which FDMA is applied, such as OFDMA, may also be used.

In the case of OFDMA, a configuration is used in which a serial/parallel conversion section (S/P conversion section)

that converts input serial data to parallel data is provided instead of DFT section 14 in the configuration of radio communication apparatus 1b in FIG. 6. Here, the S/P conversion section converts the data format from serial to parallel (hereinafter referred to as S/P conversion) for each predetermined-number symbol number $N_{DFT}$ block unit (hereinafter referred to as symbol data block) for signal multiplexing section 13 output, and inputs the resulting data to subcarrier mapping section 15.

Base station apparatus 2b will now be described using FIG. 7.

Base station apparatus 2b according to Embodiment 3 shown in FIG. 7 differs from base station apparatus 2 of Embodiment 1 shown in FIG. 2 in having MCS/phase rotation amount deciding section 75 instead of MCS deciding section 73. Also, base station apparatus 2b here has plurality N received signal processing sections 200 including control information extraction section 52, demodulation/decoding section 53, pilot signal extraction section 70, and reception quality measuring section 71. If a signal demodulated by OFDM demodulation section 51 in base station apparatus 2d includes signals transmitted by plurality of radio communication apparatuses 1d-1 through N, received signal processing sections separately perform the above-described processing for each radio communication apparatus in the N received signal processing sections 200. Specifically, received signal processing section 200-k performs the above-described processing for k'th radio communication apparatus 1d-k.

MCS/phase rotation amount deciding section 75 adaptively selects an MCS comprised of an M-ary value, coding rate, and so forth, for each subcarrier or for each subcarrier block in which a plurality of subcarriers have been made a set using frequency scheduling information and related channel quality information in subcarrier allocation section 72, and outputs the M-ary value and coding rate information selected for each subcarrier to control information generation section 57 as MCS information together with phase rotation amount information corresponding to each subcarrier.

Using information from subcarrier allocation section 72 and MCS/phase rotation amount deciding section 75, control information generation section 57 generates a control signal including phase rotation amount information in addition to frequency scheduling information and MCS information, and outputs this to encoding/modulation section 60.

Next, a description will be given of communication procedures between a base station apparatus and radio communication apparatus for user data transmission using a radio communication apparatus uplink in a radio communication system having radio communication apparatus 1b and base station apparatus 2b according to Embodiment 3. Specifically, an uplink channel quality measurement procedure and a user data communication procedure using an uplink according to the present invention will be described.

Below, only operations that differ from Embodiment 1 will be described.

In Embodiment 3, communication procedures between a base station apparatus and radio communication apparatus for user data transmission using a radio communication apparatus uplink involve the same operations as described in Embodiment 1 for communication procedure (1) through communication procedure (2). The following description starts with operations in communication procedure (3A) following communication procedure (2).

<Operation of Radio Communication Apparatus in Communication Procedure (3A)>

Radio communication apparatus 1b shown in FIG. 6 receives the above frequency scheduling information, cyclic shift delay amount information, and channel quality measurement pilot signal information transmitted from base station apparatus 2b. Then, using the specified cyclic shift delay amount, radio communication apparatus 1b performs cyclic shift delay diversity transmission (CSD transmission) of a channel quality measurement pilot signal according to the specified pilot signal sequence, using channel quality measurement partial band ΔCQI. At the time of CSD transmission, phase rotation is provided on a subcarrier-by-subcarrier basis using subcarrier phase rotation section 42. The phase rotation provided on a subcarrier-by-subcarrier basis here by subcarrier phase rotation section is also known beforehand by the base station apparatus.

The operation of radio communication apparatus 1b in communication procedure (3A) will now be described in detail with reference to FIG. 6.

Receiving radio processing section 30 executes amplification processing, band-limiting processing, and frequency conversion processing on high-frequency signals received by antennas 40, and outputs a complex baseband signal comprised of an in-phase signal and quadrature signal to OFDM demodulation section 31.

OFDM demodulation section 31 executes OFDM demodulation on the input baseband signals. That is to say, following time and frequency synchronization processing, OFDM demodulation section 31 executes GI removal, FFT processing, and serial/parallel conversion processing, and outputs the resulting signals to control information extraction section 32.

Control information extraction section 32 extracts control information including pilot signal information, channel quality measurement partial band information, and cyclic shift delay amount information transmitted from base station apparatus 2b from the received signal input from OFDM demodulation section 31, and outputs this to demodulation/decoding section 33.

Demodulation/decoding section 33 performs demodulation processing and decoding processing on the control information input from control information extraction section 32, and outputs control information. Of this, pilot signal information, frequency scheduling information, and cyclic shift delay amount information are output to pilot signal information extraction section 35, frequency scheduling information extraction section 36, and cyclic shift delay amount information extraction section 37, respectively. When baseband signals from a plurality of antennas are input to demodulation/decoding section 33, maximal-ratio combining reception processing is performed on the respective signals. This is done to improve reception quality. Radio communication apparatus 1b shown in FIG. 6 illustrates a configuration in which reception is performed by two antennas, but this is not a limitation, and single-antenna reception or 3-antenna reception may also be used.

Pilot signal generation section 12 generates a pilot signal that is a signal sequence known beforehand to base station apparatus 2b, and outputs this to signal multiplexing section 13. Here, a signal sequence used in a pilot signal is set based on the output of pilot signal information extraction section 35 that extracts pilot signal information relating to channel quality measurement use from a control signal transmitted from base station apparatus 2b. Localized placement or distributed placement shown in FIG. 3 is used for channel quality measurement pilot signal subcarrier placement. FDM, CDM, or TDM is used for multiplexing of a channel quality measurement pilot signal of another radio communication apparatus at this time. Also, FDM, CDM, or TDM is used for user data multiplexing with a demodulation pilot signal.

Signal multiplexing section 13 multiplexes input from pilot signal generation section 12. Multiplexing is performed using a TDM, FDM, or CDM multiplexing method, or a combination of these.

DFT section 14 performs S/P conversion and a discrete Fourier transform of the data format for each predetermined-number symbol number $N_{DFT}$ block unit (symbol data block) for signal multiplexing section 13 output, and outputs the resulting data to subcarrier mapping section 15. By this means, a time-domain symbol data block is converted to a frequency data block comprised of a frequency-domain complex number. Predetermined-number symbol number $N_{DFT}$ is decided based on frequency scheduling information (information [number of subcarriers, subcarrier numbers, and so forth] relating to subcarriers relating to the position and bandwidth of a partial band relating to a channel quality measurement partial band selected by the base station apparatus) corresponding to the relevant radio communication apparatus 1, input from frequency scheduling information extraction section 36.

Subcarrier mapping section 15 maps a frequency data block that is DFT section 14 output onto a specific subcarrier (that is, performs subcarrier mapping), and outputs this to IFFT section 16-1 and subcarrier phase rotation section 42. In subcarrier mapping here, mapping is performed based on frequency scheduling information (information [number of subcarriers, subcarrier numbers, and so forth] relating to subcarriers relating to the position and bandwidth of a partial band relating to a channel quality measurement partial band selected by the base station apparatus) corresponding to the relevant radio communication apparatus 1, input from frequency scheduling information extraction section 36. Subcarrier mapping is performed by means of a Localized FDMA or Distributed FDMA type of mapping method as shown in FIG. 3.

IFFT section 16-1 performs an inverse fast Fourier transform on subcarrier mapping section 15 output, and outputs the result to CP adding section 19.

Subcarrier phase rotation section 42 provides phase rotation on a subcarrier-by-subcarrier basis to subcarrier mapping section 15 output using a phase rotation pattern known beforehand, and outputs the resulting signal to IFFT section 16-2. The phase rotation pattern used here is one in which the phase rotation amount has periodicity.

Figure 8:
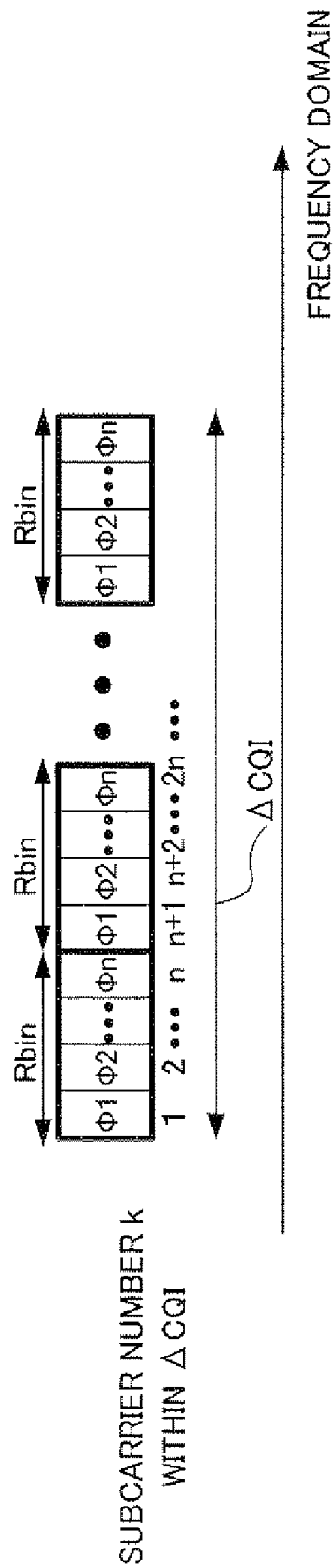
FIG. 8 is a drawing provided to explain the operation of a subcarrier phase rotation section according to Embodiment 3 of the present invention.

FIG. 8 is a drawing showing an example of a phase rotation pattern. In FIG. 8, phase rotation amount φm is set so as to have one cycle in n subcarrier units, and sequential phase rotation is provided on a subcarrier-by-subcarrier basis by repeating that cyclic pattern. Here, m=1 to n. That is to say, when subcarrier numbers are assigned sequentially from 1 starting from a low-frequency subcarrier within channel quality measurement partial band ΔCQI, phase rotation such as shown in Equation (3) below is provided to k'th subcarrier signal SC(k).

[3]

$$SC2(k)=SC(k) \exp [j\phi \bmod(k-1,m)+1] \quad \text{(Equation 3)}$$

where mod(x,y) indicates the remainder when x is divided by y.

IFFT section 16-2 performs an inverse fast Fourier transform on subcarrier phase rotation section 42 output SC2(k), and outputs the resulting signal to cyclic shift delay adding section 18.

CP adding section 19 inserts a guard interval using a CP in transmit data input from IFFT section 16 and outputs the resulting data to radio transmitting section 20, and radio transmitting section 20 performs up-conversion from baseband frequency to radio frequency and so forth, and transmits the data from antenna 40-1.

Cyclic shift delay adding section 18 outputs a signal in which a predetermined cyclic shift delay amount has been added to the signal input from IFFT section 16-2. Here, the cyclic shift delay amount is decided by base station apparatus 2b, is included in control information transmitted from the base station apparatus, and is input from cyclic shift delay amount information extraction section 37.

CP adding section 21 inserts a guard interval using a CP in transmit data input from cyclic shift delay adding section 18 and outputs the resulting data to radio transmitting section 22, and radio transmitting section 22 performs up-conversion of the input transmit data from baseband frequency to radio frequency and so forth, and transmits the data from antenna 40-2.

<Operation of Base Station Apparatus in Communication Procedure (4A)>

Following communication procedure (3A), base station apparatus 2b measures channel quality in channel quality measurement partial band ΔCQI specified for each radio communication apparatus 1. Then, using MCS/phase rotation amount deciding section 75 and so forth, radio communication apparatus 1b detects a subcarrier with the best channel quality characteristics from the channel quality measurement results, extracts a phase rotation amount provided to that subcarrier by subcarrier phase rotation section 42 of radio communication apparatus 1b.

Then a subcarrier to be allocated to each radio communication apparatus 1b is decided based on the channel quality measurement results, and this is transmitted to radio communication apparatus 1b as frequency scheduling information. In an allocated subcarrier, information relating to a coding rate and M-ary value used in user data transmission (MCS information) and phase rotation amount information are also included for transmission to the base station apparatus.

The operation of base station apparatus 2b in communication procedure (4A) will now be described in detail.

Receiving radio processing section 50 executes amplification processing, band-limiting processing, and frequency conversion processing on a high-frequency signal received via antenna 100, and outputs a complex baseband signal comprised of an in-phase signal and quadrature signal to OFDM demodulation section 51.

OFDM demodulation section 51 executes OFDM demodulation on the input baseband signals, and outputs the resulting signals to control information extraction section 52 and pilot signal extraction section 70. That is to say, after time and frequency synchronization processing, OFDM demodulation section 51 performs GI removal, FFT processing, and serial/parallel conversion processing on the input baseband signals.

Pilot signal extraction section 70 extracts a channel quality measurement pilot signal transmitted from radio communication apparatus 1b from a received signal input from OFDM demodulation section 51, and outputs this to reception quality measuring section 71.

Reception quality measuring section 71 measures per-subcarrier reception quality within a channel quality measurement partial band using an input channel quality measurement pilot signal, and outputs per-subcarrier channel quality information to subcarrier allocation section 72. Channel quality is measured by using an arbitrary measured value such as a CIR, SIR, or SNR, using a pilot signal. A case in which the base station apparatus has a plurality of receiving antennas can be provided for by providing receiving radio processing section 50, OFDM demodulation section 51, and pilot signal extraction section 70 for each antenna, and performing reception quality measurement using per-antenna channel quality measurement pilot signal reception results. In this case, a CIR, SNR, or SIR measured value is used based on combined signal power that combines the power of signal components received by each antenna.

Subcarrier allocation section 72 performs scheduling based on a scheduling algorithm using per-subcarrier channel quality information of each user's radio communication apparatus input from reception quality measuring section 71. That is to say, subcarrier allocation section 72 ascertains the RB size allocated to each user's radio communication apparatus—that is, the usable number of subcarriers—decided by resource block size deciding section 54, and a phase rotation pattern provided by subcarrier phase rotation section 42 within a channel quality measurement partial band in radio communication apparatus 1b, and performs selection and allocation within the RB size range so that a subcarrier used in an uplink in which user data is transmitted from each radio communication apparatus 1 has good reception quality.

As subcarrier allocation at this time, either the localized type or distributed type shown in FIG. 2 is used when SC-FDMA is used. When OFDM, not SC-FDMA, is used, any kind of subcarrier allocation is possible.

While the following subcarrier allocation methods are assumed, possible methods are not limited to these.

Allocation method 1: A subcarrier with the best channel quality characteristics is detected from channel quality measurement results, and a phase rotation amount provided to that subcarrier by subcarrier phase rotation section 42 of radio communication apparatus 1b is extracted.

Allocation method 2: Subcarriers are divided into groups of subcarriers for which the phase rotation amount provided by subcarrier phase rotation section 42 of a radio communication apparatus is the same, the group with the best channel quality characteristics is selected from among these groups based on channel quality measurement results, and the phase rotation amount provided to that group is extracted as phase rotation amount information. Then information on subcarriers allocated to radio communication apparatuses 1-1 through N by subcarrier allocation section 72 is output to MCS/phase rotation amount deciding section 75 and control information generation section 57 as frequency scheduling information.

MCS/phase rotation amount deciding section 75 adaptively selects an MCS comprised of an M-ary value, coding rate, and so forth, for each subcarrier or for each subcarrier block in which a plurality of subcarriers have been made a set based on frequency scheduling information and related channel quality information in subcarrier allocation section 72. That is to say, MCS/phase rotation amount deciding section 75 can determine the reception quality of each subcarrier allocated to radio communication apparatuses 1-1 through N from per-subcarrier channel quality information sent from radio communication apparatuses 1-1 through N of each user, and therefore MCS/phase rotation amount deciding section 75 extracts a subcarrier transmitted provided with a phase rotation amount extracted by subcarrier allocation section 72 from among subcarriers allocated for user data transmission to each radio communication apparatus, and selects an MCS in accordance with the reception quality of the extracted subcarrier.

Then an MCS is used of the closest subcarrier for which an MCS is selected using a frequency correlation such that channel quality becomes comparatively closer between adjacent subcarriers for a subcarrier transmitted provided with a different phase rotation amount from that extracted by subcarrier allocation section 72. Also, MCS/phase rotation amount deciding section 75 outputs an M-ary value and coding rate information selected for each subcarrier to control information generation section 57 as MCS information.

Control information generation section 57 generates a control signal including 1) frequency scheduling information, 2) MCS information, and 3) phase rotation amount information, based on subcarrier allocation section 72 and MCS/phase rotation amount deciding section 75 output.

Encoding/modulation section 60, encoding/modulation section 61, signal multiplexing section 62, subcarrier mapping section 63, IFFT section 64, CP adding section 65, and radio transmitting section 66 perform the same kind of operations as described above, and transmit to radio communication apparatuses 1-1 through N from antenna 100.

<Operation of Radio Communication Apparatus in Communication Procedure (5A)>

Following communication procedure (5A), radio communication apparatus 1b transmits user data using a subcarrier allocated by base station apparatus 2b. At this time, subcarrier phase rotation amount information is extracted by a subcarrier phase rotation amount information extraction section, and a subcarrier phase rotation section performs phase rotation based on subcarrier phase rotation amount information, and then performs CSD transmission using the same cyclic shift delay amount as at the time of channel quality measurement pilot signal transmission.

The operation of radio communication apparatus 1b in communication procedure (5A) will now be described in detail.

Receiving radio processing section 30 executes amplification processing, band-limiting processing, and frequency conversion processing on high-frequency signals received by antennas 40 and outputs a complex baseband signal comprised of an in-phase signal and quadrature signal to OFDM demodulation section 31, and OFDM demodulation section 31 executes OFDM demodulation and outputs the resulting signal to control information extraction section 52 and pilot signal extraction section 70.

Control information extraction section 32 extracts control information including MCS information, phase rotation amount information, and pilot signal information transmitted from base station apparatus 2b from the received signal input from OFDM demodulation section 31, and outputs this to demodulation/decoding section 33.

Demodulation/decoding section 33 performs demodulation processing and decoding processing on the control information input from control information extraction section 32, and outputs control information. MCS information, pilot signal information, and frequency scheduling information are extracted from the control information using MCS information extraction section 34, pilot signal information extraction section 35, and frequency scheduling information extraction section 36, respectively. Also, phase rotation amount information is extracted by subcarrier phase rotation amount information extraction section 41.

When baseband signals from a plurality of antennas are input to demodulation/decoding section 33, maximal-ratio combining reception processing is performed on the respective signals. This is done to improve reception quality. FIG. 1 shows a configuration in which reception is performed by two antennas, but this is not a limitation, and single-antenna reception or 3-antenna reception may also be used.

The operation of encoding/modulation section 10, encoding/modulation section 11, pilot signal generation section 12, and signal multiplexing section 13 is similar to that in Embodiment 1, and therefore a description thereof is omitted here.

DFT section 14 performs S/P conversion and a discrete Fourier transform of the data format for each predetermined-number symbol number $N_{DFT}$ block unit (symbol data block) for signal multiplexing section 13 output, and outputs the resulting data to subcarrier mapping section 15. By this means, a time-domain symbol data block is converted to a frequency data block comprised of a frequency-domain complex number. Predetermined-number symbol number $N_{DFT}$ is decided based on frequency scheduling information (information [number of subcarriers, subcarrier numbers, and so forth] relating to subcarriers allocated for uplink user data transmission) corresponding to the relevant radio communication apparatus 1, input from frequency scheduling information extraction section 36.

Subcarrier mapping section 15 maps a frequency data block that is DFT section 14 output onto a specific subcarrier (that is, performs subcarrier mapping), and outputs this to IFFT section 16-1 and subcarrier phase rotation section 42. In subcarrier mapping here, mapping is performed based on frequency scheduling information (information [number of subcarriers, subcarrier numbers, and so forth] relating to subcarriers allocated for uplink user data transmission) corresponding to the relevant radio communication apparatus 1, input from frequency scheduling information extraction section 36. Mapping methods are as described above, and therefore a description thereof is omitted here.

IFFT (Inverse Fast Fourier Transform) section 16-1 performs an inverse fast Fourier transform on subcarrier mapping section 15 output, and CP adding section 19 inserts a guard interval using a CP and outputs the resulting data to radio transmitting section 20.

Radio transmitting section 20 performs up-conversion of the transmit data input from CP adding section 19 from baseband frequency to radio frequency and so forth, and transmits the data from antenna 40-1.

Subcarrier phase rotation section 42 provides phase rotation on a subcarrier-by-subcarrier basis to subcarrier mapping section 15 output using a phase rotation amount extracted by subcarrier phase rotation amount information extraction section 41, and outputs the resulting signal to IFFT section 16-2.

IFFT section 16-2 performs an inverse fast Fourier transform on subcarrier phase rotation section 42 output, and outputs the resulting signal to cyclic shift delay adding section 18.

Cyclic shift delay adding section 18 outputs a signal in which a predetermined cyclic shift delay amount has been added to the signal input from IFFT section 16-2. Here, the cyclic shift delay amount is decided by the base station apparatus, the cyclic shift delay amount included in control information transmitted from base station apparatus 1b in communication procedure (2) and input from cyclic shift delay amount information extraction section 37 is held, and the same cyclic shift delay amount is used when user data transmission is performed.

CP adding section 21 inserts a guard interval using a CP in transmit data input from cyclic shift delay adding section 18 and outputs the resulting data to radio transmitting section 20, and the transmit data is up-converted from baseband frequency to radio frequency and so forth by radio transmitting section 22, and transmitted from antenna 40-2.

Figure 9A:
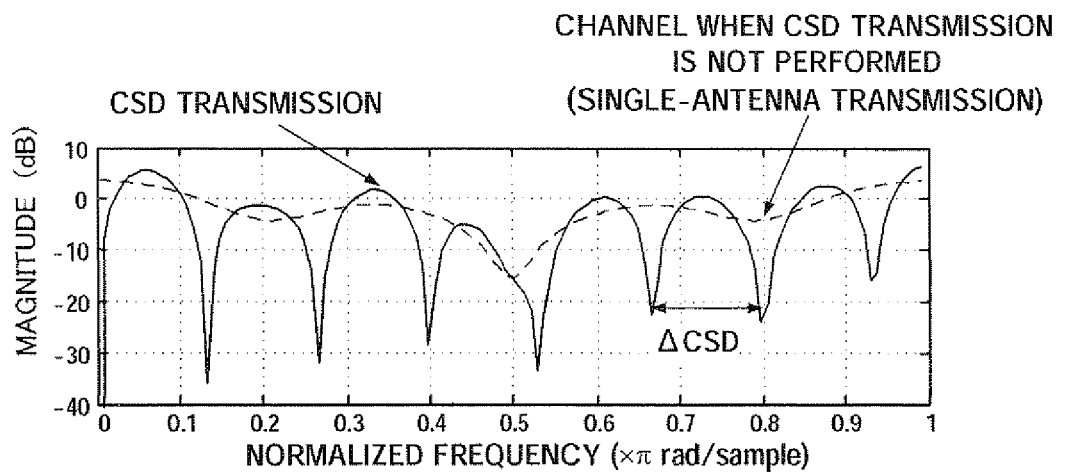
FIG. 9 is a drawing provided to explain channel frequency response obtained by Embodiment 3.
Figure 9B:
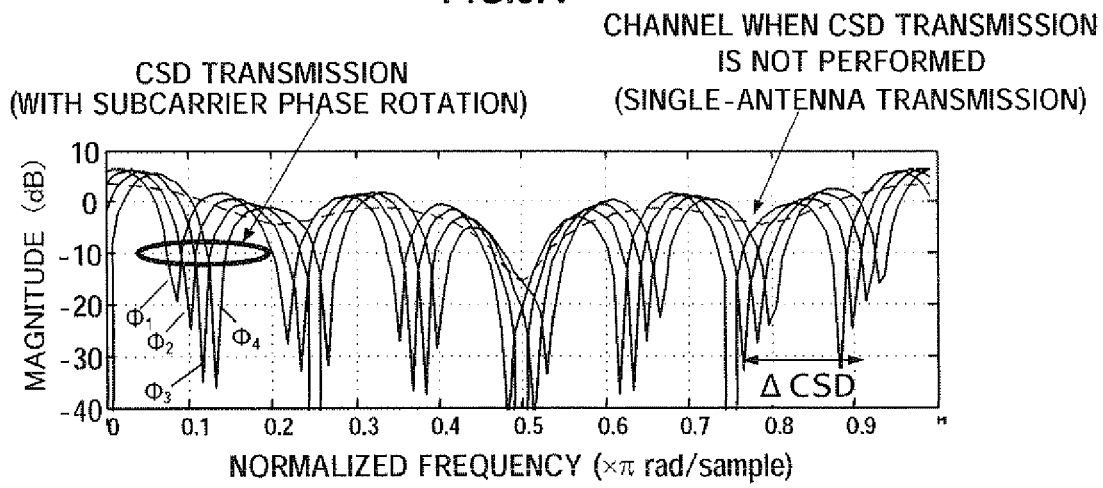

FIG. 9 is a drawing provided to explain channel frequency response obtained by Embodiment 3. FIG. 9 shows channel frequency response when transmission is performed from one antenna that does not perform CSD transmission (dashed lines), and channel frequency response when CSD transmission is performed using two antennas (solid lines). Here, the total transmission power from two antennas when CSD transmission is performed is equal to the transmission power from one antenna that does not perform CSD transmission.

It can be seen from FIG. 9 that a part appears in which channel frequency response improves by 3 dB cyclically due to CSD transmission. FIG. 9(*a*) shows channel frequency response in Embodiment 1, and FIG. 9(*b*) shows channel frequency response in Embodiment 3. FIG. 9(*b*) shows the channel frequency response when four subcarrier phase rotation amounts φ1 through φ4 are used.

As shown in FIG. 9, there is a characteristic whereby the position of a channel notch (a position at which a frequency characteristic falls significantly) appearing due to CSD transmission shifts depending on the subcarrier phase rotation amount. Thus, in Embodiment 3, a channel that has a frequency characteristic having a different notch in FIG. 9(*b*) is sampled roughly at Td intervals by performing CSD transmission by varying the subcarrier phase rotation amount cyclically (the cycle being Td) on a subcarrier-by-subcarrier basis. Consequently, even if channel quality measurement partial band width ΔCQI is narrower than ΔCSD, a subcarrier group of a frequency resource size (ΔRB) for which channel quality is good can be allocated from a channel by means of CSD transmission in which different subcarrier phase rotation amounts have been provided.

Thus, radio communication apparatus 1b according to Embodiment 3 performs cyclic shift delay diversity transmission of a channel quality measurement signal, based on cyclic shift delay amount information extracted by cyclic shift delay amount information extraction section 37, using cyclic shift delay amount information extraction section 37 that extracts cyclic shift delay amount information transmitted from base station apparatus 2b, subcarrier phase rotation section 42 that generates a phase rotation signal that provides phase rotation known beforehand on a subcarrier-by-subcarrier basis, a subcarrier, and a signal generated by subcarrier phase rotation section 42. Furthermore, using frequency scheduling information extraction section 36 that extracts frequency scheduling information including information relating to a channel quality measurement band, radio communication apparatus 1b performs cyclic shift delay diversity transmission of a channel quality measurement signal restricted to a channel quality measurement band in the extracted frequency scheduling information. Moreover, radio communication apparatus 1b performs cyclic shift delay diversity transmission of a user data signal, based on a cyclic shift delay amount extracted by cyclic shift delay amount information extraction section 37, using subcarrier phase rotation amount information extraction section 41 that extracts subcarrier phase rotation amount information transmitted from base station apparatus 2b, a subcarrier, and a signal generated by subcarrier phase rotation section 42.

On the other hand, base station apparatus 2b according to Embodiment 3 is equipped with pilot signal extraction section 70 that extracts a channel quality measurement signal transmitted from radio communication apparatus 1b, reception quality measuring section 71 that measures per-subcarrier reception quality using a channel quality measurement signal extracted by pilot signal extraction section 70, subcarrier allocation section 72 that allocates a subcarrier to radio communication apparatus 1b using a channel quality measurement signal extracted by reception quality measuring section 71, and MCS/phase rotation amount deciding section 75 that decides a subcarrier phase rotation amount of a subcarrier used in radio communication apparatus 1b transmission using an extracted channel quality measurement signal and a subcarrier allocated by subcarrier allocation section 72.

According to this configuration, radio communication apparatus 1b of Embodiment 3 can make channel quality measurement partial band width ΔCQI narrower than in Embodiment 1. By this means, channel quality measurement band sharing with another radio communication apparatus can be performed easily and efficiently, Frequency scheduling for uplink user data transmission can also be performed efficiently through increased freedom of allocation by narrowing the channel quality measurement partial band width, and frequency utilization efficiency can be further increased.

If radio communication apparatus 1b is capable of transmission using three or more antennas, it can obtain the same kind of effect by transmitting while providing a cyclic shift delay amount such that a cyclic shift delay amount in an added cyclic shift delay adding section provided by a third or higher-numbered antenna does not exceed cyclic shift delay amount τ provided by cyclic shift delay adding section 18. Alternatively, Embodiment 3 may be applied after two antennas with high received electric field intensities have been selected beforehand by measuring the respective antenna received electric field intensities in a base station apparatus.

Here, cyclic shift delay time τ decided by the base station apparatus is decided using the method described in Embodiment 1. For coefficient α, 1) a fixed value may be set, or 2) varying control may be applied, as shown below.

Figure 12:
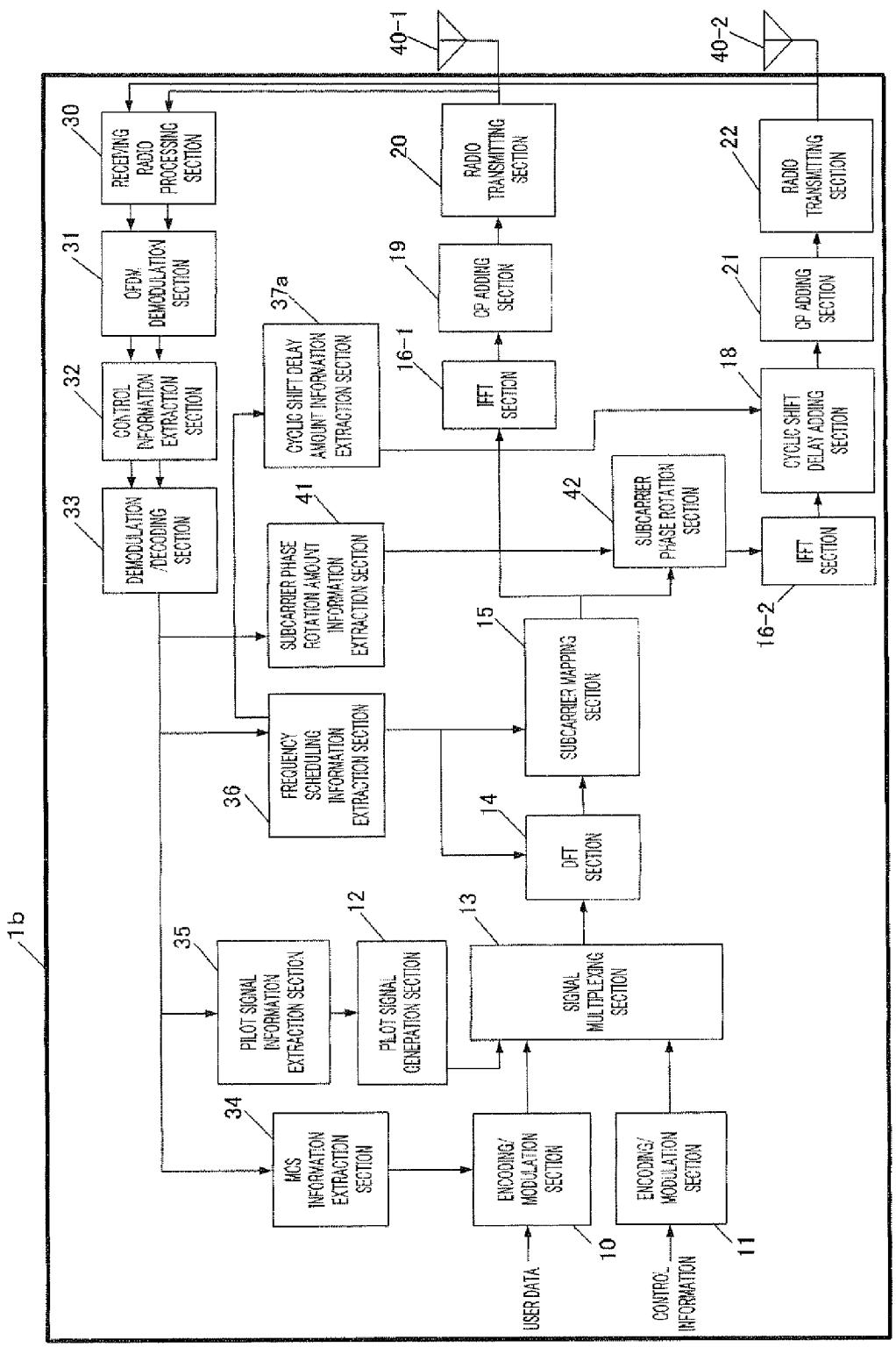
FIG. 12 is a block diagram showing another example of a radio communication apparatus according to Embodiment 3 of the present invention.

1) When coefficient α is always a fixed value, ΔRB and the cyclic shift delay amount (τ) can be calculated based on ΔCSD. Consequently, it is no longer necessary for information relating to the cyclic shift delay amount (τ) to be transmitted from the base station apparatus, and data transmission efficiency can be increased by reducing the amount of information in a control signal. In this case, the configuration in FIG. 6 can be made the kind of configuration shown in FIG. 12 in order for the cyclic shift delay amount (τ) to be calculated based on ΔCSD in a radio communication apparatus. FIG. 12 is a drawing showing another example of a radio communication apparatus according to Embodiment 3. That is to say, cyclic shift delay amount information extraction section 37a calculates the cyclic shift delay amount (τ) based on frequency scheduling information extraction section 36 output ΔCSD, and outputs the result to cyclic shift delay adding section 18.

2) When coefficient α is made variable, coefficient α is controlled by the number of other radio communication apparatuses performing multiple access, for example. That is to say, if the number of other radio communication apparatuses performing multiple access is small, control is applied to give a larger coefficient α. By this means, when the number of other radio communication apparatuses performing multiple access is comparatively small, a higher-quality subcarrier can be allocated to user data transmission by making ΔCSD larger, and an improvement in frequency utilization efficiency can be achieved.

In Embodiment 3, a configuration has been shown in which information relating to a cyclic shift delay amount (τ) is transmitted from a base station apparatus, and that information is extracted in a radio communication apparatus, but information relating to above-described coefficient α may be transmitted instead of a cyclic shift delay amount (τ). The same kind of effect can be obtained by this means since ΔRB and a cyclic shift delay amount (τ) can be calculated from coefficient α.

Embodiment 4

Figure 10:
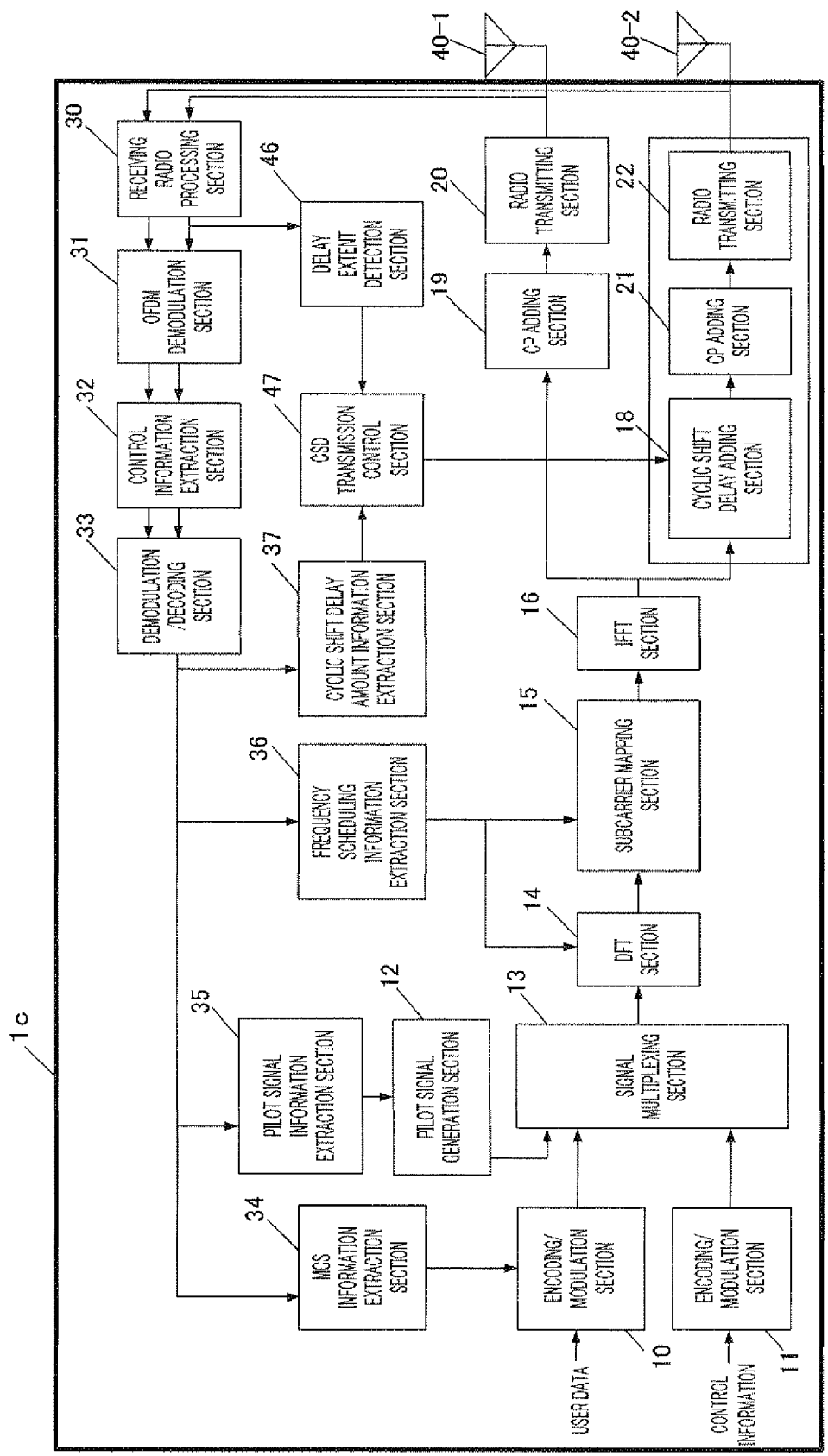
FIG. 10 is a block diagram showing the configuration of a radio communication apparatus according to Embodiment 4 of the present invention.

FIG. 10 is a block diagram showing the configuration of radio communication apparatus 1c according to Embodiment 4 of the present invention.

The configuration of radio communication apparatus 1c shown in FIG. 10 differs from that of radio communication apparatus 1 according to Embodiment 1 shown in FIG. 1 in being additionally equipped with delay extent detection section 46 and CSD transmission control section 47, and controlling a shift delay amount of cyclic shift delay adding section 18. Below, identical configuration elements are assigned the same reference codes and descriptions thereof are omitted, and only points of difference in operation are described.

Delay extent detection section 46 detects a delay extent by calculating a delay extent by detecting a delay profile by means of a method based on autocorrelation using a CP, or cross-correlation using a known signal pattern, using a baseband signal output from receiving radio processing section 30, and outputs the delay extent to CSD transmission control section 47.

CSD transmission control section 47 has, as input, cyclic shift delay amount information extracted by cyclic shift delay amount information extraction section 37, and a delay extent from delay extent detection section 46, compares the delay extent with a predetermined threshold value, adjusts the cyclic shift delay amount using the result of this comparison, and outputs the adjusted cyclic shift delay amount to cyclic shift delay adding section 18.

Next, the operation of radio communication apparatus 1c will be described. With reference to the communication system described in Embodiment 1, radio communication apparatus 1c operations differ only in <communication procedure (3)> and <communication procedure (5)> of radio communication apparatus 1 <communication procedure (1)> through <communication procedure (5)>, and other operations are similar, including base station apparatus operations.

Therefore, in the following description of operations for communication with a base station apparatus by radio communication apparatus 1c according to Embodiment 4, <communication procedure (3B)> will be used instead of <communication procedure (3)>, and <communication procedure (5B)> will be used instead of <communication procedure (5)>.

<Operation of Radio Communication Apparatus in Communication Procedure (3B)>

In radio communication apparatus 1c, delay extent detection section 46 performs delay extent detection using a baseband signal input from receiving radio processing section 30. In delay extent detection by delay extent detection section 46, a method is used such as calculating a delay extent by detecting a delay profile by means of a method based on autocorrelation using a CP, or cross-correlation using a known signal pattern.

CSD transmission control section 47 compares the delay extent output from delay extent detection section 46 with a predetermined threshold value.

If the delay extent is greater than the predetermined threshold value, CSD transmission control section 47 determines that channel frequency selectivity is sufficiently high, and 1) changes the cyclic shift delay amount to a sufficiently small value irrespective of the input from cyclic shift delay amount information extraction section 37 so that channel frequency selectivity is not further increased by CSD transmission, and outputs this cyclic shift delay amount to cyclic shift delay adding section 18.

Alternatively, if the delay extent is greater than the predetermined threshold value, CSD transmission control section 47 determines that channel frequency selectivity is sufficiently high, and 2) controls radio transmitting section 22 so as to transmit from one antenna, so that CSD transmission is not performed.

On the other hand, if the delay extent is less than or equal to the predetermined threshold value, CSD transmission control section 47 passes the input from cyclic shift delay amount information extraction section 37 through unchanged, and outputs this to cyclic shift delay adding section 18.

<Operation of Radio Communication Apparatus in Communication Procedure (5B)>

Cyclic shift delay adding section 18 outputs a signal in which a predetermined cyclic shift delay amount has been added to the signal input from IFFT section 16.

Here, the cyclic shift delay amount input from CSD transmission control section 47 in above-described communication procedure (3B) is held, and the same cyclic shift delay amount is used when user data transmission is performed.

As described above, in Embodiment 4 frequency selectivity conditions of a channel in which communication is performed are detected by a delay extent detection section, and a CSD transmission cyclic shift delay amount used at the time of uplink channel quality measurement signal transmission and user data transmission is controlled based on the result.

By this means, the need to make channel frequency selectivity more pronounced than necessary can be eliminated by making a CSD transmission cyclic shift delay amount sufficiently small, or by not performing CSD transmission, when frequency selectivity is high. Therefore, when frequency selectivity is pronounced, 1) when a subcarrier block is allocated by means of localized placement, reception quality fluctuation among allocated subcarriers increases, and it is not possible to secure a subcarrier block in which good quality is obtained across a plurality of subcarriers.

Also, 2) if channel fluctuation is large, correlation between adjacent subcarriers is low, smoothing processing that calculates channel response between adjacent subcarriers by weighted averaging cannot be applied when performing channel estimation, and a problem of degradation of channel estimation accuracy arises, but such occurrences can be prevented by means of Embodiment 4.

If a radio communication apparatus is capable of transmission using three or more antennas, it can obtain the same kind of effect by transmitting while providing a cyclic shift delay amount such that a cyclic shift delay amount in an added cyclic shift delay adding section provided by a third or higher-numbered antenna does not exceed cyclic shift delay amount τ provided by cyclic shift delay adding section 18. Alternatively, Embodiment 4 may be applied after two antennas with high received electric field intensities have been selected beforehand by measuring the respective antenna received electric field intensities in a base station apparatus.

In Embodiment 4, FDD has been described as a duplex method, but application in an uplink using a TDD method is also possible in a similar way. In the case of a TDD system, it is also possible to use a CQI report in a downlink as uplink channel quality when channel fluctuation is sufficiently small by utilizing channel duality, but a problem in the case of a cellular system is that accurate reception quality estimation is difficult since interference differs in an uplink and a downlink. However, in Embodiment 4 this problem can be solved since frequency scheduling and MCS selection are performed on the basis of an uplink channel quality measurement signal. Thus, application to a cellular system is particularly beneficial.

In Embodiment 4, radio communication apparatus 1c has been described based on the configuration of radio communication apparatus 1 according to Embodiment 1 shown in FIG. 1, but the same kind of effect can also be obtained if the configuration of radio communication apparatus 1b according to Embodiment 3 shown in FIG. 7 is applied.

<Sample Variants of Embodiments>

(Sample Variant of Embodiment 1)

In Embodiment 1, the description given assumes that CSD transmission is performed by radio communication apparatus 1. That is to say, a radio communication apparatus capable of signal transmission from a plurality of antennas is assumed, but for a radio communication apparatus for which signal transmission from a plurality of antennas is difficult, CSD transmission would not be used and signal transmission would be performed from one antenna. In this case, the effect of this embodiment is not obtained by a radio communication apparatus for which CSD transmission is difficult, but there is no particular adverse effect on another radio communication apparatus capable of CSD transmission. Alternatively, another method is to perform transmission that provides a cyclical frequency response to a transmitted signal using the configuration shown in FIG. 13.

Figure 13:
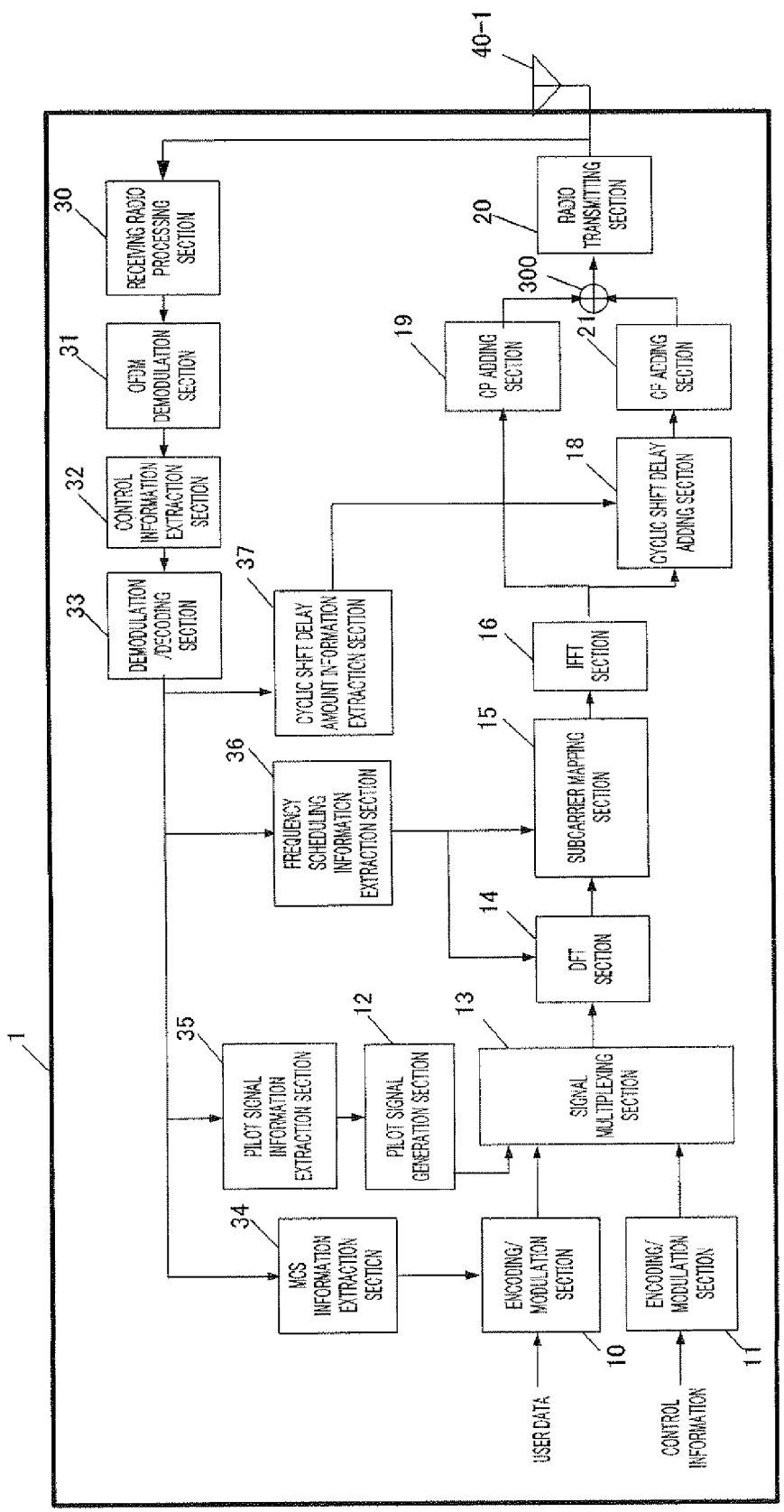
FIG. 13 is a block diagram showing a sample variant of a radio communication apparatus according to Embodiment 1 of the present invention.

A description is given below of operations in FIG. 13 different from operations based on above-described FIG. 1. The configuration of a radio communication apparatus serving as a sample variant of Embodiment 1 shown in FIG. 13 differs from the configuration in FIG. 1 in that radio transmitting section 22 and antenna 40-2 are not included, addition section 300 is provided that combines the outputs of CP adding section 19 and CP adding section 21, and addition section 300 output is provided as input to radio transmitting section 20. Only operations in <communication procedure (3)> and <communication procedure (5)> described in Embodiment 1 when CSD transmission is performed that are different due to this configuration are described below.

CP adding section 19 inserts a guard interval using a CP in transmit data input from IFFT section 16 and outputs the resulting data to addition section 300.

Cyclic shift delay adding section 18 outputs a signal in which a predetermined cyclic shift delay amount has been added to a signal input from IFFT section 16. Here, the cyclic shift delay amount is decided by the base station apparatus, is included in control information transmitted from the base station apparatus, and is input from cyclic shift delay amount information extraction section 37.

CP adding section 21 inserts a guard interval using a CP in transmit data input from cyclic shift delay adding section 18, and outputs the resulting data to addition section 300.

Addition section 300 combines the outputs of CP adding sections 19 and 21, and outputs the resulting data to radio transmitting section 20.

Radio transmitting section 20 performs up-conversion of the transmit data input from addition section 300 from baseband frequency to radio frequency and so forth, and transmits the data from antenna 40-1.

By means of the above, a transmit signal having a characteristic of periodicity appearing in a frequency response similar to that obtained by the configuration in FIG. 1 can be generated as a signal output from antenna 40-1, and the same kind of effect can be obtained as in above-described Embodiment 1. If radio communication apparatus 1 is capable of transmission using three or more antennas, a radio communication apparatus 1 sample variant having the above-described configuration can obtain the same kind of effect by transmitting while providing a cyclic shift delay amount such that a cyclic shift delay amount in an added cyclic shift delay adding section provided by a third or higher-numbered antenna does not exceed cyclic shift delay amount τ provided by cyclic shift delay adding section 18. Alternatively, Embodiment 1 may be applied after two antennas with high received electric field intensities have been selected beforehand by measuring the respective antenna received electric field intensities in a base station apparatus.

In this sample variant of Embodiment 1, a configuration has been shown in which information relating to a cyclic shift delay amount (τ) is transmitted from base station apparatus 2, and that information is extracted in radio communication apparatus 1, but information relating to above-described coefficient α may be transmitted instead of a cyclic shift delay amount (τ). Also, in this sample variant of Embodiment 1, FDD has been described as a duplex method, but application in an uplink using a TDD method as described above is of course also possible in a similar way.

(Sample Variant of Embodiment 2)

In above-described Embodiment 2, the description given assumes that CSD transmission is performed by radio communication apparatus 1a. That is to say, radio communication apparatus 1a capable of signal transmission from a plurality of antennas is assumed, but for a radio communication apparatus for which signal transmission from a plurality of antennas is difficult, CSD transmission would not be used and signal transmission would be performed from one antenna. In this case, the effect of this embodiment is not obtained by a radio communication apparatus for which CSD transmission is difficult, but there is no particular adverse effect on another radio communication apparatus capable of CSD transmission.

Figure 14:
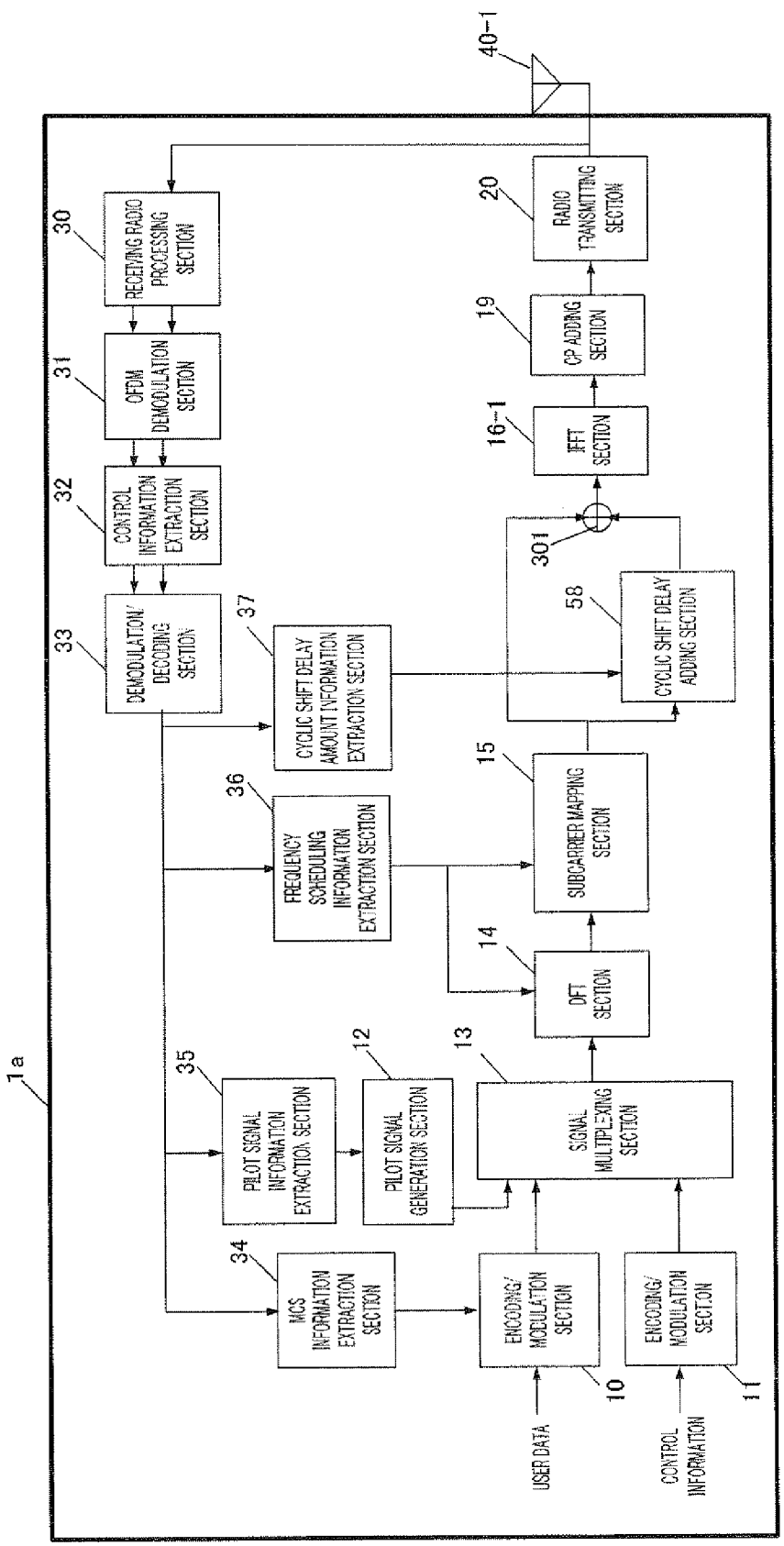
FIG. 14 is a block diagram showing a sample variant of a radio communication apparatus according to Embodiment 2 of the present invention.

Alternatively, another method is to perform transmission that provides a cyclical frequency response to a transmitted signal using the configuration shown in FIG. 14.

A description is given below, with reference to FIG. 14, of operations of a sample variant of radio communication apparatus 1a that differ from those of radio communication apparatus 1a based on above-described FIG. 5. The configuration of radio communication apparatus 1a shown in FIG. 14 differs from the configuration in FIG. 1 in that IFFT section 16-2, CP adding section 21, radio transmitting section 22, and antenna 40-2 are not included, addition section 301 is provided that combines the outputs of subcarrier mapping section 15 and cyclic shift delay adding section 58, and addition section 301 output is provided as input to IFFT section 16-1. Only operations in <communication procedure (3)> and <communication procedure (5)> when CSD transmission is performed described in Embodiment 1 that are different due to this configuration are described below.

Cyclic shift delay adding section 58 provides phase rotation φ(k) that differs for each subcarrier, as shown in Equation (2), to subcarrier mapping section 15 output, and outputs the result to addition section 301. Here, the cyclic shift delay amount is decided by the base station apparatus, is included in control information transmitted from the base station apparatus, and is input from cyclic shift delay amount information extraction section 37.

Addition section 301 adds together and combines subcarrier mapping section 15 output and cyclic shift delay adding section 58 output, and outputs the resulting data to IFFT section 16-1.

CP adding section 19 inserts a guard interval using a CP in transmit data input from IFFT section 16-1, and outputs the resulting data to radio transmitting section 20.

Radio transmitting section 20 performs up-conversion of the transmit data input from CP adding section 19 from baseband frequency to radio frequency and so forth, and transmits the data from antenna 40-1.

By means of the above, a transmit signal having a characteristic of periodicity appearing in a frequency response similar to that obtained by the configuration in FIG. 5 can be generated as a signal output from antenna 40-1, and the same kind of effect as in above-described Embodiment 2 can be obtained by means of a sample variant of Embodiment 2.

(Embodiment 5)

Figure 15:
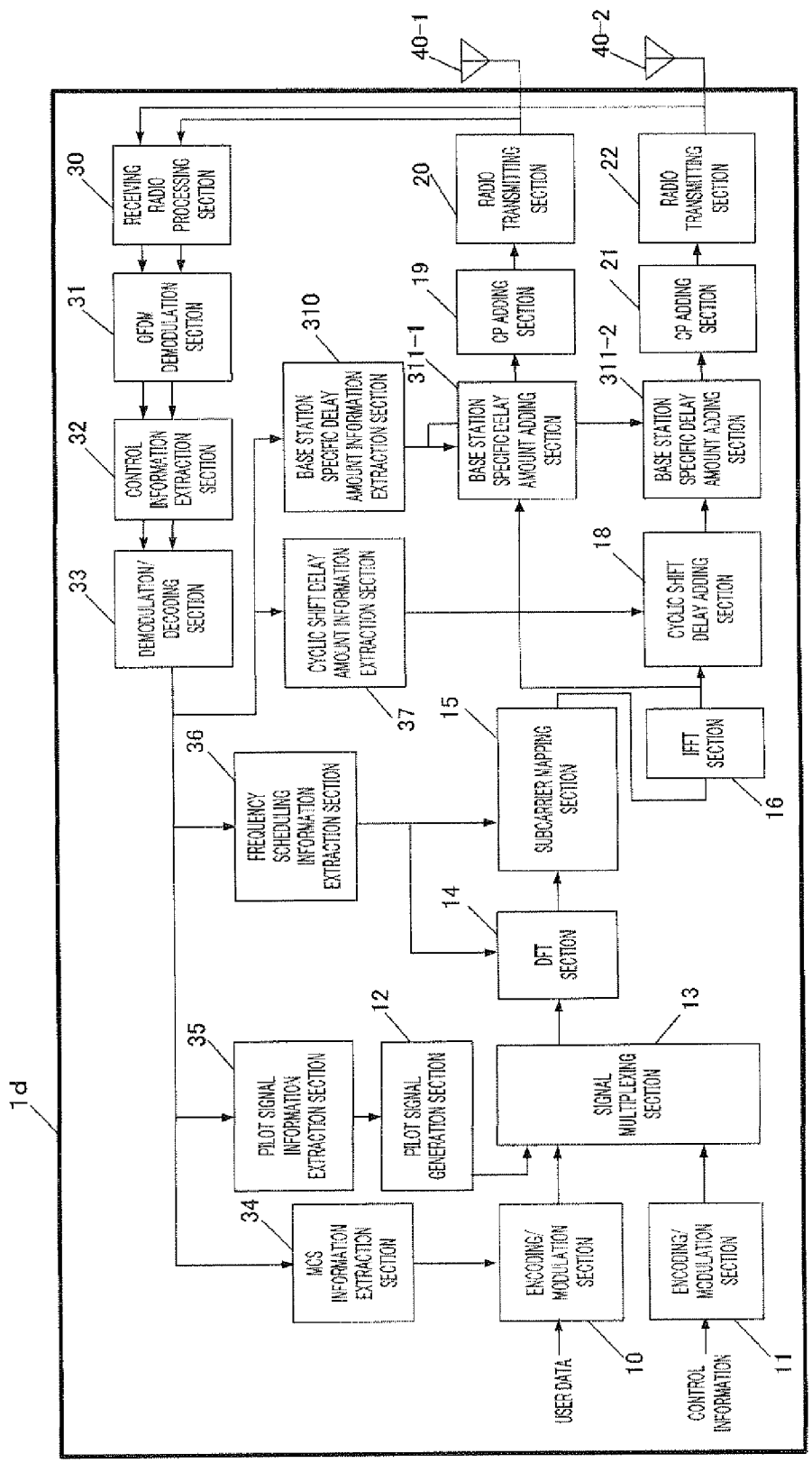
FIG. 15 is a block diagram showing the configuration of a radio communication apparatus according to Embodiment 5 of the present invention.

FIG. 15 is a block diagram showing the configuration of radio communication apparatus 1d according to Embodiment 5 of the present invention. Radio communication apparatus (radio communication terminal) 1d has a similar basic configuration to that of radio communication apparatus 1 according to Embodiment 1 shown in FIG. 1, and therefore identical configuration elements are assigned the same reference codes, descriptions thereof are omitted here, and only points of difference are described.

Radio communication apparatus 1d differs from radio communication apparatus 1 shown in FIG. 1 in being newly equipped with base station specific delay amount information extraction section 310, and base station specific delay amount adding sections 311-1 and 311-2. Radio communication apparatus 1d is equipped with base station specific delay amount information extraction section (cyclic shift delay amount information extraction section) 310 that extracts cyclic shift delay amount information transmitted from base station apparatus 2d (see FIG. 18), and a transmitting section (comprised of base station specific delay amount adding sections 311-1 and 311-2, CP adding sections 19 and 21, radio transmitting sections 20 and 22, and antennas 40-1 and 40-2) that performs cyclic-shift-delayed transmission of a channel quality measurement signal to base station apparatus 2d using cyclic shift delay amount information (here, cyclic shift delay amount information that differs for each sector) extracted by base station specific delay amount information extraction section 310.

Base station specific delay amount information extraction section 310 extracts information relating to an specific (unique) cyclic shift delay amount that differs for each sector configured by base station apparatus 2d (hereinafter referred to as base station specific delay amount information) from a demodulation/decoding section 33 output signal. Base station specific delay amount information here is information transmitted from base station apparatus 2d (see FIG. 18). The configuration of base station apparatus 2d (see FIG. 18) will be described later herein.

Based on a cyclic shift delay amount indicated by base station specific delay amount information that is base station specific delay amount information extraction section 310 output information, base station specific delay amount adding sections 311-1 and 311-2 add a common cyclic shift delay to the outputs of IFFT section 16 and cyclic shift delay adding section 18, and output the resulting signals to CP adding sections 19 and 21. FIG. 15 shows a case in which there are two transmitting antennas (40-1 and 40-2), but if there are three or more antennas, a cyclic shift delay amount indicated by a common base station specific delay amount is added by signal processing section 311 for each antenna in a similar way. The same kind of effect is also obtained if the processing order of cyclic shift delay adding section 18 and base station specific delay amount adding section 311-2 is switched around.

Figure 16:
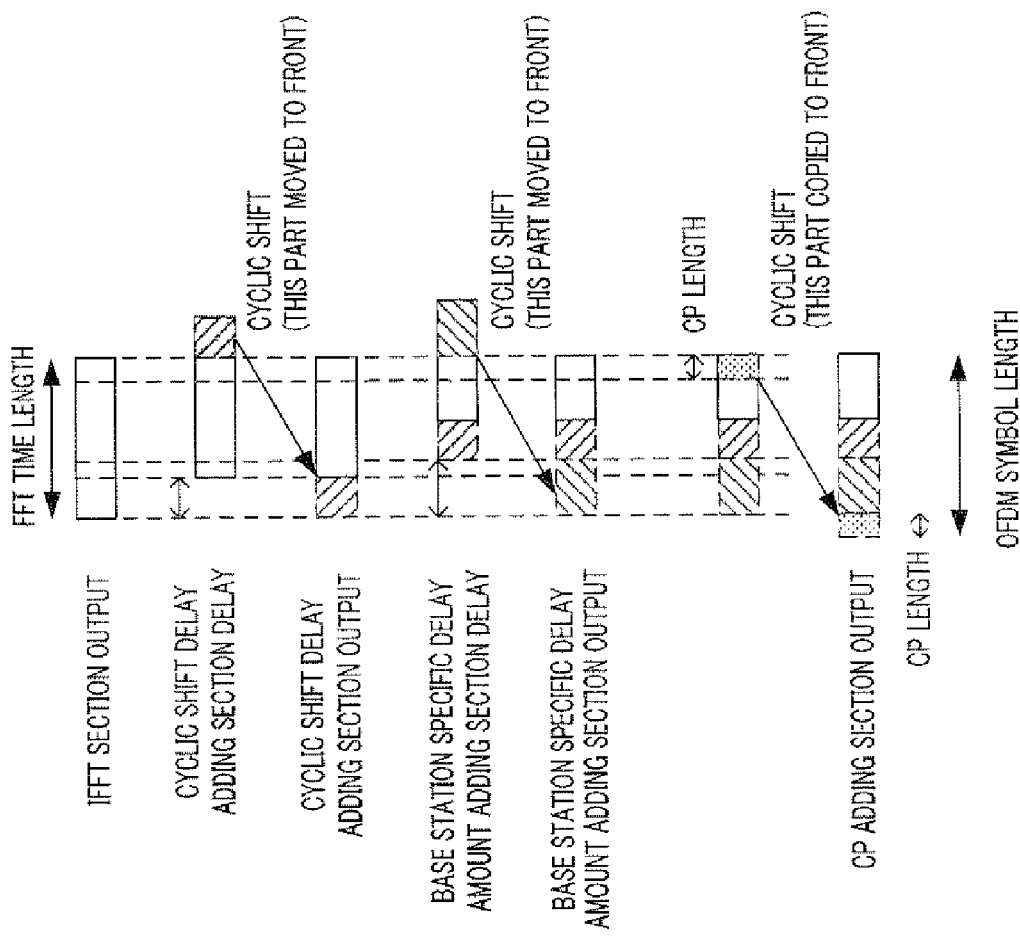
FIG. 16 is a drawing showing cyclic shift delay adding section, base station specific delay amount adding section, and CP adding section output signals corresponding to IFFT section output.

FIG. 16 shows cyclic shift delay adding section 18, base station specific delay amount adding section 311, and CP adding sections 19 and 21 output signals corresponding to IFFT section 16 output. That is to say, an IFFT section 16 output signal is time-shifted based on cyclic shift delay adding section 18 or base station specific delay amount adding section 311-1 and 311-2 predetermined delay amount information, a part of the FFT section output signal exceeding the FFT time length as a result of the time-shift is removed, and this part is moved to the front.

CP adding sections 19 and 21 perform processing that copies the CP length time part from the rear of the base station specific delay amount adding section 311-1 and 311-2 output signals to the front.

Figure 17:
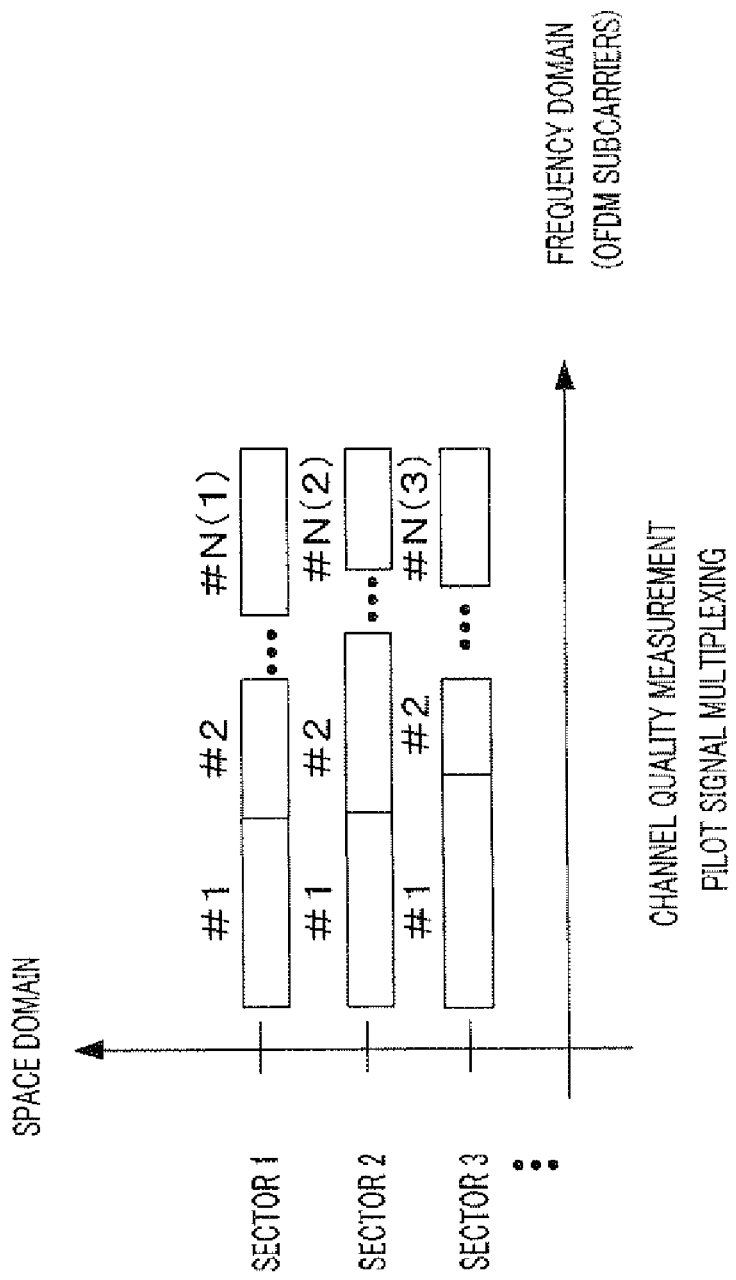
FIG. 17 is a drawing showing channel quality measurement pilot signals allocated to a plurality of radio communication apparatuses present in different sectors.

FIG. 17 shows channel quality measurement pilot signals allocated to plurality of radio communication apparatuses 1d-1 through N(k) present in different sectors (for example, sectors 1 through 3). In this embodiment, as shown in FIG. 17, a channel quality measurement pilot signal uses frequency subcarrier signals in OFDM symbols of the same time in different sectors (for example, sectors 1 through 3). Also, within the k'th sector, channel quality measurement pilot signals transmitted from plurality of radio communication apparatuses 1d-1 through N(k) are multiplexed by means of FDM.

Figure 18:
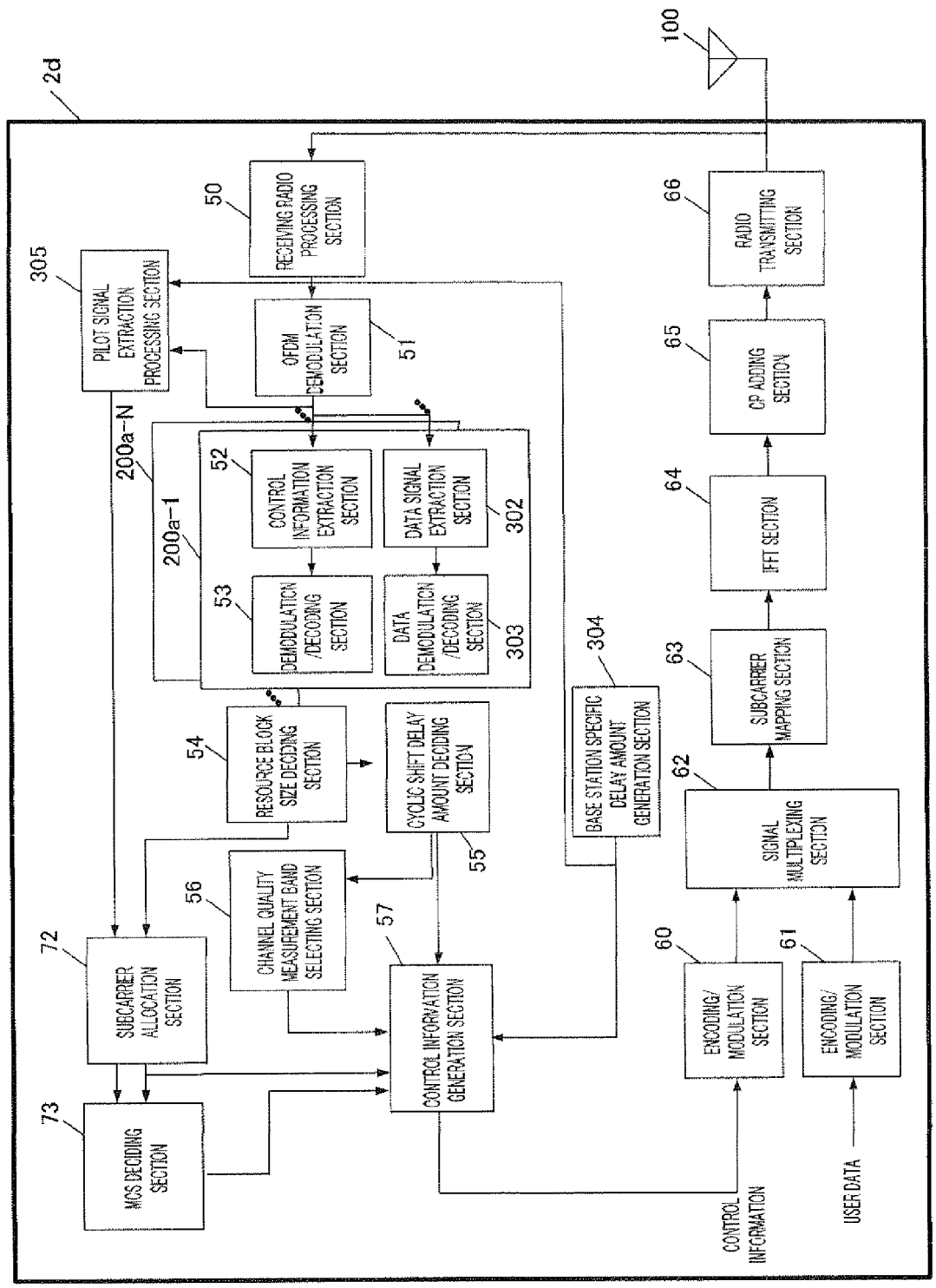
FIG. 18 is a drawing showing the configuration of a base station apparatus according to Embodiment 5.

FIG. 18 is a drawing showing the configuration of base station apparatus 2d according to Embodiment 5. This base station apparatus 2d has a similar basic configuration to that of base station apparatus 2 according to Embodiment 1 shown in FIG. 2, and therefore identical configuration elements are assigned the same reference codes, descriptions thereof are omitted here, and only points of difference are described. In the following description it is assumed that each of radio communication apparatuses 1d-1 through N establishes synchronization with base station apparatus 2d, and reception timing drift in an uplink base station apparatus is synchronized with error accuracy of a level within a guard interval length. For inter-base-station-apparatus synchronization between sectors, also, it is similarly assumed that reception timing drift is synchronized with error accuracy of a level within a guard interval length by an uplink base station apparatus.

Base station apparatus 2d differs from base station apparatus 2 shown in FIG. 2 in newly having base station specific delay amount generation section 304 and pilot signal extraction processing section 305, and in being equipped with data signal extraction section 302 and data demodulation and decoding section 303 instead of pilot signal extraction section 70 and reception quality measuring section 71 in received signal processing sections 200-1 through 200-N that perform received signal processing.

Pilot signal extraction processing section 305 includes the operations of pilot signal extraction section 70 and reception quality measuring section 71 in base station apparatus 2 shown in FIG. 2. Consequently, in base station apparatus 2d shown in FIG. 18, unlike base station apparatus 2, pilot signal extraction section 70 and reception quality measuring section 71 are unnecessary components. A description of the operation of base station apparatus 2d is given below. In the following description, the number of sectors configured by base station apparatus 2d is denoted by (N_SECTOR).

Data signal extraction section 302 extracts a data signal transmitted from radio communication apparatus 1d from a received signal input from OFDM demodulation section 51 similar to OFDM demodulation section 51 in base station apparatus 2, and outputs this to data demodulation/decoding section 303.

Base station apparatus 2d here has plurality N received signal processing sections 200a including control information extraction section 52, demodulation/decoding section 53, data signal extraction section 302, and data demodulation/decoding section 303. If a signal demodulated by OFDM demodulation section 51 in base station apparatus 2d includes signals transmitted by plurality of radio communication apparatuses 1d-1 through N, received signal processing sections separately perform the above-described processing for each radio communication apparatus in the is N received signal processing sections 200a. Specifically, received signal processing section 200a-k performs the above-described processing for k'th radio communication apparatus 1d-k. In base station apparatuses 2 and 2b, also, received signal processing section 200-k performs processing for k'th radio communication apparatus 1d-k using sections 52, 53, 70, and 71.

Base station specific delay amount generation section 304 generates base station specific delay amount information that is information relating to an specific cyclic shift delay amount that differs for each sector configured by a base station apparatus, and outputs this information to control information generation section 57 and pilot signal extraction processing section 305. Control information generation section 57 generates control information including base station specific delay amount information (a sector specific delay amount) in addition to the control information shown in Embodiment 1. Base station specific delay amount information generated by base station specific delay amount generation section 304 may be information relating to an specific cyclic shift delay amount that differs for adjacent base station apparatuses instead of information relating to an specific cyclic shift delay amount that differs for each sector configured by a base station apparatus.

The following is an example of an actual method of generating an specific cyclic shift delay amount that differs for adjacent base station apparatuses. Namely, if integer value BS_ID(k) is assigned as an identification number specific to the k'th base station apparatus, and the maximum number that can be assigned as an specific cyclic delay amount is designated N_DL, a modulo operation is executed on BS_ID(k) using N_DL (the remainder when integer value BS_ID(k) is divided by N_DL is calculated). The value obtained by this operation is taken as an specific cyclic shift delay amount. By this means, when base station apparatuses are installed, different specific cyclic shift delay amounts can be assigned to adjacent base station apparatuses by allocating identification number BS_ID(k) IDs unique to base stations sequentially and consecutively to adjacent areas.

Base station specific delay amount information in a sector configured by a base station apparatus generated by base station specific delay amount generation section 304 will now be described. A base station specific delay amount (sector specific delay amount) D(k) in the k'th sector configured by a base station apparatus is set by base station specific delay amount generation section 304 so that the relationships in Equations (4) and (5) below are satisfied.

[4]
$$T\_GI \leq At \leq T\_FFT/N\_SECTOR \quad \text{(Equation 4)}$$

Figure 19:
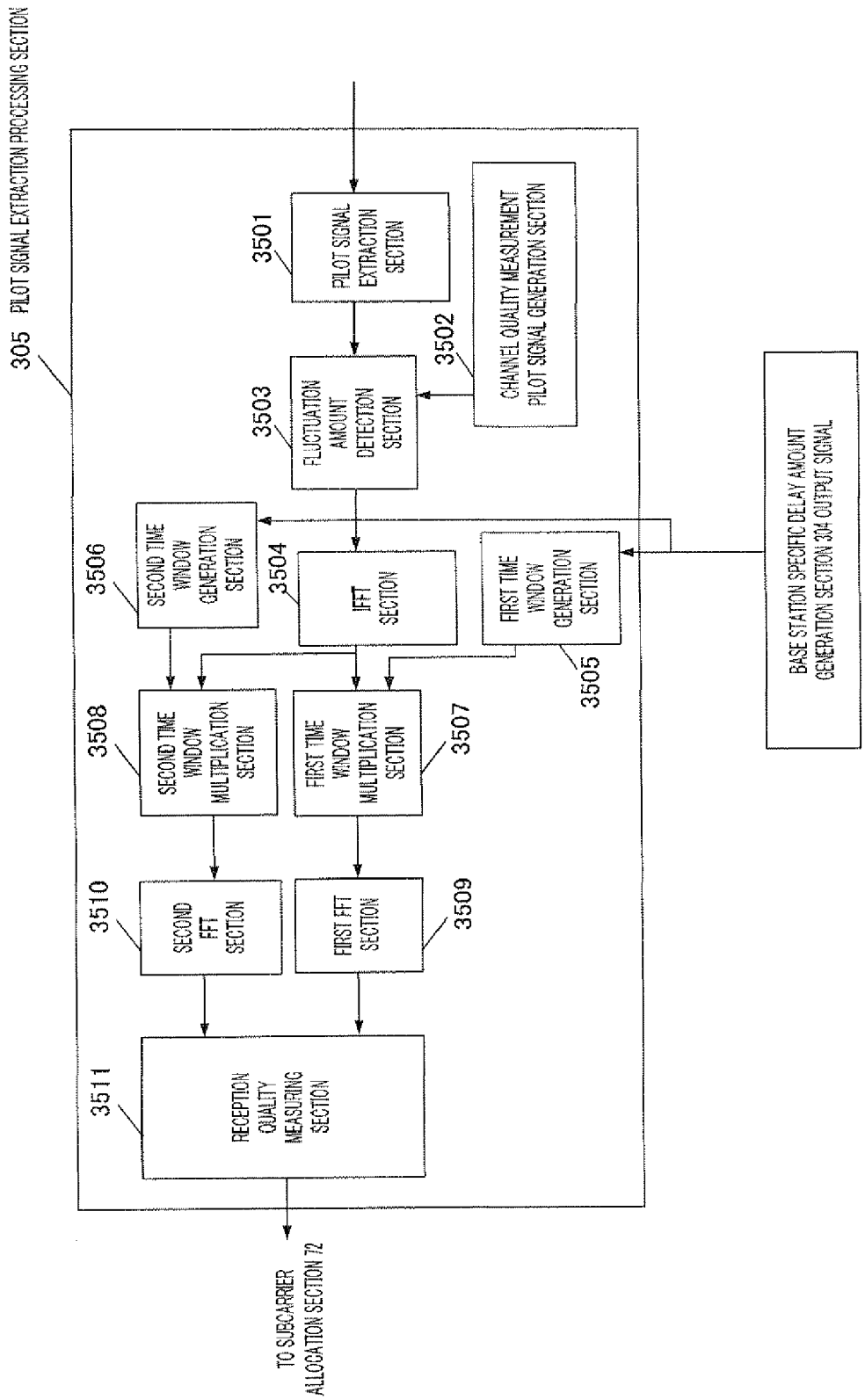
FIG. 19 is a block diagram showing the configuration of a pilot signal extraction processing section.

[5]
$$D(k) = (k-1) \times At \quad \text{(Equation 5)}$$

where:
k=1 to N_SECTOR
number of sectors configured by base station apparatus 2d: N_SECTOR
CP length (guard interval length) added by CP adding section 19: T_GI
FFT time length transmitted from radio communication apparatus 1d: T_FFT FIG. 19 is a block diagram showing the configuration of pilot signal extraction processing section 305. As shown in FIG. 19, pilot signal extraction processing section 305 has pilot signal extraction section 3501, channel quality measurement pilot signal generation section 3502, fluctuation amount detection section 3503, IFFT section 3504, first and second time window generation sections 3505 and 3506, first and second time window multiplication sections 3507 and 3508, first and second FFT sections 3509 and 3510, and reception quality measuring section 3511.

Pilot signal extraction section 3501 extracts subcarrier signal SC(T_PL,fn) included in an OFDM symbol including a channel quality measurement pilot signal transmitted from plurality of radio communication apparatuses 1*d*-1 through N(k) belonging to the k'th sector, which is its corresponding sector, on a subcarrier signal input from OFDM demodulation section 51 (see FIG. 18). At this time, a subcarrier signal in which a channel quality measurement pilot signal has not been transmitted is taken to be a null signal (a state in which there are no signal components, replacing a signal-less state). Here, T_PL indicates OFDM symbol timing in which a channel quality measurement pilot signal is included, and fn indicates a subcarrier number. Extracted subcarrier signal SC(T_PL,fn) is output to fluctuation amount detection section 3503.

Channel quality measurement pilot signal generation section 3502 generates a channel quality measurement pilot signal known beforehand, transmitted using OFDM subcarrier signals, as OFDM symbol unit subcarrier signal SC_PL (T_PL,fn). Generated OFDM symbol unit subcarrier signal SC_PL(T_PL,fn) is output to fluctuation amount detection section 3503.

Using a channel quality measurement pilot signal known beforehand input from channel quality measurement pilot signal generation section 3502, fluctuation amount detection section 3503 detects a fluctuation amount of the channel quality measurement pilot signal input from pilot signal extraction section 3501.

Specifically, using OFDM symbol unit subcarrier signal SC_PL(T_PL,fn) generated as a known signal, fluctuation amount detection section 3503 detects complex fluctuation amount SC_ch(T_PL,fn) received by the extracted channel quality measurement pilot signal on the channel. That is to say, SC_ch(T_PL,fn)=SC(T_PL,fn)/SC_PL(T_PL,fn) is computed in subcarrier units for all valid subcarriers (fn=1 to Nsc), where Nsc is the number of valid subcarriers included in an OFDM symbol. The complex fluctuation amount calculated by fluctuation amount detection section 3503 is output to IFFT section 3504.

With calculated complex fluctuation amount SC_ch(T_PL, fn) as input, IFFT section 3504 performs IFFT processing using predetermined FFT sample quantity NFFT, and converts a frequency domain signal to time domain signal y(T_PL,t). Here, fn=1 to Nsc. If Nsc does not satisfy NFFT, IFFT section 3504 performs zero-filling, or performs interpolation using complex fluctuation amount SC_ch(T_PL,fn). The post-conversion signal, time domain signal y(T_PL,t), is output to first time window multiplication section 3507 and second time window multiplication section 3508.

First time window generation section 3505 generates time window WIN1(*t*) as shown in Equations (6) and (7) below based on base station specific delay amount D(k), which is an output signal of base station specific delay amount generation section 304 (see FIG. 18), in the k'th sector. Here, Tw is the time window length, and Tw is set so as to satisfy the relationship T_GI≦Tw≦At.

[6]

$$WIN1(t)=1, \text{ when } D(k) \leq t \leq D(k)+\text{Tw} \quad \text{(Equation 6)}$$

$$WIN1(t)=0, \text{ when } 0 < t < D(k), D(k)+\text{Tw} < t \leq T\_\text{FFT} \quad \text{(Equation 7)}$$

Second time window generation section 3506 generates time window WIN2(*t*) as shown in Equations (8) and (9) below based on base station specific delay amount D(k), which is an output signal of base station specific delay amount generation section 304 (see FIG. 18), in the k'th sector. Here, Tw is the time window length, and Tw is set so as to satisfy the relationship T_GI≦Tw≦At.

[7]

$$WIN2(t)=0, \text{ when } D(k) \leq t \leq D(k)+\text{Tw} \quad \text{(Equation 8)}$$

$$WIN2(t)=1, \text{ when } 0 < t < D(k), D(k)+\text{Tw} < t \leq T\_\text{FFT} \quad \text{(Equation 9)}$$

First time window multiplication section 3507 outputs result y(T_PL,t)×WIN1(*t*) of multiplying IFFT section 3504 output signal y(T_PL,t) by first time window WIN1(*t*).

Second time window multiplication section 3508 outputs result y(T_PL,t)×WIN2(*t*) of multiplying IFFT section 3504 output signal y(T_PL,t) by second time window WIN2(*t*).

First FFT section 3509 converts a time domain signal to frequency domain signal SC_D(T_PL,fn) by performing FFT processing on the first time window multiplication section 3507 output signal. SC_D(T_PL,fn) is output to the reception quality measuring section as a desired sector signal component estimator.

Second FFT section 3510 converts a time domain signal to frequency domain signal SC_U(T_PL,fn) by performing FFT processing on the second time window multiplication section 3508 output signal. SC_U(T_PL,fn) is output to the reception quality measuring section as an other sector interference signal component estimator.

Reception quality measuring section 3511 measures per-subcarrier reception quality based on first FFT section 3509 output and second FFT section 3510 output. That is to say, reception quality measuring section 3511 outputs the result of calculating per-subcarrier reception quality Q_SC (T_PL,fn)=SC_D(T_PL,fn)/SC_U(T_PL,fn) in a channel quality measurement partial band, also including desired sector signal component estimator SC_D(T_PL,fn), to subcarrier allocation section 72.

Figure 20:
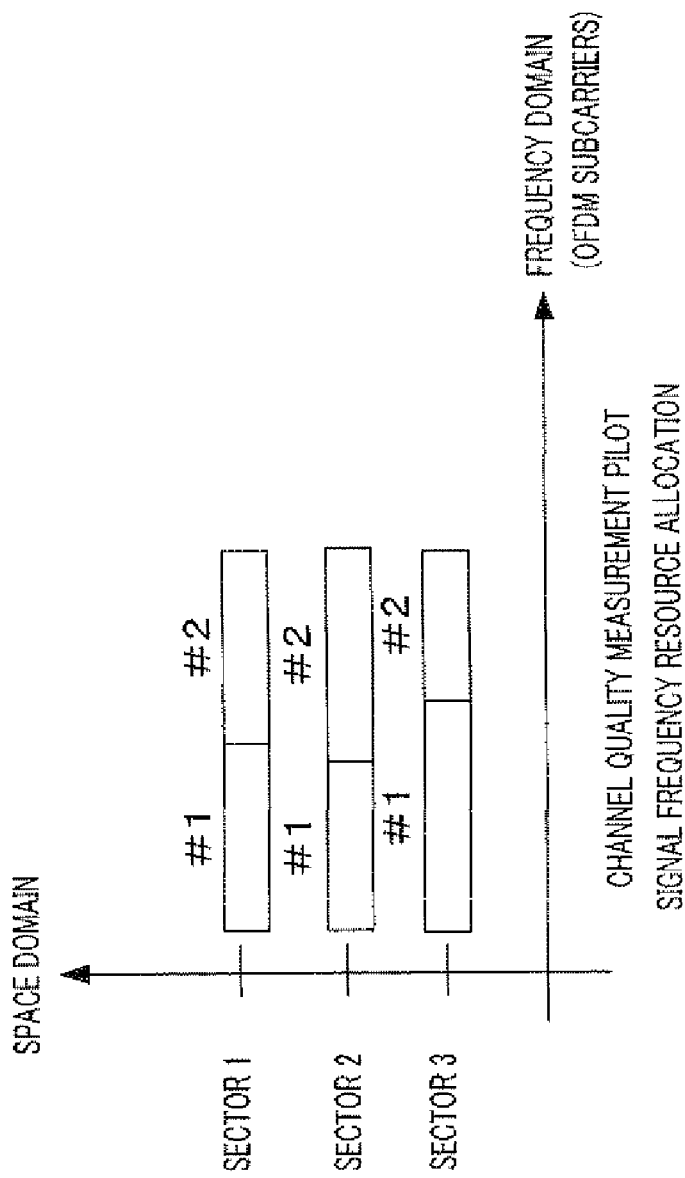
FIG. 20 is a drawing showing the operation of a pilot signal extraction processing section in a base station apparatus having a plurality of sectors in which a plurality of radio communication apparatuses are present.
Figure 21:
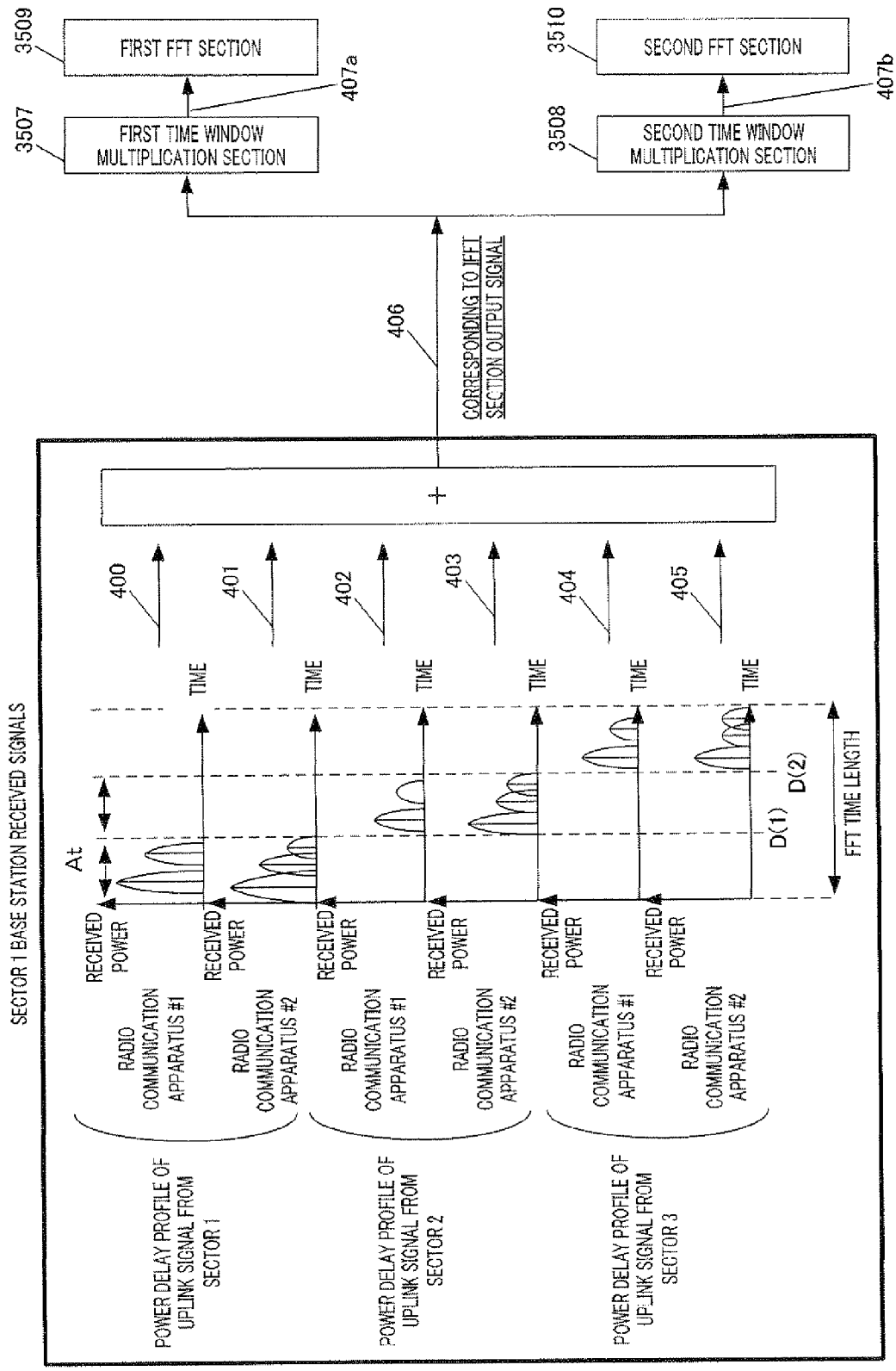
FIG. 21 is a drawing showing the operation of a pilot signal extraction processing section in a base station apparatus having a plurality of sectors in which a plurality of radio communication apparatuses are present.

FIG. 20 through FIG. 22 are drawings showing the operation of a pilot signal extraction processing section in a base station apparatus having a plurality of sectors in which a plurality of radio communication apparatuses are present. Specifically, FIG. 20 through FIG. 22 are drawings showing schematically the operation of pilot signal extraction processing section 305 in sector 1 base station apparatus 1*d*-1 when number of sectors N_SECTOR=3, and number of radio communication apparatuses present in each sector N(k)=3. FIG. 20 is a drawing showing schematically signals input to pilot signal extraction processing section 305, FIG. 21 is a drawing showing schematically signals processed in the pilot signal extraction processing section, and FIG. 22 is a drawing showing signals flowing between blocks in the pilot signal extraction processing section.

If the local sector and another sector perform channel quality measurement pilot signal transmission using the same subcarrier signal at the same time, a received signal in a sector 1 base station apparatus includes an interference signal not only from a radio communication apparatus present in the local sector but also from a radio communication apparatus present in another sector, as shown in FIG. 20 and FIG. 21.

In the present invention, radio communication apparatuses #1 and #2 in each sector (sectors 1 through 3) perform uplink transmission using a different cyclic delay D(k) for each sector (sectors 1 through 3), Consequently, in pilot signal extraction processing section 305, time domain signals obtained by performing an IFFT by means of IFFT section 3504 on a fluctuation amount detection section 3503 output signal correspond to the following kinds of signals.

Figure 22A:
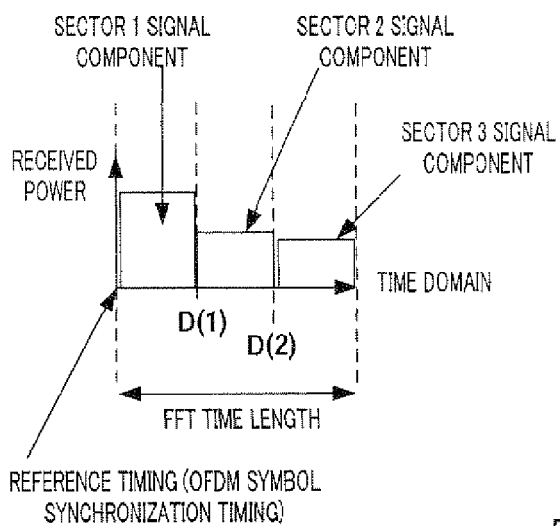
FIG. 22 is a drawing showing the operation of a pilot signal extraction processing section in a base station apparatus having a plurality of sectors in which a plurality of radio communication apparatuses are present.
Figure 22B:
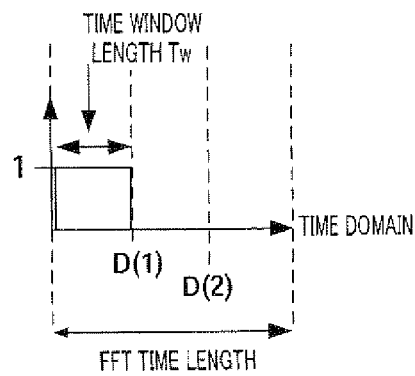
Figure 22C:
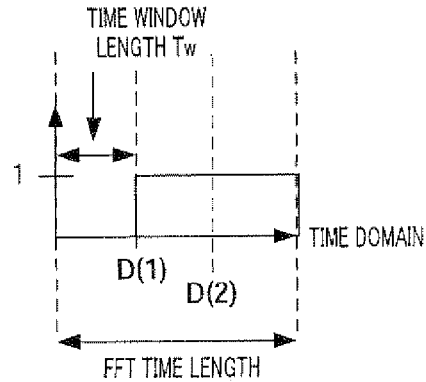

Namely, an uplink delay profile received after traversing a channel to base station apparatus 2*d* from radio communication apparatuses #1 and #2 (shown by sectors 1 through 3 in FIG. 21) is detected as signal 406 combining signals (400 through 405) time-shifted by cyclic delay amount D(k). This combined signal 406 corresponds to an IFFT section output signal, and FIG. 22A shows signal 406 before a desired sector signal component and interference sector signal component are separated in the time domain.

Figure 22D:
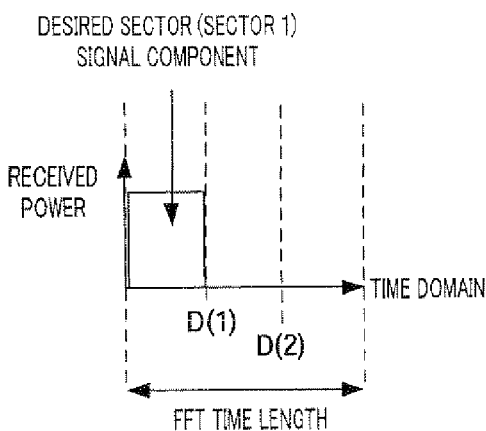
Figure 22E:
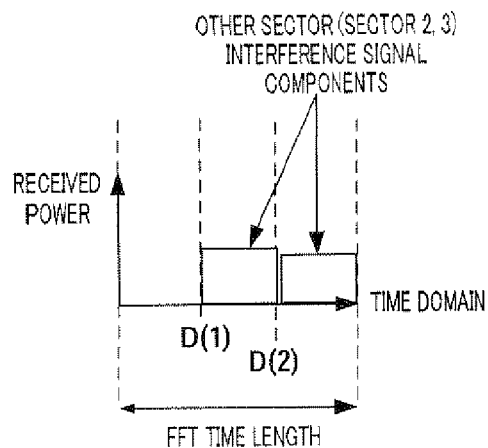

Therefore, by multiplying signal 406 output from IFFT section 3504 by a time window by means of first or second time window multiplication section 3507 or 3508, a desired sector signal component and interference sector signal component can be separated in the time domain and detected. The operation of first time window multiplication section 3507 is shown in a schematic diagram in FIG. 22B, and the operation of second time window multiplication section 3508 is shown in a schematic diagram in FIG. 22C. Signal 407*a* output from first time window multiplication section 3507 to first FFT section 3509 is shown in FIG. 22D, and signal 407*b* output from second time window multiplication section 3508 to second FFT section 3510 is shown in FIG. 22E.

Signals 407*a* and 407*b* are signals resulting from separating a desired sector signal component (signal 407*a* component shown in FIG. 22D) and interference sector signal component (signal 407*b* component shown in FIG. 22E) in the time domain in first time window multiplication section 3507 and second time window multiplication section 3508. By converting signal 407*a* in which a desired sector signal component has been separated in the time domain and signal 407*b* in which an interference sector signal component has been separated in the time domain to frequency domain signals by means of first and second FFT sections 3509 and 3510, per-subcarrier desired sector signal components and interference sector signal components can be detected.

Subcarrier allocation section 72 allocates a subcarrier to radio communication apparatus 1*d* using pilot signal extraction processing section 305 output reception quality measurement result Q_SC(T_PL,fn) and desired sector signal component estimator SC_D(T_PL,fn). Specifically, subcarrier allocation section 72 performs scheduling based on a scheduling algorithm, using an RB size from resource block size deciding section 54, based on channel quality Q_SC(T_PL, fn) and desired sector signal component estimator SC_D (T_PL,fn) corresponding to SIR information of each subcarrier of each user's radio communication apparatus input from pilot signal extraction processing section 305, and outputs this to MCS deciding section 73 and control information generation section 57.

In the scheduling algorithm here, scheduling that takes inter-sector interference conditions into consideration is performed by using channel quality Q_SC(T_PL,fn) and desired sector signal component estimator SC_D(T_PL,fn) obtained from a plurality of sectors.

That is to say, for a subcarrier for which channel quality Q_SC(T_PL,fn) is higher than a predetermined threshold value, radio communication apparatuses are multiplexed between sectors using the same frequency resource and the same time resource in common. On the other hand, if channel quality Q_SC(T_PL,fn) is lower than the predetermined threshold value, an M-ary value based on desired sector signal component estimator SC_D(T_PL,fn) can be set appropriately after reducing an interference signal component from another sector by differentiated allocation of frequency or time resources between sectors.

Base station apparatus 2*d* of this embodiment is equipped with base station specific delay amount generation section (cyclic shift delay amount generation section) 304 that generates base station specific delay amount information (cyclic shift delay amount information) used by radio communication apparatus 1*d* that performs cyclic-shift-delayed transmission of a channel quality measurement signal, and a transmitting section that transmits base station specific delay amount information (cyclic shift delay amount information) to the radio communication apparatus. Also, base station specific delay amount generation section (cyclic shift delay amount generation section) 304 generates base station specific delay amount information (cyclic shift delay amount information) so as to differ for each sector.

In base station apparatus 2*d* of this embodiment, by multiplexing channel quality measurement pilot signals using frequency resources and time resources in common in a plurality of sectors while making cyclic delay amounts different, channel quality information corresponding to per-subcarrier SIR information, desired sector signal component estimator SC_D(T_PL,fn), and other sector interference signal component estimator SC_U(T_PL,fn) within a channel quality measurement partial band for a plurality of sectors can each be estimated independently.

Therefore, frequency resources and time resources used in channel quality measurement pilot signal transmission can be reduced, and data transmission efficiency can be increased. Also, by using channel quality Q_SC(T_PL,fn) and desired sector signal component estimator SC_D(T_PL,fn) obtained from a plurality of sectors in subcarrier allocation section 72, scheduling that takes inter-sector interference conditions into consideration can be performed, and frequency utilization efficiency can be increased.

Figure 23:
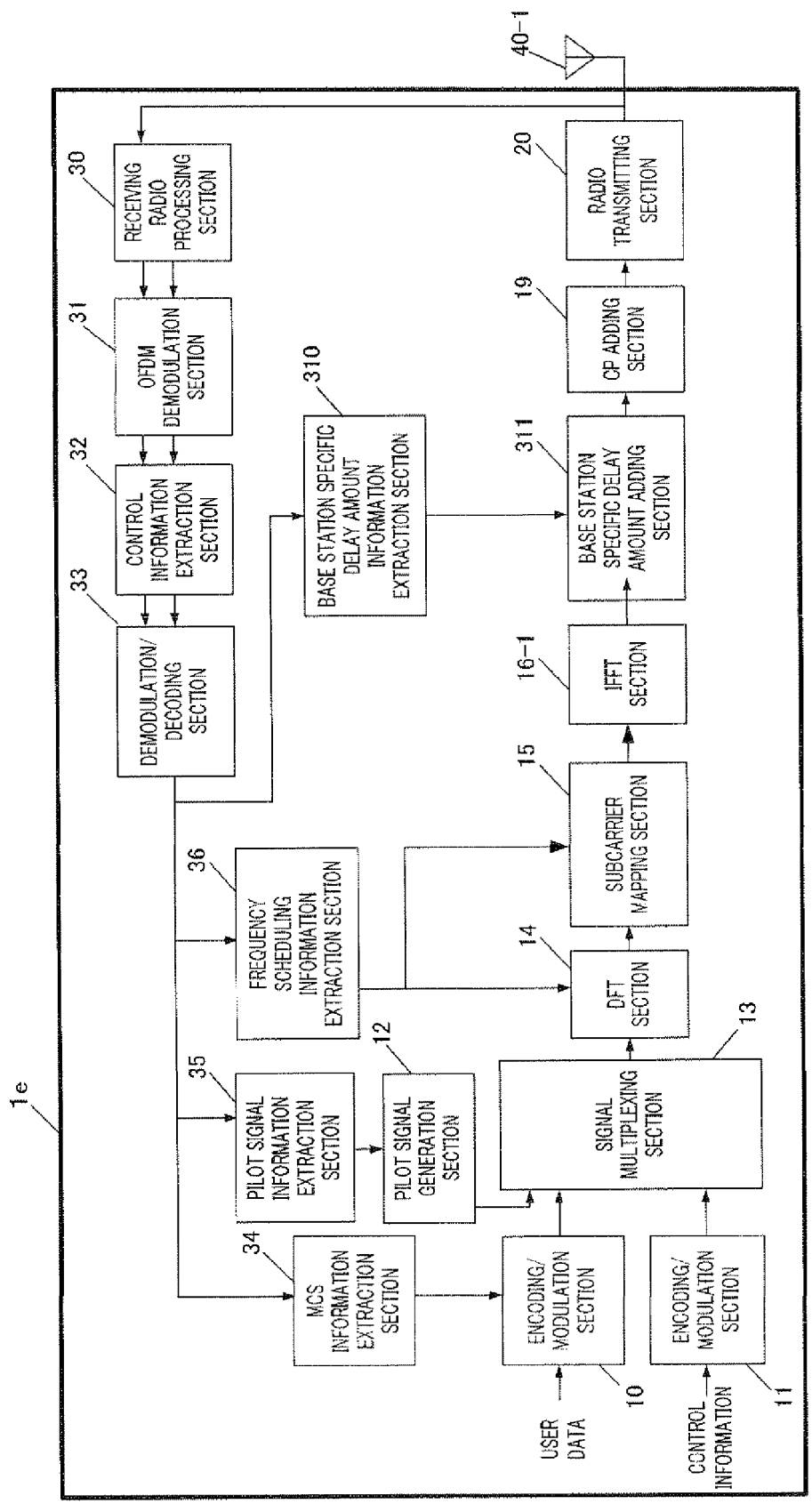
FIG. 23 is a drawing showing the configuration of a sample variant of a radio communication apparatus according to Embodiment 5 of the present invention.

FIG. 23 is a block diagram showing the configuration of sample variant radio communication apparatus 1*e* of radio communication apparatus 1*d* according to Embodiment 5.

Radio communication apparatus 1*e* shown in FIG. 23 illustrates a radio communication apparatus configuration capable of transmission from one antenna.

Base station specific delay amount information extraction section 310 extracts base station specific delay amount information unique to a sector configured by base station apparatus 2*d* (see FIG. 18) from a demodulation/decoding section 33 output signal, and outputs this information to base station specific delay amount adding section 311.

Using a cyclic shift delay amount indicated by base station specific delay amount information that is base station specific delay amount information extraction section 310 output information, base station specific delay amount adding section 311 adds cyclic shift delay to the output of IFFT section 16, and outputs the resulting signal to CP adding section 19.

According to this configuration, with a radio communication apparatus capable of transmission from one antenna, also, the effects of an above-described embodiment can be obtained in a base station apparatus in the same way as with radio communication apparatus 1*d* capable of multi-antenna transmission shown in FIG. 15.

In this embodiment, code multiplex transmission may also be performed by further using an orthogonal code sequence that differs for each sector in a channel quality measurement pilot signal transmitted from each user's radio communication apparatus. As additional effects of this embodiment achieved by this means, inter-sector signal separation accuracy can be increased due to the orthogonal code sequence, and channel quality Q_SC(T_PL,fn) and desired sector signal component estimator SC_D(T_PL,fn) estimation accuracy can be improved.

Also, when a plurality of base station apparatuses respectively configure a plurality of sectors, setting is performed so that base station specific delay amount $D_1(k)$ does not overlap base station specific delay amount $D_2(k)$ in a sector configured by adjacent base station apparatuses. By this means, the same kind of effect as in this embodiment is obtained even if channel quality measurement pilot signals are transmitted using the same frequency resources and time resources. Furthermore, even if an interference signal from another sector with a different base station apparatus is included in a channel quality measurement pilot signal received signal of each base station apparatus, separation from a desired signal component can be achieved in reception, and reception quality measurement accuracy can be secured.

(Embodiment 6)

Figure 24:
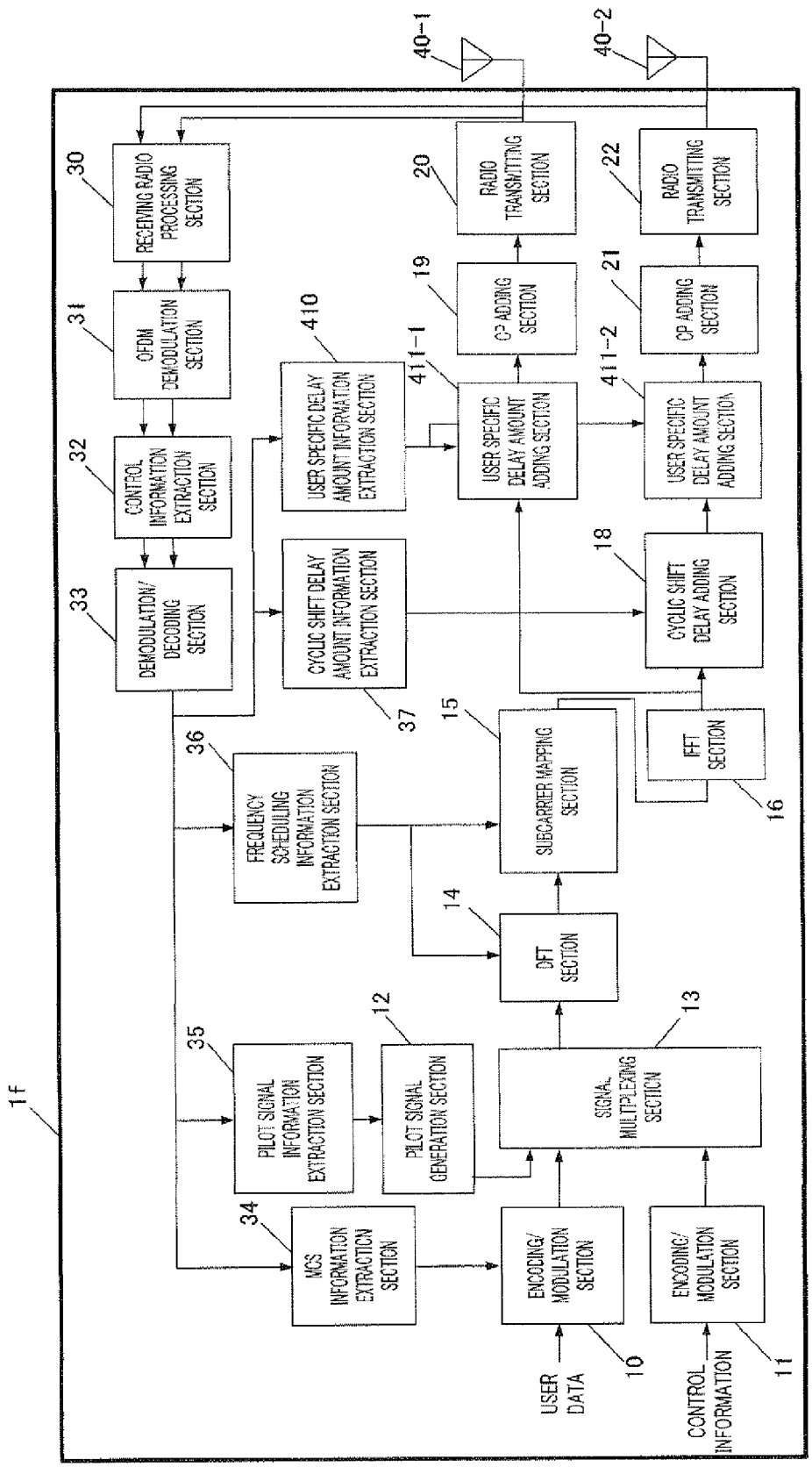
FIG. 24 is a block diagram showing the configuration of a radio communication apparatus according to Embodiment 6 of the present invention.

FIG. 24 is a block diagram showing the configuration of radio communication apparatus 1f according to Embodiment 6 of the present invention. Radio communication apparatus (radio communication terminal) 1f has a similar basic configuration to that of radio communication apparatus 1 according to Embodiment 1 shown in FIG. 1, and therefore identical configuration elements are assigned the same reference codes, descriptions thereof are omitted here, and only points of difference are described.

Radio communication apparatus 1f differs from radio communication apparatus 1 shown in FIG. 1 in being newly equipped with user specific delay amount information extraction section 410, and user specific delay amount adding sections 411-1 and 411-2.

Radio communication apparatus 1f is equipped with user specific delay amount information extraction section (cyclic shift delay amount information extraction section) 410 that extracts cyclic shift delay amount information transmitted from base station apparatus 2e (see FIG. 26), and a transmitting section (comprised of user specific delay amount adding sections 411-1 and 411-2, CP adding sections 19 and 21, radio transmitting sections 20 and 22, and antennas 40-1 and 40-2) that performs cyclic-shift-delayed transmission of a channel quality measurement signal to base station apparatus 2e using cyclic shift delay amount information (here, cyclic information relating to a shift delay amount unique to a user (a terminal serving as a radio communication apparatus)) extracted by user specific delay amount information extraction section 410. That is to say, radio communication apparatus 1f transmits a channel quality measurement signal to base station apparatus 2e using cyclic shift delay amount information that differs for each user.

User specific delay amount information extraction section 410 extracts information relating to a cyclic shift delay amount unique to each user (hereinafter referred to as user specific delay amount information) from a demodulation/decoding section 33 output signal when channel quality measurement pilot signals are multiplexed for different radio communication apparatuses 1e-1 through N(k) using the same OFDM symbol and same frequency subcarrier. User specific delay amount information here is information transmitted from base station apparatus 2e (see FIG. 26). The configuration of base station apparatus 2e (see FIG. 26) will be described later herein.

Based on a cyclic shift delay amount indicated by user specific delay amount information that is user specific delay amount information extraction section 410 output information, user specific delay amount adding sections 411-1 and 411-2 add a common cyclic shift delay to the outputs of IFFT section 16 and cyclic shift delay adding section 18, and input the resulting signals to CP adding sections 19 and 21. FIG. 24 shows a case in which there are two transmitting antennas (40-1 and 40-2), but if there are three or more antennas, a user specific delay amount is added and a cyclic shift delay amount indicated by a common user specific delay amount is added for each antenna in a similar way. The same kind of effect is also obtained if the processing order of cyclic shift delay adding section 18 and user specific delay amount adding section 411-2 is switched around.

Figure 25:
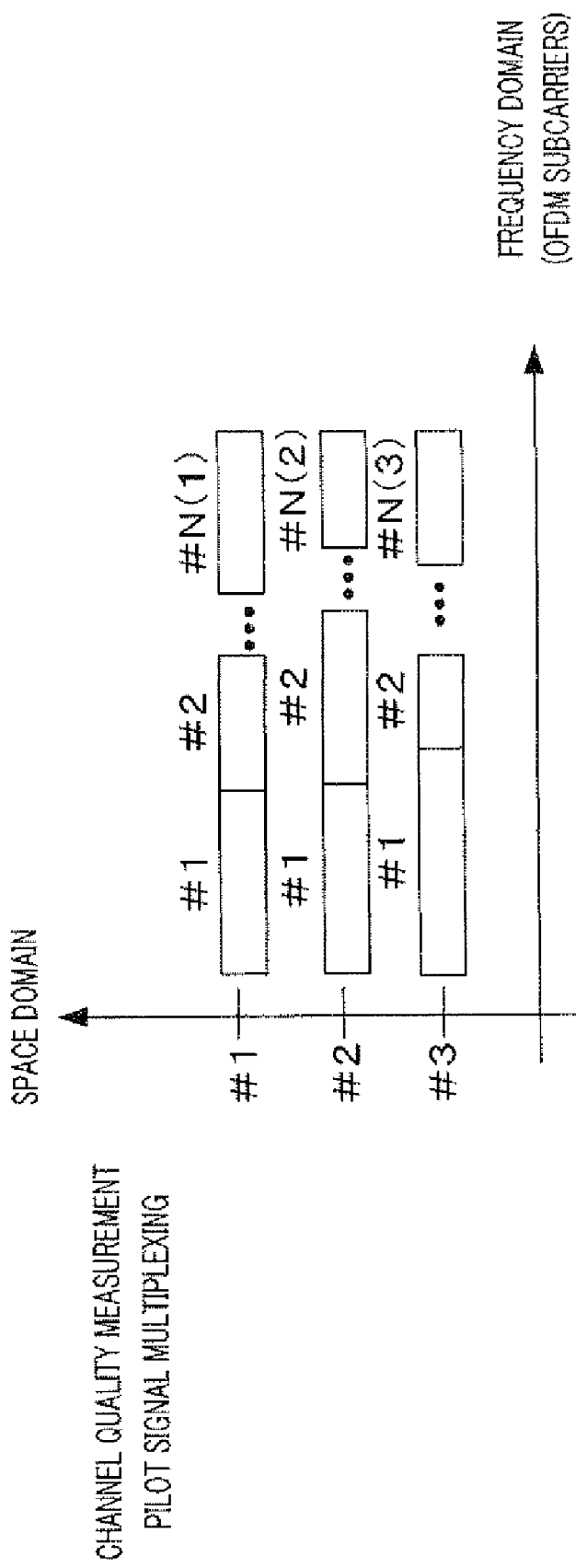
FIG. 25 is a drawing showing channel quality measurement pilot signals allocated to a plurality of radio communication apparatuses present in the same sector.

FIG. 25 shows channel quality measurement pilot signals allocated to a plurality of radio communication apparatuses 1e-1 through N(k) present in the same sector. In this embodiment, as shown in FIG. 25, a channel quality measurement pilot signal is multiplexed divided into Np signals using the same frequency subcarrier signal in the same OFDM symbol in the same sector. FIG. 25 shows an example in which Np=3.

Also, in a channel quality measurement pilot signal multiplexed as k'th, channel quality measurement pilot signals transmitted from plurality of radio communication apparatuses 1e-1 through N(k) are multiplexed using FDM. Here, k=1 to Np.

Figure 26:
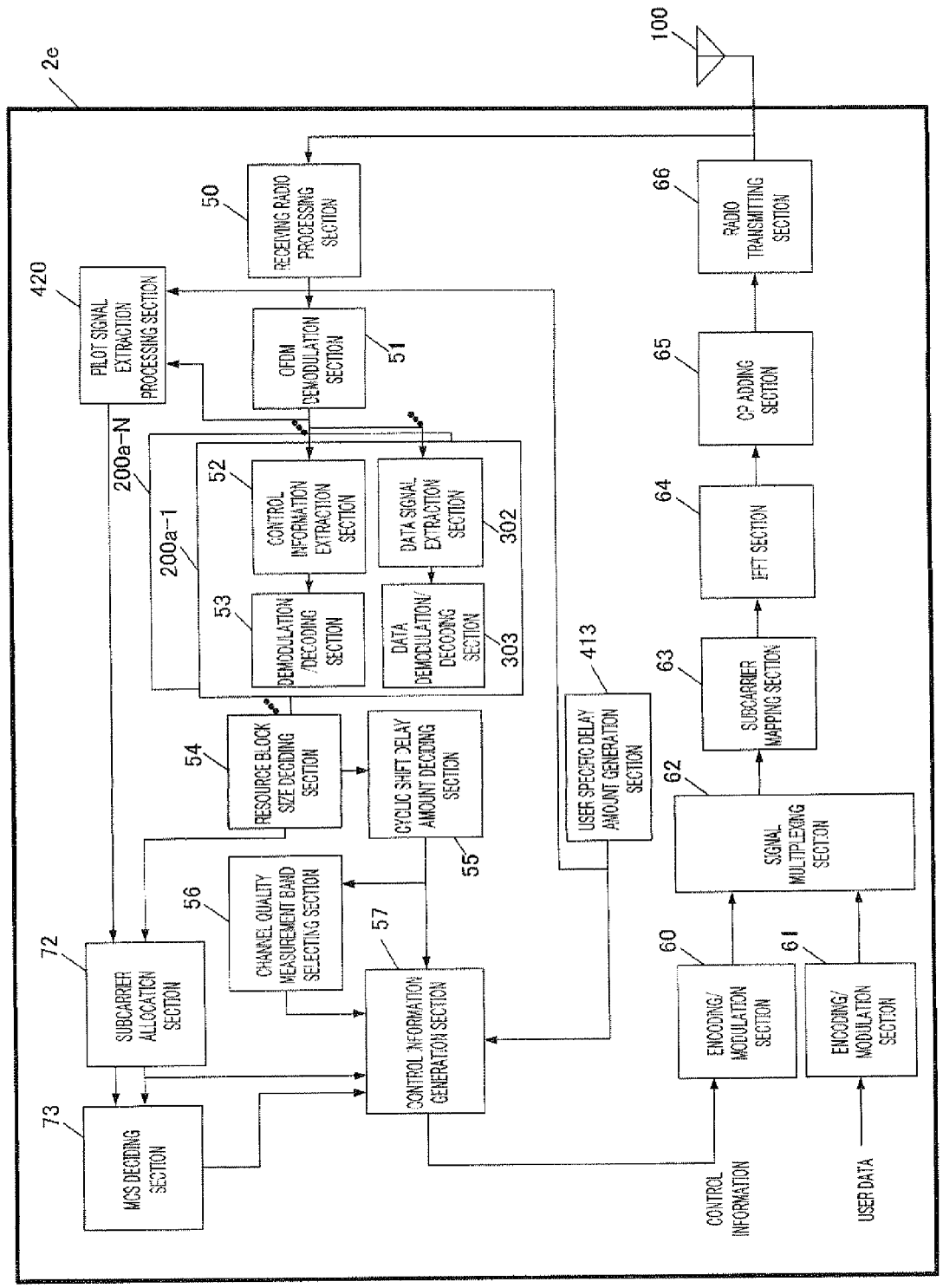
FIG. 26 is a block diagram showing the configuration of a base station apparatus according to Embodiment 6.

FIG. 26 is a block diagram showing the configuration of base station apparatus 2e according to Embodiment 6. This base station apparatus 2e has a similar basic configuration to that of base station apparatus 2 according to Embodiment 1 shown in FIG. 2, and therefore identical configuration elements are assigned the same reference codes, descriptions thereof are omitted here, and only points of difference are described. In the following description it is assumed that each of radio communication apparatuses 1e-1 through N establishes synchronization with base station apparatus 2e, and reception timing drift in an uplink base station apparatus is synchronized with error accuracy of a level within a guard interval length. For inter-base-station-apparatus synchronization between sectors, also, it is similarly assumed that reception timing drift is synchronized with error accuracy of a level within a guard interval length by an uplink base station apparatus.

Base station apparatus 2e differs from base station apparatus 2 shown in FIG. 2 in additionally having user specific delay amount generation section 413 and pilot signal extraction processing section 420.

Base station apparatus 2e is equipped with user specific delay amount generation section (cyclic shift delay amount generation section) 413 that generates a user specific delay amount (cyclic shift delay amount is information unique to each radio communication apparatus) used by radio communication apparatus 1f that performs cyclic-shift-delayed transmission of a channel quality measurement signal, and a transmitting section that transmits user specific delay amount information to radio communication apparatus 1f. Also, user specific delay amount generation section (cyclic shift delay amount generation section) 413 generates cyclic shift delay amount information so as to differ for each radio communication apparatus.

Base station apparatus 2e here has plurality N received signal processing sections 200a including control information extraction section 52, demodulation/decoding section 53, data signal extraction section 302, and data demodulation/decoding section 303. If a signal demodulated by OFDM demodulation section 51 in base station apparatus 2d includes signals transmitted by plurality of radio communication apparatuses 1d-1 through N, received signal processing sections separately perform the above-described processing for each radio communication apparatus in the N received signal processing sections 200. Specifically, received signal processing section 200-k performs the above-described processing for k'th radio communication apparatus 1d-k.

Pilot signal extraction processing section 420 includes the operations of pilot signal extraction section 70 and reception quality measuring section 71 in base station apparatus 2 shown in FIG. 2. Consequently, in base station apparatus 2e shown in FIG. 26, unlike base station apparatus 2, pilot signal extraction section 70 and reception quality measuring section 71 are unnecessary components. A description of the operation of base station apparatus 2e is given below.

User specific delay amount generation section 413 generates user specific delay amount information that is information relating to an specific cyclic shift delay amount for a channel quality measurement pilot signal that is multiplexed as k'th, and outputs this information to control information generation section 57 and pilot signal extraction processing section 420. Control information generation section 57 generates control information including user specific delay amount information in addition to the control information shown in Embodiment 1.

In user specific delay amount generation section 413, user specific delay amount (individual radio communication apparatus specific cyclic shift delay amount information) D(k) is set so as to satisfy the relationships in Equations (10) and (11) below.

Figure 27:
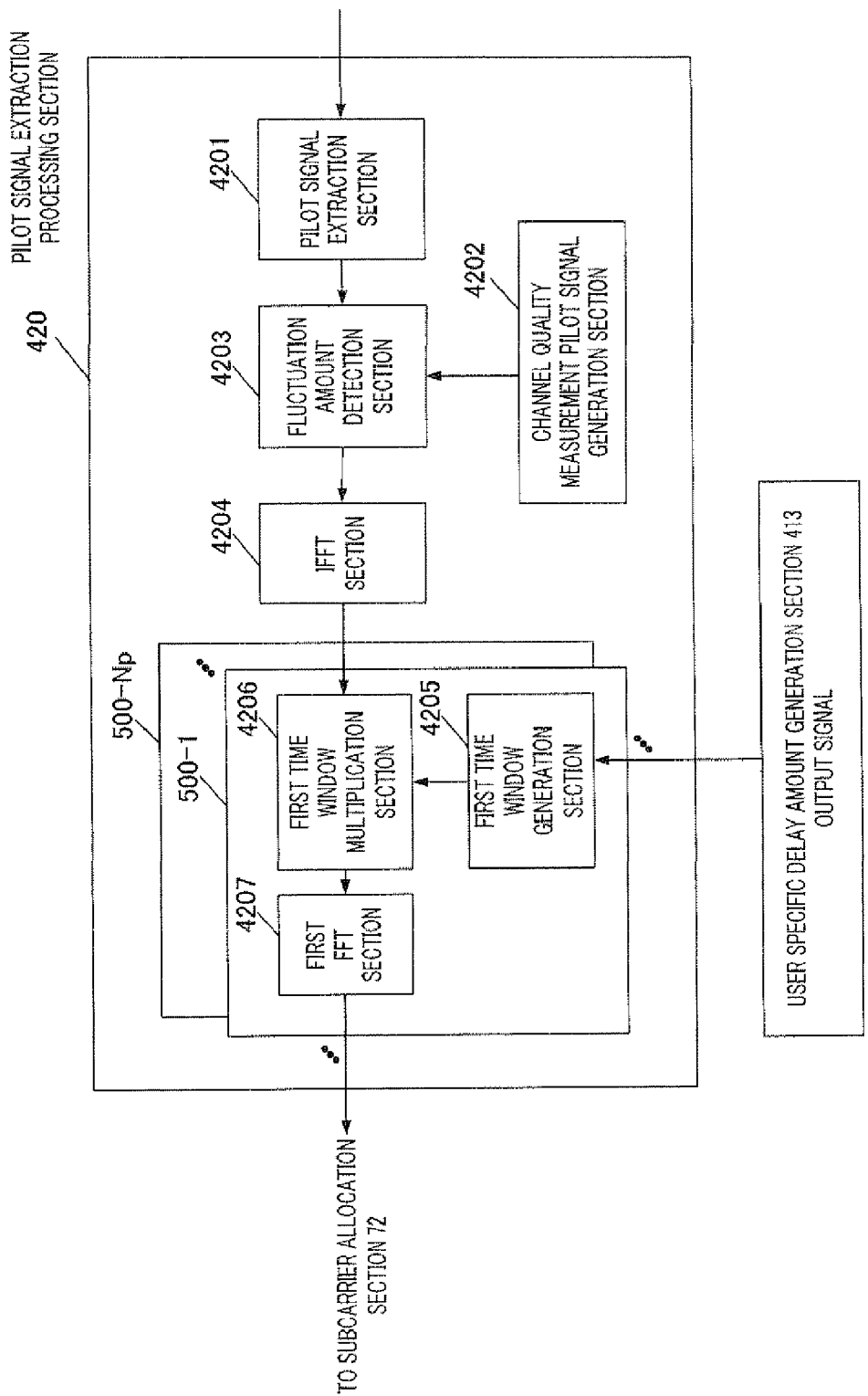
FIG. 27 is a drawing showing the detailed configuration of a pilot signal extraction processing section.

[8]

$$T\_GI \leq At \leq T\_FFT/Np \quad \text{(Equation 10)}$$

$$D(k) = (k-1) \times At \quad \text{(Equation 11)}$$

where:

k=1 to Np degree of multiplexing of channel quality measurement pilot signal: Np CP length (guard interval length) added by CP adding section 19: T_GI FFT time length transmitted from radio communication apparatus 1e: T_FFT FIG. 27 is a drawing showing the detailed configuration of pilot signal extraction processing section 420. Pilot signal extraction processing section 420 shown in FIG. 27 has pilot signal extraction section 4201, channel quality measurement pilot signal generation section 4202, fluctuation amount detection section 4203, IFFT section 4204, and channel quality measurement pilot signal separation sections 500-1 through 500-Np. The configuration and operation of pilot signal extraction processing section 420 will now be described using FIG. 27.

Pilot signal extraction section 4201 extracts subcarrier signal SC(T_PL,fn) included in an OFDM symbol including a channel quality measurement pilot signal transmitted from plurality of radio communication apparatuses 1e-1 through N(k) belonging to its corresponding sector, on a subcarrier signal input from OFDM demodulation section 51 (see FIG. 26). At this time, a subcarrier signal in which a channel quality measurement pilot signal has not been transmitted is taken to be a null signal (a state in which there are no signal components, replacing a signal-less state). Here, T_PL indicates OFDM symbol timing in which a channel quality measurement pilot signal is included, and fn indicates a subcarrier number. Extracted subcarrier signal SC(T_PL,fn) is output to fluctuation amount detection section 4203.

Channel quality measurement pilot signal generation section 4202 generates a channel quality measurement pilot signal known beforehand, transmitted using OFDM subcarrier signals, as OFDM symbol unit subcarrier signal SC_PL(T_PL,fn), and outputs this signal to fluctuation amount detection section 4203.

Using the input signals, fluctuation amount detection section 4203 detects complex fluctuation amount SC_ch(T_PL,fn) received by the extracted channel quality measurement pilot signal on the channel. That is to say, SC_ch(T_PL,fn)=SC(T_PL,fn)/SC_PL(TPL,fn) is computed in subcarrier units for all valid subcarriers (fn=1 to Nsc), where Nsc is the number of valid subcarriers included in an OFDM symbol. Complex fluctuation amount SC_ch(T_PL,fn) calculated by fluctuation amount detection section 4203 is output to IFFT section 4204.

With calculated complex fluctuation amount SC_ch(T_PL,fn) as input, IFFT section 4204 performs IFFT processing using predetermined FFT sample quantity NFFT, and converts a frequency domain signal to time domain signal y(T_PL,t). Here, fn=1 to Nsc. If Nsc does not satisfy NFFT, IFFT section 4204 performs zero-filling, or performs interpolation using complex fluctuation amount SC_ch(T_PL,fn). The post-conversion signal, time domain signal y(T_PL,t), is output to first time window multiplication section 4206 in channel quality measurement pilot signal separation section 500. Channel quality measurement pilot signal separation sections 500-1 through 500-Np are equipped with first time window generation section 4205, k'th time window multiplication section 4206 to which time domain signal y is input from IFFT section 4204, and k'th FFT section 4207.

Channel quality measurement pilot signal separation sections 500-1 through 500-Np perform the following processing using first through k'th time window generation section 4205, first through k'th time window multiplication section 4206, and first through k'th FFT section 4207, respectively. Below, k=1 to Np.

K'th time window generation section 4205 generates time window $WIN_k(t)$ as shown in Equations (12) and (13) below based on user specific delay amount D(k), which is an output signal of user specific delay amount generation section 413 (see FIG. 26) for the k'th channel quality measurement pilot signal. Here, Tw is the time window length, and Tw is set so as to satisfy the relationship T_GI≦Tw≦At.

[9]

$$WIN_k(t)=1, \text{ when } D(k) \leq t \leq D(k)+Tw \quad \text{(Equation 12)}$$

$$WIN_k(t)=0, \text{ when } 0<t<D(k), D(k)+Tw<t \leq T\_FFT \quad \text{(Equation 13)}$$

K'th time window multiplication section 4206 (only first time window multiplication section 4206 is shown in FIG. 27) outputs result y(T_PL,t)×$WIN_k$(t) of multiplying IFFT section 4204 output signal y(T_PL,t) by k'th time window $WIN_k$(t) input from k'th time window generation section 4205 (only first time window generation section 4205 is shown in FIG. 27) to k'th FFT section 4207 (only first FFT section 4207 is shown in FIG. 27).

K'th FFT section 4207 (only first FFT section 4207 is shown in FIG. 27) converts a time domain signal to frequency domain signal $SCD\_D_k$(T_PL,fn) by performing FFT processing on the output signal of the k'th time window multiplication section 4206 (only first time window multiplication section 4206 is shown in FIG. 27). Frequency domain signal $SC\_D_k$(T_PL,fn) is output to subcarrier allocation section 72 as a reception quality measurement result of the k'th channel quality measurement pilot signal.

Figure 28:
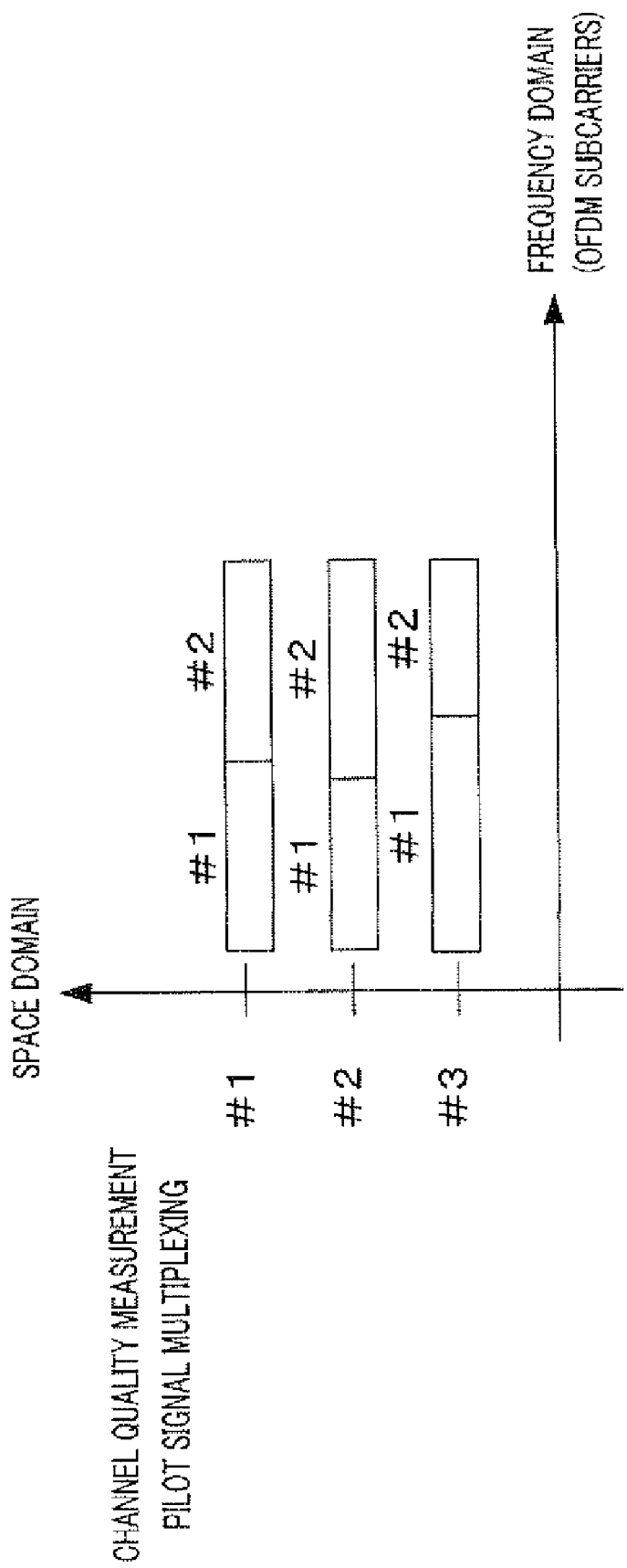
FIG. 28 is a drawing explaining the operation of a pilot signal extraction processing section in a base station apparatus having a plurality of sectors in which a plurality of radio communication apparatuses are present.
Figure 29:
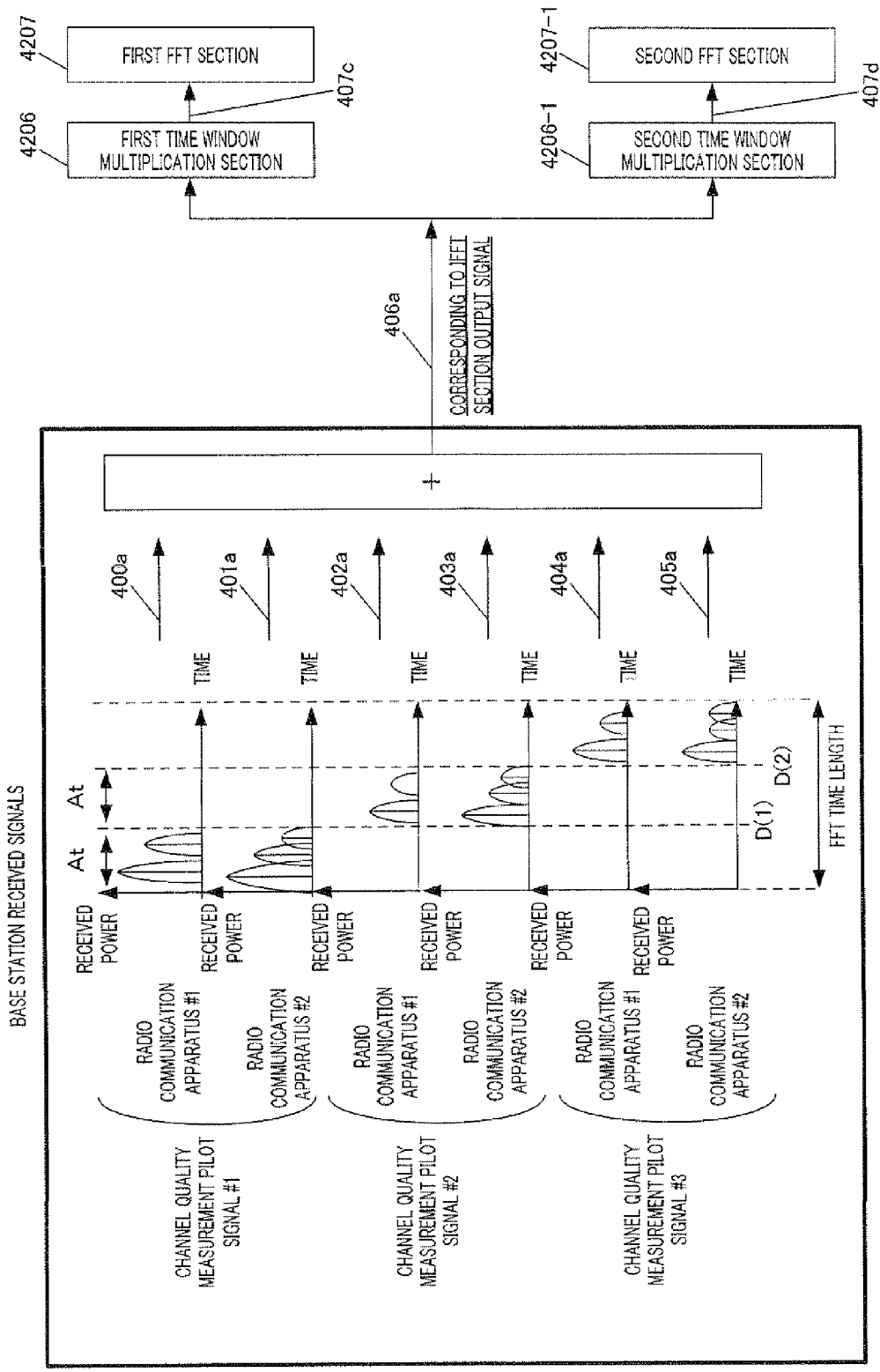
FIG. 29 is a drawing explaining the operation of a pilot signal extraction processing section in a base station apparatus having a plurality of sectors in which a plurality of radio communication apparatuses are present.

FIG. 28 through FIG. 30 are drawings explaining the operation of a pilot signal extraction processing section in a base station apparatus having a plurality of sectors in which a plurality of radio communication apparatuses are present. Specifically, FIG. 28 through FIG. 30 are drawings showing schematically the operation of pilot signal extraction processing section 420 in base station apparatus 1e-1 when channel quality measurement pilot signal degree of multiplexing Np=3 and number of radio communication apparatuses allocated to each channel quality measurement pilot signal N(k)=3. FIG. 28 is a drawing showing schematically signals input to pilot signal extraction processing section 420, and FIG. 29 is a drawing showing schematically signals in the pilot signal extraction processing section, showing signals prior to input to channel quality measurement pilot signal separation section 500. FIG. 30 is a drawing showing signals in channel quality measurement pilot signal separation section 500 in the pilot signal extraction processing section.

If channel quality measurement pilot signal multiplex transmission is performed using the same subcarrier signal in an OFDM symbol of the same time in the local sector, as shown in FIG. 28 and FIG. 29, a base station received signal includes a signal from a radio communication apparatus to which a multiplexed channel quality measurement pilot signal is allocated, as shown in the figures. In this case, when a received signal of one multiplexed channel quality measurement pilot signal is considered, as shown in the figure, a received signal of another multiplexed channel quality measurement pilot signal becomes an interference signal.

In the present invention, uplink transmission is performed using a different cyclic delay D(k) for each multiplexed channel quality measurement pilot signal. Consequently, time domain signals obtained by performing an IFFT by means of IFFT section 4204 on a fluctuation amount detection section 4203 output signal correspond to the following kinds of signals. Namely, an uplink delay profile received after traversing a channel to base station apparatus 1$f$ (see FIG. 24) from local sector radio communication apparatuses #1 and #2 is detected as signal 406$a$ (see FIG. 30A) combining signals (400$a$ through 405$a$) time-shifted by cyclic delay amount D(k).

Therefore, channel quality measurement pilot signal separation sections 500-1 through 500-Np can detect that multiplexed channel quality measurement pilot signals are separated in the time domain by multiplying time windows by means of first through Np'th time window multiplication sections 4206. In FIG. 29, first time window multiplication section 4206 and second time window multiplication section 4206-1 are shown as first through Np'th time window multiplication sections 4206 as an example, the operation of first time window multiplication section 4206 is shown in a schematic diagram in FIG. 30B, and the operation of second time window multiplication section 4206-1 is shown in a schematic diagram in FIG. 30C.

Figure 30A:
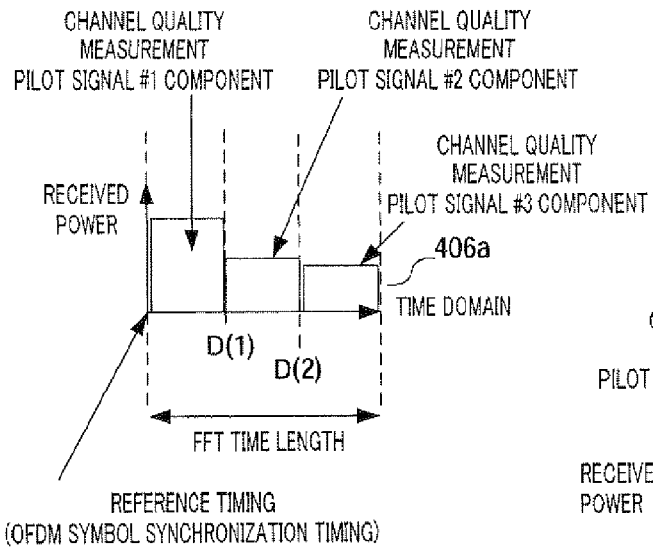
FIG. 30 is a drawing explaining the operation of a pilot signal extraction processing section in a base station apparatus having a plurality of sectors in which a plurality of radio communication apparatuses are present.
Figure 30B:
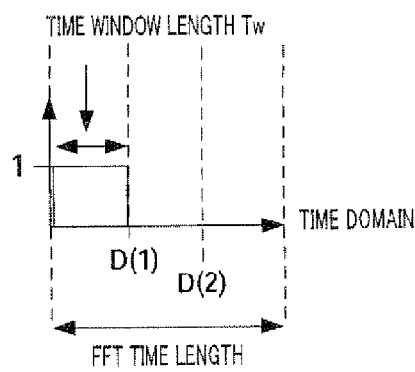
Figure 30C:
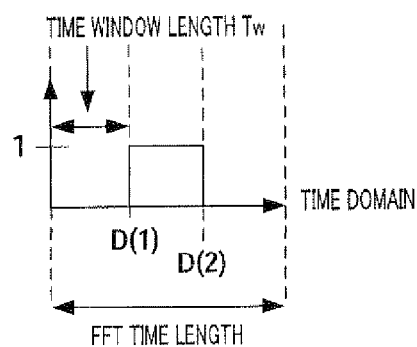
Figure 30D:
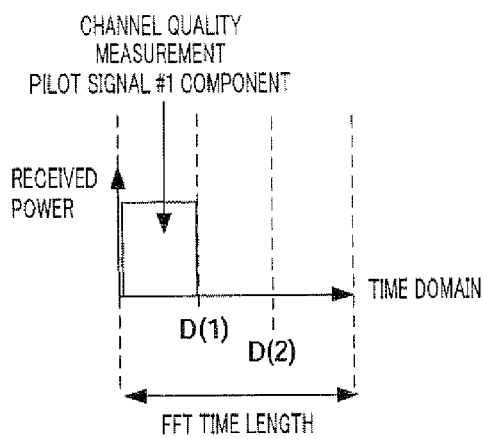
Figure 30E:
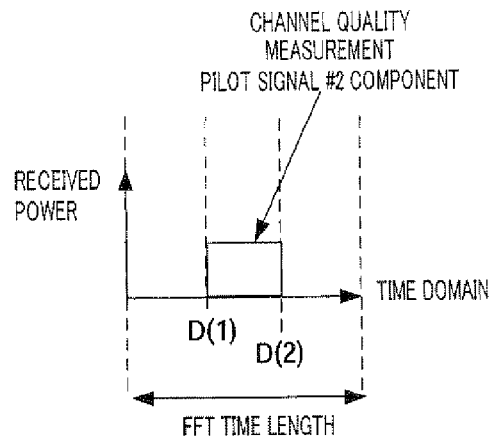

Signal 407$c$ output by first time window multiplication section 4206 is shown in a schematic diagram in FIG. 30D, being multiplied by a time window and output as channel quality measurement pilot signal #1. Signal 407$d$ output by second time window multiplication section 4206-1 is shown in a schematic diagram in FIG. 30E, being multiplied by a time window and output as channel quality measurement pilot signal #2.

By converting signals obtained by being separated in the time domain in this way to frequency domain signals by means of first through Np'th FFT sections 4207, multiplexed channel quality measurement pilot signal subcarrier signal components can be detected. In FIG. 29, first FFT section 4207 and second FFT section 4207-1 are shown as first through Np'th FFT sections 4207 as an example.

Subcarrier allocation section 72 allocates subcarriers to plurality of radio communication apparatuses 1$e$-1 through N(k) using pilot signal extraction processing section 420 output, reception quality measurement result SC_D$_k$(T_PL, fn). Specifically, subcarrier allocation section 72 performs scheduling based on a scheduling algorithm, using an RB size from resource block size deciding section 54, based on reception quality SC_D$_k$(T_PL,fn) of each subcarrier of each user's radio communication apparatus input from pilot signal extraction processing section 420, and outputs this to MCS deciding section 73 and control information generation section 57. Here k=1 to Np.

Base station apparatus 2$e$ of this embodiment performs multiplex transmission, using the same frequency resources and time resources, of channel quality measurement pilot signals transmitted from a plurality of users' radio communication apparatuses in the same sector, and at this time, performs transmission with cyclic shift delay added using a different base station specific delay amount for each sector. By this means, it is possible to measure per-subcarrier channel quality information within a channel quality measurement partial band for a greater number of users' radio communication apparatuses. Therefore, frequency resources and time resources used in channel quality measurement pilot signal transmission can be reduced, and data transmission efficiency can be increased.

Figure 31:
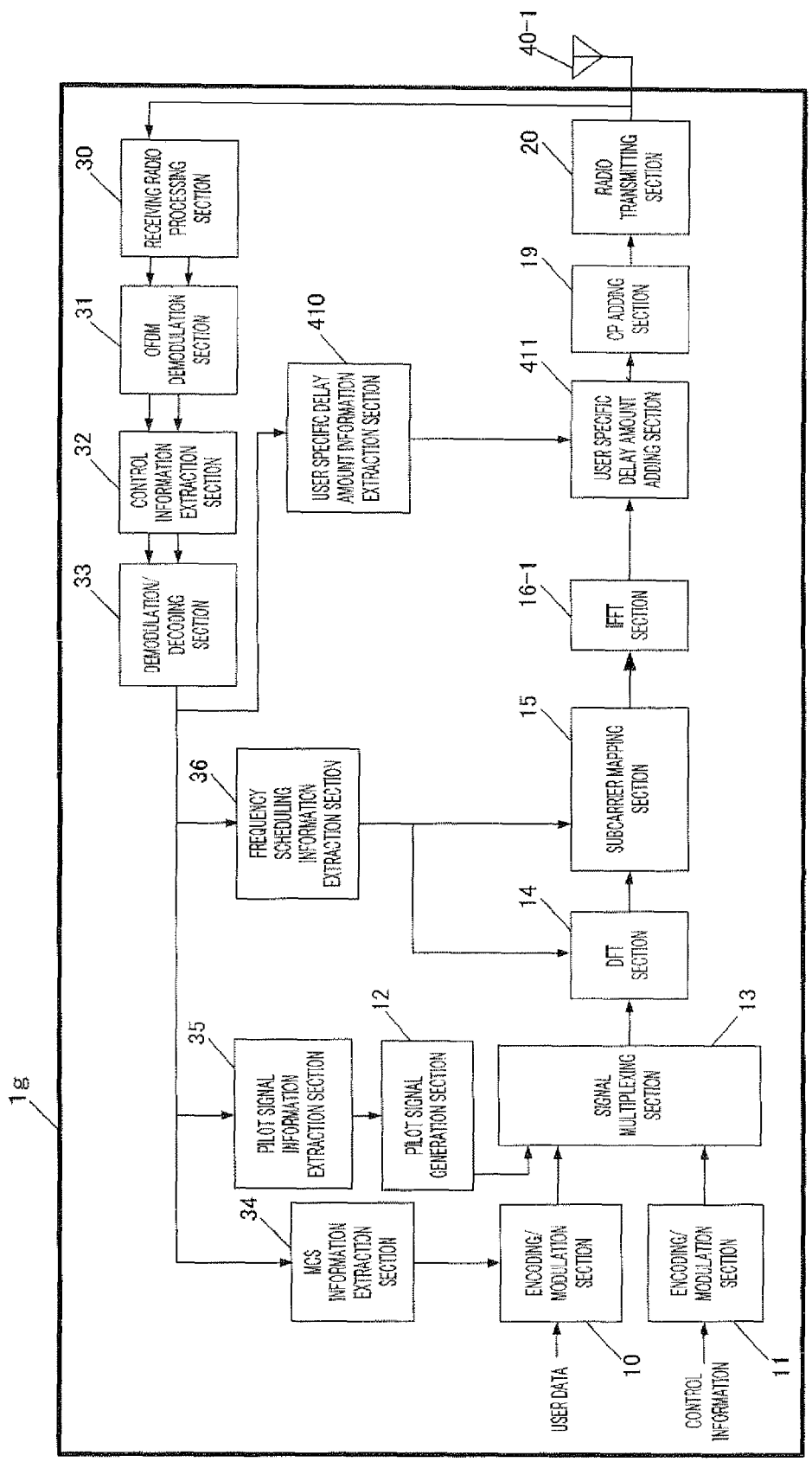
FIG. 31 is a block diagram showing the configuration of a sample variant of a radio communication apparatus according to Embodiment 6.

FIG. 31 is a block diagram showing the configuration of radio communication apparatus 1$g$ as a sample variant of radio communication apparatus 1$f$ according to Embodiment 6. Radio communication apparatus 1$g$ shown in FIG. 31 is a radio communication apparatus capable of transmission from one antenna. Radio communication apparatus 1$g$ has a configuration in which cyclic shift delay amount information extraction section 37 and cyclic shift delay adding section 18 have been eliminated from the configuration of radio communication apparatus 1$f$ shown in FIG. 24, one antenna is provided, and user specific delay amount adding section 411, CP adding section 19, and radio transmitting section 20 are provided for the antenna.

User specific delay amount information extraction section 410 extracts user specific delay amount information from a demodulation/decoding section 33 output signal, and outputs this information to user specific delay amount adding section 411. Based on a cyclic shift delay amount indicated by user specific delay amount information that is user specific delay amount information extraction section 410 output information, user specific delay amount adding section 411 adds a cyclic shift delay to IFFT section 16-1 output, and outputs the resulting signal to CP adding section 19. According to this configuration, with a radio communication apparatus capable of transmission from one antenna, also, the same kind of effect can also be obtained as in above-described Embodiment 6 in a base station apparatus that communicates with radio communication apparatus 1 if capable of multi-antenna transmission shown in FIG. 24.

Thus, according to above Embodiments 1 through 6, by sending a channel quality measurement signal to a base station apparatus from a radio communication apparatus that is a radio communication terminal while changing channel characteristics by means of a cyclic shift delay, the base station apparatus can be made to perform frequency scheduling well.

A case has here been described by way of example in which the present invention is configured as hardware, but it is also possible for the present invention to be implemented by software. For example, the same kind of functions as those of an apparatus according to the present invention can be realized by writing an algorithm of a transmission method according to the present invention in a programming language, storing this program in memory, and having it executed by an information processing means.

The disclosures of Japanese Patent Application No. 2007-002856, filed on Jan. 10, 2007, and Japanese Patent Application No. 2008-000209, filed on Jan. 4, 2008, including the specifications, drawings and abstracts, are incorporated herein by reference in their entirety.

Industrial Applicability

A radio communication apparatus according to the present invention is suitable for use in the radio communication field, and more particularly in the field of wideband radio communication systems in which frequency scheduling is performed based on channel quality measurement.

The invention claimed is:

1. A radio communication apparatus comprising:
a cyclic shift delay amount information extraction section that extracts cyclic shift delay amount information transmitted from a base station apparatus;
a transmitting section that performs cyclic shift delay diversity transmission of a channel quality measurement signal using said cyclic shift delay amount information extracted by said cyclic shift delay amount information extraction section, wherein the cyclic shift delay diversity transmission is performed by the radio communication apparatus for transmission of both the channel quality measurement signal and a data signal; and
a frequency scheduling information extraction section that extracts frequency scheduling information including information relating to a channel quality measurement band transmitted from said base station apparatus,
wherein said transmitting section performs cyclic shift delay diversity transmission of a channel quality measurement signal restricted to said channel quality measurement band in extracted said frequency scheduling information.

2. A base station apparatus comprising:
a pilot signal extraction section that extracts a channel quality measurement signal transmitted from the radio communication apparatus according to claim 1;
a reception quality measuring section that measures per-subcarrier reception quality using a channel quality measurement signal extracted by said pilot signal extraction section; and
a subcarrier allocation section that allocates a subcarrier to said radio communication apparatus using said per-subcarrier reception quality measured by said reception quality measuring section.

3. A radio communication apparatus comprising:
a cyclic shift delay amount information extraction section that extracts cyclic shift delay amount information transmitted from a base station apparatus;
a subcarrier base rotation section that generates a phase rotation signal providing phase rotation known beforehand on a subcarrier-by-subcarrier basis;
a transmitting section that performs cyclic shift delay diversity transmission of a channel quality measurement signal, based on said cyclic shift delay amount information extracted by said cyclic shift delay amount information extraction section, using said subcarrier and a signal generated by said subcarrier phase rotation section, wherein the cyclic shift delay diversity transmission is performed by the radio communication apparatus for transmission of both the channel quality measurement signal and a data signal; and
a frequency scheduling information extraction section that extracts frequency scheduling information including information relating to a channel quality measurement band used in transmission of said channel quality measurement signal,
wherein said transmitting section performs cyclic shift delay diversity transmission of a channel quality measurement signal restricted to said channel quality measurement band in extracted said frequency scheduling information.

4. A base station apparatus comprising:
a pilot signal extraction section that extracts said channel quality measurement signal transmitted from the radio communication apparatus according to claim 3;
a reception quality measuring section that measures per-subcarrier reception quality using a channel quality measurement signal extracted by said pilot signal extraction section;
a subcarrier allocation section that allocates a subcarrier to said radio communication apparatus using said channel quality measurement signal extracted by said reception quality measuring section; and
a phase rotation amount deciding section that decides a subcarrier phase rotation amount of a subcarrier used in a transmission of said radio communication apparatus, using said channel quality measurement signal extracted by said reception quality measuring section and a subcarrier allocated by said subcarrier allocation section.

* * * * *

UNITED STATES PATENT AND TRADEMARK OFFICE
CERTIFICATE OF CORRECTION

| | | |
|---|---|---|
| PATENT NO. | : 8,385,933 B2 | Page 1 of 1 |
| APPLICATION NO. | : 12/522694 | |
| DATED | : February 26, 2013 | |
| INVENTOR(S) | : Takaaki Kishigami et al. | |

It is certified that error appears in the above-identified patent and that said Letters Patent is hereby corrected as shown below:

On the Title Page

Item (56) References Cited, Other Publications, page 2, right column, line 9 incorrectly reads:

"2006, pp. 125-130, p. 4, Line 20."

and should read:

"2006, pp. 125-130.".

In the Claims

Claim 2, column 53, line 39 incorrectly reads:

"subcanier reception quality using a channel quality mea-"

and should read:

"subcarrier reception quality using a channel quality mea-".

Claim 3, column 54, line 5 incorrectly reads:

"a subcarrier base rotation section that generates a phase"

and should read:

"a subcarrier phase rotation section that generates a phase".

Signed and Sealed this
Eighth Day of April, 2014

Michelle K. Lee
*Deputy Director of the United States Patent and Trademark Office*